US012448604B2

(12) United States Patent
Childs et al.

(10) Patent No.: US 12,448,604 B2
(45) Date of Patent: *Oct. 21, 2025

(54) METHODS OF PRODUCING MODIFIED NATURAL KILLER CELLS AND METHODS OF USE

(71) Applicant: The United States of America, as represented by the Secretary, Dept. of Health and Human Services, Bethesda, MD (US)

(72) Inventors: Richard W. Childs, Rockville, MD (US); David S. J. Allan, Rockville, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 764 days.

This patent is subject to a terminal disclaimer.

(21) Appl. No.: 17/688,435

(22) Filed: Mar. 7, 2022

(65) Prior Publication Data

US 2022/0228117 A1 Jul. 21, 2022

Related U.S. Application Data

(60) Division of application No. 15/801,085, filed on Nov. 1, 2017, now Pat. No. 11,293,010, which is a continuation-in-part of application No. PCT/US2017/043774, filed on Jul. 25, 2017.

(60) Provisional application No. 62/366,493, filed on Jul. 25, 2016.

(51) Int. Cl.

| | |
|---|---|
| ***C12N 5/0783*** | (2010.01) |
| ***A61K 40/15*** | (2025.01) |
| ***A61K 40/42*** | (2025.01) |
| ***C12N 5/00*** | (2006.01) |
| ***C12N 15/867*** | (2006.01) |

(52) U.S. Cl.

CPC ............ *C12N 5/0646* (2013.01); *A61K 40/15* (2025.01); *A61K 40/42* (2025.01); *C12N 5/0068* (2013.01); *C12N 15/867* (2013.01); *A61K 2239/31* (2023.05); *A61K 2239/38* (2023.05); *C12N 2501/2302* (2013.01); *C12N 2501/505* (2013.01); *C12N 2501/515* (2013.01); *C12N 2501/599* (2013.01); *C12N 2501/65* (2013.01); *C12N 2501/999* (2013.01); *C12N 2502/1135* (2013.01); *C12N 2502/30* (2013.01); *C12N 2502/99* (2013.01); *C12N 2510/00* (2013.01); *C12N 2510/04* (2013.01); *C12N 2740/15041* (2013.01); *C12N 2740/15043* (2013.01); *C12N 2799/027* (2013.01)

(58) Field of Classification Search

None

See application file for complete search history.

(56) References Cited

U.S. PATENT DOCUMENTS

| | | | |
|---|---|---|---|
| 2001/0039052 | A1 | 11/2001 | Zander |
| 2002/0177551 | A1 | 11/2002 | Terman |
| 2007/0264687 | A1 | 11/2007 | Chou et al. |
| 2012/0087894 | A1 | 4/2012 | Jolly et al. |
| 2013/0266551 | A1 | 10/2013 | Campana et al. |
| 2018/0185463 | A1 | 7/2018 | Borriello |
| 2020/0392457 | A1 | 12/2020 | Childs et al. |

FOREIGN PATENT DOCUMENTS

| | | |
|---|---|---|
| CN | 101684456 A | 3/2010 |
| WO | WO 2014/179759 | 11/2014 |
| WO | WO 2015/112793 | 7/2015 |
| WO | WO 2016/073595 | 5/2016 |
| WO | WO 2016/077734 | 5/2016 |
| WO | WO 2016/085946 | 6/2016 |
| WO | WO 2017/059177 | 4/2017 |
| WO | WO 2018/022646 | 2/2018 |

OTHER PUBLICATIONS

Carlsten and Childs, "Genetic manipulation of NK cells for cancer immunotherapy: techniques and clinical implications," *Frontiers in Immunology*, 6:266, 2015 (9 pages).

Carotta, "Targeting NK Cells for Anticancer Immunotherapy: Clinical and Preclinical Approaches," *Frontiers in Immunology*, vol. 7, Article 152, 2016 (10 pages).

Childs and Berg, "Bringing natural killer cells to the clinic: ex vivo manipulation," *Hematology 2013: Clinical Production and Applications of Natural Killer Cell Immunotherapy*, pp. 234-246, 2013.

Cho et al., "Expansion and Activation of Natural Killer Cells for Cancer Immunotherapy," *Korean J Lab Med*, vol. 29, No. 2, pp. 89-96, 2009 (Author Manuscript version, 10 pages).

Imai et al., "Genetic modification of primary natural killer cells overcomes inhibitory signals and induces specific killing of leukemic cells," *Blood*, vol. 106, No. 1, pp. 376-383, 2005.

Lapteva et al, "Large-scale ex vivo expansion and characterization of natural killer cells for clinical applications," *Cytotherapy*, vol. 14, No. 9, pp. 1131-1143, 2012.

(Continued)

*Primary Examiner* — Daniel C Gamett

(74) *Attorney, Agent, or Firm* — Klarquist Sparkman, LLP

(57) ABSTRACT

Disclosed herein are method of producing NK cells that include one or more heterologous nucleic acids. The methods include culturing a population of isolated NK cells in the presence of one or more cytokines to produce a population of activated NK cells. The population of activated NK cells are transduced with a viral vector comprising the one or more heterologous nucleic acids, for example by contacting the activated NK cells with viral particles including the viral vector. The resulting transduced NK cells are then cultured in the presence of one or more cytokines, and optionally in the presence of irradiated feeder cells, to produce a population of expanded transduced NK cells. Also disclosed are methods of treating a subject with a disorder (such as a tumor or hyperproliferative disorder) by administering to the subject NK cells produced by the methods described herein.

14 Claims, 23 Drawing Sheets

Specification includes a Sequence Listing.

(56) References Cited

OTHER PUBLICATIONS

Müller et al., "Engineering NK cells modified with an EGFRvIII-specific chimeric antigen receptor to overexpress CXCR4 improves immunotherapy of CXCL12/SDF-1 α-secreting glioblastoma," *J. Immunother.*, vol. 38, No. 5, pp. 197-210, 2015 (Author manuscript version, 28 pages).
Norell et al, "CD34-based enrichment of genetically engineered human T cells for clinical use results in dramatically enhanced tumor targeting," *Cancer Immunol Immunother*, vol. 59, pp. 851-862, 2010.
Ramanathan et al., "Lentiviral Transduction of Ex Vivo Expanded Natural Killer Cells with a CD19 Chimeric Antigen Receptor Induces Cytotoxicity against Resistant B Cell Malignancies," *Blood*, vol. 112, No. 11, 3540, 2008 (4 pages, Abstract).
Streltsova et al., "Retroviral gene transfer into primary human NK cells activated by IL-2 and K562 feeder cells expressing membrane-bound IL-21," *Journal of Immunological Methods*, vol. 450, pp. 90-94, 2017.
Su et al., "Effective and Stable Gene Transfer into Human NK Cells Using an HIV-1-Based Lentiviral Vector System," *Molecular Therapy*, vol. 16, Supplement 1, pp. S286-S287, 2008.
Su et al., "Optimizing Lentiviral Transduction of Human Natural Killer Cells," *Blood*, 118(21): 4714, 2011 (Abstract, 6 pages).
Sutlu et al., "Inhibition of Intracellular Antiviral Defense Mechanisms Augments Lentiviral Transduction of Human Natural Killer Cells: Implications for Gene Therapy," *Human Gene Therapy*, vol. 23, No. 10, pp. 1090-1100, 2012.
Tran et al., "Lentiviral Vectors Mediate Stable and Efficient Gene Delivery into Primary Murine Natural Killer Cells," *Molecular Therapy*, vol. 15, No. 7, pp. 1331-1339, 2007.
Waller et al., "High-Efficiency Lentiviral Genetic Modification of Primary Human Natural Killer Cells," *Blood* vol. 130, Suppl. 1, No. 5566, published online Dec. 7, 2017 (3 pages, Abstract).
Zhou et al., "Lentivirus-Mediated Gene Transfer and Expression in Established Human Tumor Antigen-Specific Cytotoxic T Cells and Primary Unstimulated T Cells," *Human Gene Therapy*, vol. 14, pp. 1089-1105, 2003.

5' LTR
U3 R U5
(RSV)
SD
Ψ
RRE
cPPT
SA
hPGK
promoter
transgene
WPRE
3' LTR ΔU3
(SIN)
R U5
Gene transfer
vector
CMV
SD SA
env
poly A
Envelope
(VSV-G)
CMV
SD
Ψ
gag
pro
pol
RRE
tat
rev
poly A
Packaging
(gag/pol/rev)

Transfection

Non-replicating lentivirus

Transduction

SEQUENCE LISTING

```
<160> NUMBER OF SEQ ID NOS: 17

<210> SEQ ID NO 1
<211> LENGTH: 1059
<212> TYPE: DNA
<213> ORGANISM: Homo sapiens
<220> FEATURE:
<221> NAME/KEY: CDS
<222> LOCATION: (1)..(1059)

<400> SEQUENCE: 1

atg gag ggg atc agt ata tac act tca gat aac tac acc gag gaa atg       48
Met Glu Gly Ile Ser Ile Tyr Thr Ser Asp Asn Tyr Thr Glu Glu Met
1               5                   10                  15

ggc tca ggg gac tat gac tcc atg aag gaa ccc tgt ttc cgt gaa gaa       96
```

```
Gly Ser Gly Asp Tyr Asp Ser Met Lys Glu Pro Cys Phe Arg Glu Glu
            20                  25                  30

aat gct aat ttc aat aaa atc ttc ctg ccc acc atc tac tcc atc atc      144
Asn Ala Asn Phe Asn Lys Ile Phe Leu Pro Thr Ile Tyr Ser Ile Ile
        35                  40                  45

ttc tta act ggc att gtg ggc aat gga ttg gtc atc ctg gtc atg ggt      192
Phe Leu Thr Gly Ile Val Gly Asn Gly Leu Val Ile Leu Val Met Gly
    50                  55                  60

tac cag aag aaa ctg aga agc atg acg gac aag tac agg ctg cac ctg      240
Tyr Gln Lys Lys Leu Arg Ser Met Thr Asp Lys Tyr Arg Leu His Leu
65                  70                  75                  80

tca gtg gcc gac ctc ctc ttt gtc atc acg ctt ccc ttc tgg gca gtt      288
Ser Val Ala Asp Leu Leu Phe Val Ile Thr Leu Pro Phe Trp Ala Val
                85                  90                  95

gat gcc gtg gca aac tgg tac ttt ggg aac ttc cta tgc aag gca gtc      336
Asp Ala Val Ala Asn Trp Tyr Phe Gly Asn Phe Leu Cys Lys Ala Val
            100                 105                 110

cat gtc atc tac aca gtc aac ctc tac agc agt gtc ctc atc ctg gcc      384
His Val Ile Tyr Thr Val Asn Leu Tyr Ser Ser Val Leu Ile Leu Ala
        115                 120                 125

ttc atc agt ctg gac cgc tac ctg gcc atc gtc cac gcc acc aac agt      432
Phe Ile Ser Leu Asp Arg Tyr Leu Ala Ile Val His Ala Thr Asn Ser
    130                 135                 140

cag agg cca agg aag ctg ttg gct gaa aag gtg gtc tat gtt ggc gtc      480
Gln Arg Pro Arg Lys Leu Leu Ala Glu Lys Val Val Tyr Val Gly Val
145                 150                 155                 160

tgg atc cct gcc ctc ctg ctg act att ccc gac ttc atc ttt gcc aac      528
Trp Ile Pro Ala Leu Leu Leu Thr Ile Pro Asp Phe Ile Phe Ala Asn
                165                 170                 175

gtc agt gag gca gat gac aga tat atc tgt gac cgc ttc tac ccc aat      576
Val Ser Glu Ala Asp Asp Arg Tyr Ile Cys Asp Arg Phe Tyr Pro Asn
            180                 185                 190

gac ttg tgg gtg gtt gtg ttc cag ttt cag cac atc atg gtt ggc ctt      624
Asp Leu Trp Val Val Val Phe Gln Phe Gln His Ile Met Val Gly Leu
        195                 200                 205

atc ctg cct ggt att gtc atc ctg tcc tgc tat tgc att atc atc tcc      672
Ile Leu Pro Gly Ile Val Ile Leu Ser Cys Tyr Cys Ile Ile Ile Ser
    210                 215                 220

aag ctg tca cac tcc aag ggc cac cag aag cgc aag gcc ctc aag acc      720
Lys Leu Ser His Ser Lys Gly His Gln Lys Arg Lys Ala Leu Lys Thr
225                 230                 235                 240

aca gtc atc ctc atc ctg gct ttc ttc gcc tgt tgg ctg cct tac tac      768
Thr Val Ile Leu Ile Leu Ala Phe Phe Ala Cys Trp Leu Pro Tyr Tyr
                245                 250                 255

att ggg atc agc atc gac tcc ttc atc ctc ctg gaa atc atc aag caa      816
Ile Gly Ile Ser Ile Asp Ser Phe Ile Leu Leu Glu Ile Ile Lys Gln
            260                 265                 270

ggg tgt gag ttt gag aac act gtg cac aag tgg att tcc atc acc gag      864
Gly Cys Glu Phe Glu Asn Thr Val His Lys Trp Ile Ser Ile Thr Glu
        275                 280                 285

gcc cta gct ttc ttc cac tgt tgt ctg aac ccc atc ctc tat gct ttc      912
Ala Leu Ala Phe Phe His Cys Cys Leu Asn Pro Ile Leu Tyr Ala Phe
    290                 295                 300

ctt gga gcc aaa ttt aaa acc tct gcc cag cac gca ctc acc tct gtg      960
Leu Gly Ala Lys Phe Lys Thr Ser Ala Gln His Ala Leu Thr Ser Val
305                 310                 315                 320

agc aga ggg tcc agc ctc aag atc ctc tcc aaa gga aag cga ggt gga     1008
Ser Arg Gly Ser Ser Leu Lys Ile Leu Ser Lys Gly Lys Arg Gly Gly
                325                 330                 335
```

-continued

```
cat tca tct gtt tcc act gag tct gag tct tca agt ttt cac tcc agc     1056
His Ser Ser Val Ser Thr Glu Ser Glu Ser Ser Ser Phe His Ser Ser
            340                 345                 350

taa                                                                 1059


<210> SEQ ID NO 2
<211> LENGTH: 352
<212> TYPE: PRT
<213> ORGANISM: Homo sapiens

<400> SEQUENCE: 2

Met Glu Gly Ile Ser Ile Tyr Thr Ser Asp Asn Tyr Thr Glu Glu Met
1               5                   10                  15

Gly Ser Gly Asp Tyr Asp Ser Met Lys Glu Pro Cys Phe Arg Glu Glu
            20                  25                  30

Asn Ala Asn Phe Asn Lys Ile Phe Leu Pro Thr Ile Tyr Ser Ile Ile
        35                  40                  45

Phe Leu Thr Gly Ile Val Gly Asn Gly Leu Val Ile Leu Val Met Gly
    50                  55                  60

Tyr Gln Lys Lys Leu Arg Ser Met Thr Asp Lys Tyr Arg Leu His Leu
65                  70                  75                  80

Ser Val Ala Asp Leu Leu Phe Val Ile Thr Leu Pro Phe Trp Ala Val
                85                  90                  95

Asp Ala Val Ala Asn Trp Tyr Phe Gly Asn Phe Leu Cys Lys Ala Val
            100                 105                 110

His Val Ile Tyr Thr Val Asn Leu Tyr Ser Ser Val Leu Ile Leu Ala
        115                 120                 125

Phe Ile Ser Leu Asp Arg Tyr Leu Ala Ile Val His Ala Thr Asn Ser
    130                 135                 140

Gln Arg Pro Arg Lys Leu Leu Ala Glu Lys Val Val Tyr Val Gly Val
145                 150                 155                 160

Trp Ile Pro Ala Leu Leu Leu Thr Ile Pro Asp Phe Ile Phe Ala Asn
                165                 170                 175

Val Ser Glu Ala Asp Asp Arg Tyr Ile Cys Asp Arg Phe Tyr Pro Asn
            180                 185                 190

Asp Leu Trp Val Val Val Phe Gln Phe Gln His Ile Met Val Gly Leu
        195                 200                 205

Ile Leu Pro Gly Ile Val Ile Leu Ser Cys Tyr Cys Ile Ile Ile Ser
    210                 215                 220

Lys Leu Ser His Ser Lys Gly His Gln Lys Arg Lys Ala Leu Lys Thr
225                 230                 235                 240

Thr Val Ile Leu Ile Leu Ala Phe Phe Ala Cys Trp Leu Pro Tyr Tyr
                245                 250                 255

Ile Gly Ile Ser Ile Asp Ser Phe Ile Leu Leu Glu Ile Ile Lys Gln
            260                 265                 270

Gly Cys Glu Phe Glu Asn Thr Val His Lys Trp Ile Ser Ile Thr Glu
        275                 280                 285

Ala Leu Ala Phe Phe His Cys Cys Leu Asn Pro Ile Leu Tyr Ala Phe
    290                 295                 300

Leu Gly Ala Lys Phe Lys Thr Ser Ala Gln His Ala Leu Thr Ser Val
305                 310                 315                 320

Ser Arg Gly Ser Ser Leu Lys Ile Leu Ser Lys Gly Lys Arg Gly Gly
                325                 330                 335

His Ser Ser Val Ser Thr Glu Ser Glu Ser Ser Ser Phe His Ser Ser
            340                 345                 350
```

<210> SEQ ID NO 3
<211> LENGTH: 951
<212> TYPE: DNA
<213> ORGANISM: Homo sapiens
<220> FEATURE:
<221> NAME/KEY: CDS
<222> LOCATION: (1)..(951)

<400> SEQUENCE: 3

```
atg ccg cgg ggc tgg acc gcg ctt tgc ttg ctg agt ttg ctg cct tct       48
Met Pro Arg Gly Trp Thr Ala Leu Cys Leu Leu Ser Leu Leu Pro Ser
1               5                   10                  15

ggg ttc atg agt ctt gac aac aac ggt act gct acc cca gag tta cct       96
Gly Phe Met Ser Leu Asp Asn Asn Gly Thr Ala Thr Pro Glu Leu Pro
            20                  25                  30

acc cag gga aca ttt tca aat gtt tct aca aat gta tcc tac caa gaa      144
Thr Gln Gly Thr Phe Ser Asn Val Ser Thr Asn Val Ser Tyr Gln Glu
        35                  40                  45

act aca aca cct agt acc ctt gga agt acc agc ctg cac cct gtg tct      192
Thr Thr Thr Pro Ser Thr Leu Gly Ser Thr Ser Leu His Pro Val Ser
    50                  55                  60

caa cat ggc aat gag gcc aca aca aac atc aca gaa acg aca gtc aaa      240
Gln His Gly Asn Glu Ala Thr Thr Asn Ile Thr Glu Thr Thr Val Lys
65                  70                  75                  80

ttc aca tct acc tct gtg ata acc tca gtt tat gga aac aca aac tct      288
Phe Thr Ser Thr Ser Val Ile Thr Ser Val Tyr Gly Asn Thr Asn Ser
                85                  90                  95

tct gtc cag tca cag acc tct gta atc agc aca gtg ttc acc acc cca      336
Ser Val Gln Ser Gln Thr Ser Val Ile Ser Thr Val Phe Thr Thr Pro
            100                 105                 110

gcc aac gtt tca act cca gag aca acc ttg aag cct agc ctg tca cct      384
Ala Asn Val Ser Thr Pro Glu Thr Thr Leu Lys Pro Ser Leu Ser Pro
        115                 120                 125

gga aat gtt tca gac ctt tca acc act agc act agc ctt gca aca tct      432
Gly Asn Val Ser Asp Leu Ser Thr Thr Ser Thr Ser Leu Ala Thr Ser
    130                 135                 140

ccc act aaa ccc tat aca tca tct tct cct atc cta agt gac atc aag      480
Pro Thr Lys Pro Tyr Thr Ser Ser Ser Pro Ile Leu Ser Asp Ile Lys
145                 150                 155                 160

gca gaa atc aaa tgt tca ggc atc aga gaa gtg aaa ttg act cag ggc      528
Ala Glu Ile Lys Cys Ser Gly Ile Arg Glu Val Lys Leu Thr Gln Gly
                165                 170                 175

atc tgc ctg gag caa aat aag acc tcc agc tgt gcg gag ttt aag aag      576
Ile Cys Leu Glu Gln Asn Lys Thr Ser Ser Cys Ala Glu Phe Lys Lys
            180                 185                 190

gac agg gga gag ggc ctg gcc cga gtg ctg tgt ggg gag gag cag gct      624
Asp Arg Gly Glu Gly Leu Ala Arg Val Leu Cys Gly Glu Glu Gln Ala
        195                 200                 205

gat gct gat gct ggg gcc cag gta tgc tcc ctg ctc ctt gcc cag tct      672
Asp Ala Asp Ala Gly Ala Gln Val Cys Ser Leu Leu Leu Ala Gln Ser
    210                 215                 220

gag gtg agg cct cag tgt cta ctg ctg gtc ttg gcc aac aga aca gaa      720
Glu Val Arg Pro Gln Cys Leu Leu Leu Val Leu Ala Asn Arg Thr Glu
225                 230                 235                 240

att tcc agc aaa ctc caa ctt atg aaa aag cac caa tct gac ctg aaa      768
Ile Ser Ser Lys Leu Gln Leu Met Lys Lys His Gln Ser Asp Leu Lys
                245                 250                 255

aag ctg ggg atc cta gat ttc act gag caa gat gtt gca agc cac cag      816
Lys Leu Gly Ile Leu Asp Phe Thr Glu Gln Asp Val Ala Ser His Gln
            260                 265                 270
```

```
agc tat tcc caa aag acc ctg att gca ctg gtc acc tcg gga gcc ctg      864
Ser Tyr Ser Gln Lys Thr Leu Ile Ala Leu Val Thr Ser Gly Ala Leu
        275                 280                 285

ctg gct gtc ttg ggc atc act ggc tat ttc ctg atg aat cgc cgc agc      912
Leu Ala Val Leu Gly Ile Thr Gly Tyr Phe Leu Met Asn Arg Arg Ser
    290                 295                 300

tgg agc ccc aca gga gaa agg ctg gaa cta gaa cca tga                  951
Trp Ser Pro Thr Gly Glu Arg Leu Glu Leu Glu Pro
305                 310                 315


<210> SEQ ID NO 4
<211> LENGTH: 316
<212> TYPE: PRT
<213> ORGANISM: Homo sapiens

<400> SEQUENCE: 4

Met Pro Arg Gly Trp Thr Ala Leu Cys Leu Leu Ser Leu Leu Pro Ser
1               5                   10                  15

Gly Phe Met Ser Leu Asp Asn Asn Gly Thr Ala Thr Pro Glu Leu Pro
            20                  25                  30

Thr Gln Gly Thr Phe Ser Asn Val Ser Thr Asn Val Ser Tyr Gln Glu
        35                  40                  45

Thr Thr Thr Pro Ser Thr Leu Gly Ser Thr Ser Leu His Pro Val Ser
    50                  55                  60

Gln His Gly Asn Glu Ala Thr Thr Asn Ile Thr Glu Thr Thr Val Lys
65                  70                  75                  80

Phe Thr Ser Thr Ser Val Ile Thr Ser Val Tyr Gly Asn Thr Asn Ser
                85                  90                  95

Ser Val Gln Ser Gln Thr Ser Val Ile Ser Thr Val Phe Thr Thr Pro
            100                 105                 110

Ala Asn Val Ser Thr Pro Glu Thr Thr Leu Lys Pro Ser Leu Ser Pro
        115                 120                 125

Gly Asn Val Ser Asp Leu Ser Thr Thr Ser Thr Ser Leu Ala Thr Ser
    130                 135                 140

Pro Thr Lys Pro Tyr Thr Ser Ser Ser Pro Ile Leu Ser Asp Ile Lys
145                 150                 155                 160

Ala Glu Ile Lys Cys Ser Gly Ile Arg Glu Val Lys Leu Thr Gln Gly
                165                 170                 175

Ile Cys Leu Glu Gln Asn Lys Thr Ser Ser Cys Ala Glu Phe Lys Lys
            180                 185                 190

Asp Arg Gly Glu Gly Leu Ala Arg Val Leu Cys Gly Glu Glu Gln Ala
        195                 200                 205

Asp Ala Asp Ala Gly Ala Gln Val Cys Ser Leu Leu Leu Ala Gln Ser
    210                 215                 220

Glu Val Arg Pro Gln Cys Leu Leu Leu Val Leu Ala Asn Arg Thr Glu
225                 230                 235                 240

Ile Ser Ser Lys Leu Gln Leu Met Lys Lys His Gln Ser Asp Leu Lys
                245                 250                 255

Lys Leu Gly Ile Leu Asp Phe Thr Glu Gln Asp Val Ala Ser His Gln
            260                 265                 270

Ser Tyr Ser Gln Lys Thr Leu Ile Ala Leu Val Thr Ser Gly Ala Leu
        275                 280                 285

Leu Ala Val Leu Gly Ile Thr Gly Tyr Phe Leu Met Asn Arg Arg Ser
    290                 295                 300

Trp Ser Pro Thr Gly Glu Arg Leu Glu Leu Glu Pro
```

```
305                 310                 315


<210> SEQ ID NO 5
<211> LENGTH: 765
<212> TYPE: DNA
<213> ORGANISM: Homo sapiens
<220> FEATURE:
<221> NAME/KEY: CDS
<222> LOCATION: (1)..(765)

<400> SEQUENCE: 5

atg tgg cag ctg ctc ctc cca act gct ctg cta ctt cta gtt tca gct       48
Met Trp Gln Leu Leu Leu Pro Thr Ala Leu Leu Leu Leu Val Ser Ala
1               5                   10                  15

ggc atg cgg act gaa gat ctc cca aag gct gtg gtg ttc ctg gag cct       96
Gly Met Arg Thr Glu Asp Leu Pro Lys Ala Val Val Phe Leu Glu Pro
            20                  25                  30

caa tgg tac agg gtg ctc gag aag gac agt gtg act ctg aag tgc cag      144
Gln Trp Tyr Arg Val Leu Glu Lys Asp Ser Val Thr Leu Lys Cys Gln
        35                  40                  45

gga gcc tac tcc cct gag gac aat tcc aca cag tgg ttt cac aat gag      192
Gly Ala Tyr Ser Pro Glu Asp Asn Ser Thr Gln Trp Phe His Asn Glu
    50                  55                  60

agc ctc atc tca agc cag gcc tcg agc tac ttc att gac gct gcc aca      240
Ser Leu Ile Ser Ser Gln Ala Ser Ser Tyr Phe Ile Asp Ala Ala Thr
65                  70                  75                  80

gtt gac gac agt gga gag tac agg tgc cag aca aac ctc tcc acc ctc      288
Val Asp Asp Ser Gly Glu Tyr Arg Cys Gln Thr Asn Leu Ser Thr Leu
                85                  90                  95

agt gac ccg gtg cag cta gaa gtc cat atc ggc tgg ctg ttg ctc cag      336
Ser Asp Pro Val Gln Leu Glu Val His Ile Gly Trp Leu Leu Leu Gln
            100                 105                 110

gcc cct cgg tgg gtg ttc aag gag gaa gac cct att cac ctg agg tgt      384
Ala Pro Arg Trp Val Phe Lys Glu Glu Asp Pro Ile His Leu Arg Cys
        115                 120                 125

cac agc tgg aag aac act gct ctg cat aag gtc aca tat tta cag aat      432
His Ser Trp Lys Asn Thr Ala Leu His Lys Val Thr Tyr Leu Gln Asn
    130                 135                 140

ggc aaa ggc agg aag tat ttt cat cat aat tct gac ttc tac att cca      480
Gly Lys Gly Arg Lys Tyr Phe His His Asn Ser Asp Phe Tyr Ile Pro
145                 150                 155                 160

aaa gcc aca ctc aaa gac agc ggc tcc tac ttc tgc agg ggg ctt gtt      528
Lys Ala Thr Leu Lys Asp Ser Gly Ser Tyr Phe Cys Arg Gly Leu Val
                165                 170                 175

ggg agt aaa aat gtg tct tca gag act gtg aac atc acc atc act caa      576
Gly Ser Lys Asn Val Ser Ser Glu Thr Val Asn Ile Thr Ile Thr Gln
            180                 185                 190

ggt ttg gca gtg tca acc atc tca tca ttc ttt cca cct ggg tac caa      624
Gly Leu Ala Val Ser Thr Ile Ser Ser Phe Phe Pro Pro Gly Tyr Gln
        195                 200                 205

gtc tct ttc tgc ttg gtg atg gta ctc ctt ttt gca gtg gac aca gga      672
Val Ser Phe Cys Leu Val Met Val Leu Leu Phe Ala Val Asp Thr Gly
    210                 215                 220

cta tat ttc tct gtg aag aca aac att cga agc tca aca aga gac tgg      720
Leu Tyr Phe Ser Val Lys Thr Asn Ile Arg Ser Ser Thr Arg Asp Trp
225                 230                 235                 240

aag gac cat aaa ttt aaa tgg aga aag gac cct caa gac aaa tga          765
Lys Asp His Lys Phe Lys Trp Arg Lys Asp Pro Gln Asp Lys
                245                 250


<210> SEQ ID NO 6
```

<211> LENGTH: 254
<212> TYPE: PRT
<213> ORGANISM: Homo sapiens

<400> SEQUENCE: 6

```
Met Trp Gln Leu Leu Leu Pro Thr Ala Leu Leu Leu Leu Val Ser Ala
1               5                   10                  15

Gly Met Arg Thr Glu Asp Leu Pro Lys Ala Val Val Phe Leu Glu Pro
            20                  25                  30

Gln Trp Tyr Arg Val Leu Glu Lys Asp Ser Val Thr Leu Lys Cys Gln
        35                  40                  45

Gly Ala Tyr Ser Pro Glu Asp Asn Ser Thr Gln Trp Phe His Asn Glu
    50                  55                  60

Ser Leu Ile Ser Ser Gln Ala Ser Ser Tyr Phe Ile Asp Ala Ala Thr
65                  70                  75                  80

Val Asp Asp Ser Gly Glu Tyr Arg Cys Gln Thr Asn Leu Ser Thr Leu
                85                  90                  95

Ser Asp Pro Val Gln Leu Glu Val His Ile Gly Trp Leu Leu Leu Gln
            100                 105                 110

Ala Pro Arg Trp Val Phe Lys Glu Glu Asp Pro Ile His Leu Arg Cys
        115                 120                 125

His Ser Trp Lys Asn Thr Ala Leu His Lys Val Thr Tyr Leu Gln Asn
    130                 135                 140

Gly Lys Gly Arg Lys Tyr Phe His His Asn Ser Asp Phe Tyr Ile Pro
145                 150                 155                 160

Lys Ala Thr Leu Lys Asp Ser Gly Ser Tyr Phe Cys Arg Gly Leu Val
                165                 170                 175

Gly Ser Lys Asn Val Ser Ser Glu Thr Val Asn Ile Thr Ile Thr Gln
            180                 185                 190

Gly Leu Ala Val Ser Thr Ile Ser Ser Phe Phe Pro Pro Gly Tyr Gln
        195                 200                 205

Val Ser Phe Cys Leu Val Met Val Leu Leu Phe Ala Val Asp Thr Gly
    210                 215                 220

Leu Tyr Phe Ser Val Lys Thr Asn Ile Arg Ser Ser Thr Arg Asp Trp
225                 230                 235                 240

Lys Asp His Lys Phe Lys Trp Arg Lys Asp Pro Gln Asp Lys
                245                 250
```

<210> SEQ ID NO 7
<211> LENGTH: 765
<212> TYPE: DNA
<213> ORGANISM: Artificial Sequence
<220> FEATURE:
<223> OTHER INFORMATION: Codon-optimized high affinity CD16

<400> SEQUENCE: 7

```
atgtggcagc tgctgctgcc aaccgccctg ctgctgctgg tgtccgccgg aatgaggaca     60

gaggacctgc caaaggccgt ggtgtttctg gagccccagt ggtacagagt gctggagaag    120

gactctgtga ccctgaagtg ccagggcgcc tattctcctg aggataacag cacacagtgg    180

tttcacaatg agagcctgat cagctcccag gcctctagct acttcatcga cgcagcaacc    240

gtggacgatt ccggagagta tcggtgccag accaacctga gcacactgtc cgatccagtg    300

cagctggagg tgcacatcgg atggctgctg ctgcaggcac ctagatgggt gtttaaggag    360

gaggacccca tccacctgcg ctgtcacagc tggaagaata ccgccctgca caaggtgaca    420

tacctgcaga acggcaaggg caggaagtac ttccaccaca attctgactt ttatatcccc    480
```

```
aaggccaccc tgaaggattc cggctcttat ttctgccgcg gcctggtggg cagcaagaac    540

gtgtcctctg agaccgtgaa tatcaccatc acacagggcc tggccgtgtc cacaatcagc    600

tccttctttc cccctggcta ccaggtgtct ttctgtctgg tcatggtgct gctgtttgcc    660

gtggacacag gcctgtattt ctccgtgaag accaacatcc ggtctagcac aagagactgg    720

aaggatcaca agttcaagtg gcggaaggac cctcaggata agtga                    765
```

<210> SEQ ID NO 8
<211> LENGTH: 7495
<212> TYPE: DNA
<213> ORGANISM: Artificial Sequence
<220> FEATURE:
<223> OTHER INFORMATION: Synthetic lentiviral vector

<400> SEQUENCE: 8

```
aatgtagtct tatgcaatac tcttgtagtc ttgcaacatg gtaacgatga gttagcaaca     60

tgccttacaa ggagagaaaa agcaccgtgc atgccgattg gtggaagtaa ggtggtacga    120

tcgtgcctta ttaggaaggc aacagacggg tctgacatgg attggacgaa ccactgaatt    180

gccgcattgc agagatattg tatttaagtg cctagctcga tacataaacg ggtctctctg    240

gttagaccag atctgagcct gggagctctc tggctaacta gggaacccac tgcttaagcc    300

tcaataaagc ttgccttgag tgcttcaagt agtgtgtgcc cgtctgttgt gtgactctgg    360

taactagaga tccctcagac ccttttagtc agtgtggaaa atctctagca gtggcgcccg    420

aacagggact tgaaagcgaa agggaaacca gaggagctct ctcgacgcag gactcggctt    480

gctgaagcgc gcacggcaag aggcgagggg cggcgactgg tgagtacgcc aaaaattttg    540

actagcggag gctagaagga gagagatggg tgcgagagcg tcagtattaa gcgggggaga    600

attagatcgc gatgggaaaa aattcggtta aggccagggg gaaagaaaaa atataaatta    660

aaacatatag tatgggcaag cagggagcta gaacgattcg cagttaatcc tggcctgtta    720

gaaacatcag aaggctgtag acaaatactg ggacagctac aaccatccct tcagacagga    780

tcagaagaac ttagatcatt atataataca gtagcaaccc tctattgtgt gcatcaaagg    840

atagagataa aagacaccaa ggaagcttta gacaagatag aggaagagca aaacaaaagt    900

aagaccaccg cacagcaagc ggccgctgat cttcagacct ggaggaggag atatgaggga    960

caattggaga agtgaattat ataaatataa agtagtaaaa attgaaccat taggagtagc   1020

acccaccaag gcaaagagaa gagtggtgca gagagaaaaa agagcagtgg gaataggagc   1080

tttgttcctt gggttcttgg gagcagcagg aagcactatg ggcgcagcgt caatgacgct   1140

gacggtacag gccagacaat tattgtctgg tatagtgcag cagcagaaca atttgctgag   1200

ggctattgag gcgcaacagc atctgttgca actcacagtc tggggcatca agcagctcca   1260

ggcaagaatc ctggctgtgg aaagatacct aaaggatcaa cagctcctgg ggatttgggg   1320

ttgctctgga aaactcattt gcaccactgc tgtgccttgg aatgctagtt ggagtaataa   1380

atctctggaa cagatttgga atcacacgac ctggatggag tgggacagag aaattaacaa   1440

ttacacaagc ttaatacact ccttaattga agaatcgcaa aaccagcaag aaaagaatga   1500

acaagaatta ttggaattag ataaatgggc aagtttgtgg aattggttta acataacaaa   1560

ttggctgtgg tatataaaat tattcataat gatagtagga ggcttggtag gtttaagaat   1620

agtttttgct gtactttcta tagtgaatag agttaggcag ggatattcac cattatcgtt   1680

tcagacccac ctcccaaccc cgaggggacc cgacaggccc gaaggaatag aagaagaagg   1740
```

-continued

```
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttgta gttattaata gtaatcaatt   1980
acggggtcat tagttcatag cccatatatg gagttccgcg ttacataact tacggtaaat   2040
ggcccgcctg gctgaccgcc caacgacccc cgcccattga cgtcaataat gacgtatgtt   2100
cccatagtaa cgccaatagg gactttccat tgacgtcaat gggtggagta tttacggtaa   2160
actgcccact tggcagtaca tcaagtgtat catatgccaa gtacgccccc tattgacgtc   2220
aatgacggta aatggcccgc ctggcattat gcccagtaca tgaccttatg ggactttcct   2280
acttggcagt acatctacgt attagtcatc gctattacca tggtgatgcg gttttggcag   2340
tacatcaatg ggcgtggata gcggtttgac tcacggggat ttccaagtct ccaccccatt   2400
gacgtcaatg ggagtttgtt ttggcaccaa aatcaacggg actttccaaa atgtcgtaac   2460
aactccgccc cattgacgca aatgggcggt aggcgtgtac ggtgggaggt ctatataagc   2520
agagctggtt tagtgaaccg tcagatccaa gtttgtacaa aaaagcaggc tgccaccatg   2580
gtgagcaagg gcgaggagct gttcaccggg gtggtgccca tcctggtcga gctggacggc   2640
gacgtaaacg gccacaagtt cagcgtgtcc ggcgagggcg agggcgatgc cacctacggc   2700
aagctgaccc tgaagttcat ctgcaccacc ggcaagctgc ccgtgccctg gcccaccctc   2760
gtgaccaccc tgacctacgg cgtgcagtgc ttcagccgct accccgacca catgaagcag   2820
cacgacttct tcaagtccgc catgcccgaa ggctacgtcc aggagcgcac catcttcttc   2880
aaggacgacg gcaactacaa gacccgcgcc gaggtgaagt tcgagggcga caccctggtg   2940
aaccgcatcg agctgaaggg catcgacttc aaggaggacg gcaacatcct ggggcacaag   3000
ctggagtaca actacaacag ccacaacgtc tatatcatgg ccgacaagca gaagaacggc   3060
atcaaggtga acttcaagat ccgccacaac atcgaggacg gcagcgtgca gctcgccgac   3120
cactaccagc agaacacccc catcggcgac ggccccgtgc tgctgcccga caaccactac   3180
ctgagcaccc agtccgccct gagcaaagac cccaacgaga agcgcgatca catggtcctg   3240
ctggagttcg tgaccgccgc cgggatcact ctcggcatgg acgagctgta caagtaaacc   3300
cagctttctt gtacaaagtg gtgataatcg aattccgata atcaacctct ggattacaaa   3360
atttgtgaaa gattgactgg tattcttaac tatgttgctc cttttacgct atgtggatac   3420
gctgctttaa tgcctttgta tcatgctatt gcttcccgta tggctttcat tttctcctcc   3480
ttgtataaat cctggttgct gtctctttat gaggagttgt ggcccgttgt caggcaacgt   3540
ggcgtggtgt gcactgtgtt tgctgacgca acccccactg gttggggcat tgccaccacc   3600
tgtcagctcc tttccgggac tttcgctttc cccctcccta ttgccacggc ggaactcatc   3660
gccgcctgcc ttgcccgctg ctggacaggg gctcggctgt tgggcactga caattccgtg   3720
gtgttgtcgg ggaagctgac gtcctttcca tggctgctcg cctgtgttgc cacctggatt   3780
ctgcgcggga cgtccttctg ctacgtccct tcggccctca atccagcgga ccttccttcc   3840
cgcggcctgc tgccggctct gcggcctctt ccgcgtcttc gccttcgccc tcagacgagt   3900
cggatctccc tttgggccgc ctccccgcat cgggaattcc cgcggttcgc tttaagacca   3960
atgacttaca aggcagctgt agatcttagc cactttttaa aagaaaaggg gggactggaa   4020
gggctaattc actcccaacg aagacaagat ctgctttttg cttgtactgg gtctctctgg   4080
ttagaccaga tctgagcctg ggagctctct ggctaactag ggaacccact gcttaagcct   4140
```

```
caataaagct tgccttgagt gcttcaagta gtgtgtgccc gtctgttgtg tgactctggt   4200
aactagagat ccctcagacc cttttagtca gtgtggaaaa tctctagcag tagtagttca   4260
tgtcatctta ttattcagta tttataactt gcaaagaaat gaatatcaga gagtgagagg   4320
aacttgttta ttgcagctta taatggttac aaataaagca atagcatcac aaatttcaca   4380
aataaagcat ttttttcact gcattctagt tgtggtttgt ccaaactcat caatgtatct   4440
tatcatgtct ggctctagct atcccgcccc taactccgcc catcccgccc ctaactccgc   4500
ccagttccgc ccattctccg ccccatggct gactaatttt ttttatttat gcagaggccg   4560
aggccgcctc ggcctctgag ctattccaga agtagtgagg aggctttttt ggaggcctag   4620
ggacgtaccc aattcgccct atagtgagtc gtattacgcg cgctcactgg ccgtcgtttt   4680
acaacgtcgt gactgggaaa accctggcgt tacccaactt aatcgccttg cagcacatcc   4740
ccctttcgcc agctggcgta atagcgaaga ggcccgcacc gatcgccctt cccaacagtt   4800
gcgcagcctg aatggcgaat gggacgcgcc ctgtagcggc gcattaagcg cggcgggtgt   4860
ggtggttacg cgcagcgtga ccgctacact tgccagcgcc ctagcgcccg ctcctttcgc   4920
tttcttccct tcctttctcg ccacgttcgc cggctttccc cgtcaagctc taaatcgggg   4980
gctcccttta gggttccgat ttagtgcttt acggcacctc gaccccaaaa aacttgatta   5040
gggtgatggt tcacgtagtg ggccatcgcc ctgatagacg gtttttcgcc ctttgacgtt   5100
ggagtccacg ttctttaata gtggactctt gttccaaact ggaacaacac tcaaccctat   5160
ctcggtctat tcttttgatt tataagggat tttgccgatt tcggcctatt ggttaaaaaa   5220
tgagctgatt taacaaaaat ttaacgcgaa ttttaacaaa atattaacgc ttacaattta   5280
ggtggcactt ttcggggaaa tgtgcgcgga acccctattt gtttattttt ctaaatacat   5340
tcaaatatgt atccgctcat gagacaataa ccctgataaa tgcttcaata atattgaaaa   5400
aggaagagta tgagtattca acatttccgt gtcgccctta ttcccttttt tgcggcattt   5460
tgccttcctg tttttgctca cccagaaacg ctggtgaaag taaaagatgc tgaagatcag   5520
ttgggtgcac gagtgggtta catcgaactg gatctcaaca gcggtaagat ccttgagagt   5580
tttcgccccg aagaacgttt tccaatgatg agcactttta aagttctgct atgtggcgcg   5640
gtattatccc gtattgacgc cgggcaagag caactcggtc gccgcataca ctattctcag   5700
aatgacttgg ttgagtactc accagtcaca gaaaagcatc ttacggatgg catgacagta   5760
agagaattat gcagtgctgc cataaccatg agtgataaca ctgcggccaa cttacttctg   5820
acaacgatcg gaggaccgaa ggagctaacc gcttttttgc acaacatggg ggatcatgta   5880
actcgccttg atcgttggga accggagctg aatgaagcca taccaaacga cgagcgtgac   5940
accacgatgc ctgtagcaat ggcaacaacg ttgcgcaaac tattaactgg cgaactactt   6000
actctagctt cccggcaaca attaatagac tggatggagg cggataaagt tgcaggacca   6060
cttctgcgct cggcccttcc ggctggctgg tttattgctg ataaatctgg agccggtgag   6120
cgtgggtctc gcggtatcat tgcagcactg gggccagatg gtaagccctc ccgtatcgta   6180
gttatctaca cgacggggag tcaggcaact atggatgaac gaaatagaca gatcgctgag   6240
ataggtgcct cactgattaa gcattggtaa ctgtcagacc aagtttactc atatatactt   6300
tagattgatt taaaacttca tttttaattt aaaaggatct aggtgaagat cctttttgat   6360
aatctcatga ccaaaatccc ttaacgtgag ttttcgttcc actgagcgtc agaccccgta   6420
gaaaagatca aaggatcttc ttgagatcct ttttttctgc gcgtaatctg ctgcttgcaa   6480
```

```
acaaaaaaac caccgctacc agcggtggtt tgtttgccgg atcaagagct accaactctt   6540

tttccgaagg taactggctt cagcagagcg cagataccaa atactgttct tctagtgtag   6600

ccgtagttag gccaccactt caagaactct gtagcaccgc ctacatacct cgctctgcta   6660

atcctgttac cagtggctgc tgccagtggc gataagtcgt gtcttaccgg gttggactca   6720

agacgatagt taccggataa ggcgcagcgg tcgggctgaa cggggggttc gtgcacacag   6780

cccagcttgg agcgaacgac ctacaccgaa ctgagatacc tacagcgtga gctatgagaa   6840

agcgccacgc ttcccgaaga gagaaaggcg gacaggtatc cggtaagcgg cagggtcgga   6900

acaggagagc gcacgaggga gcttccaggg ggaaacgcct ggtatcttta tagtcctgtc   6960

gggtttcgcc acctctgact tgagcgtcga tttttgtgat gctcgtcagg ggggcggagc   7020

ctatggaaaa acgccagcaa cgcggccttt ttacggttcc tggccttttg ctggcctttt   7080

gctcacatgt tctttcctgc gttatcccct gattctgtgg ataaccgtat taccgccttt   7140

gagtgagctg ataccgctcg ccgcagccga acgaccgagc gcagcgagtc agtgagcgag   7200

gaagcggaag agcgcccaat acgcaaaccg cctctccccg cgcgttggcc gattcattaa   7260

tgcagctggc acgacaggtt tcccgactgg aaagcgggca gtgagcgcaa cgcaattaat   7320

gtgagttagc tcactcatta ggcaccccag gctttacact ttatgcttcc ggctcgtatg   7380

ttgtgtggaa ttgtgagcgg ataacaattt cacacaggaa acagctatga ccatgattac   7440

gccaagcgcg caattaaccc tcactaaagg gaacaaaagc tggagctgca agctt        7495
```

<210> SEQ ID NO 9
<211> LENGTH: 8085
<212> TYPE: DNA
<213> ORGANISM: Artificial Sequence
<220> FEATURE:
<223> OTHER INFORMATION: Synthetic lentiviral vector

<400> SEQUENCE: 9

```
aatgtagtct tatgcaatac tcttgtagtc ttgcaacatg gtaacgatga gttagcaaca     60

tgccttacaa ggagagaaaa agcaccgtgc atgccgattg gtggaagtaa ggtggtacga    120

tcgtgcctta ttaggaaggc aacagacggg tctgacatgg attggacgaa ccactgaatt    180

gccgcattgc agagatattg tatttaagtg cctagctcga tacataaacg ggtctctctg    240

gttagaccag atctgagcct gggagctctc tggctaacta gggaacccac tgcttaagcc    300

tcaataaagc ttgccttgag tgcttcaagt agtgtgtgcc cgtctgttgt gtgactctgg    360

taactagaga tccctcagac ccttttagtc agtgtggaaa atctctagca gtggcgcccg    420

aacagggact tgaaagcgaa agggaaacca gaggagctct ctcgacgcag gactcggctt    480

gctgaagcgc gcacggcaag aggcgagggg cggcgactgg tgagtacgcc aaaaattttg    540

actagcggag gctagaagga gagagatggg tgcgagagcg tcagtattaa gcgggggaga    600

attagatcgc gatgggaaaa aattcggtta aggccagggg gaaagaaaaa atataaatta    660

aaacatatag tatgggcaag cagggagcta gaacgattcg cagttaatcc tggcctgtta    720

gaaacatcag aaggctgtag acaaatactg ggacagctac aaccatccct tcagacagga    780

tcagaagaac ttagatcatt atataataca gtagcaaccc tctattgtgt gcatcaaagg    840

atagagataa aagacaccaa ggaagcttta gacaagatag aggaagagca aaacaaaagt    900

aagaccaccg cacagcaagc ggccgctgat cttcagacct ggaggaggag atatgaggga    960

caattggaga agtgaattat ataaatataa agtagtaaaa attgaaccat taggagtagc   1020

acccaccaag gcaaagagaa gagtggtgca gagagaaaaa agagcagtgg gaataggagc   1080
```

```
tttgttcctt gggttcttgg gagcagcagg aagcactatg ggcgcagcgt caatgacgct   1140
gacggtacag gccagacaat tattgtctgg tatagtgcag cagcagaaca atttgctgag   1200
ggctattgag gcgcaacagc atctgttgca actcacagtc tggggcatca agcagctcca   1260
ggcaagaatc ctggctgtgg aaagatacct aaaggatcaa cagctcctgg ggatttgggg   1320
ttgctctgga aaactcattt gcaccactgc tgtgccttgg aatgctagtt ggagtaataa   1380
atctctggaa cagatttgga atcacacgac ctggatggag tgggacagag aaattaacaa   1440
ttacacaagc ttaatacact ccttaattga agaatcgcaa aaccagcaag aaaagaatga   1500
acaagaatta ttggaattag ataaatgggc aagtttgtgg aattggttta acataacaaa   1560
ttggctgtgg tatataaaat tattcataat gatagtagga ggcttggtag gtttaagaat   1620
agtttttgct gtactttcta tagtgaatag agttaggcag ggatattcac cattatcgtt   1680
tcagacccac ctcccaaccc cgaggggacc cgacaggccc gaaggaatag aagaagaagg   1740
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttggg ctccggtgcc cgtcagtggg   1980
cagagcgcac atcgcccaca gtccccgaga agttgggggg aggggtcggc aattgaaccg   2040
gtgcctagag aaggtggcgc ggggtaaact gggaaagtga tgtcgtgtac tggctccgcc   2100
tttttcccga gggtggggga gaaccgtata taagtgcagt agtcgccgtg aacgttcttt   2160
ttcgcaacgg gtttgccgcc agaacacagg taagtgccgt gtgtggttcc cgcgggcctg   2220
gcctctttac gggttatggc ccttgcgtgc cttgaattac ttccacctgg ctgcagtacg   2280
tgattcttga tcccgagctt cgggttggaa gtgggtggga gagttcgagg ccttgcgctt   2340
aaggagcccc ttcgcctcgt gcttgagttg aggcctggcc tgggcgctgg ggccgccgcg   2400
tgcgaatctg gtggcacctt cgcgcctgtc tcgctgcttt cgataagtct ctagccattt   2460
aaaatttttg atgacctgct gcgacgcttt ttttctggca agatagtctt gtaaatgcgg   2520
gccaagatct gcacactggt atttcggttt ttggggccgc gggcggcgac ggggcccgtg   2580
cgtcccagcg cacatgttcg gcgaggcggg gcctgcgagc gcggccaccg agaatcggac   2640
gggggtagtc tcaagctggc cggcctgctc tggtgcctgg tctcgcgccg ccgtgtatcg   2700
ccccgccctg ggcggcaagg ctggcccggt cggcaccagt tgcgtgagcg gaaagatggc   2760
cgcttcccgg ccctgctgca gggagctcaa aatggaggac gcggcgctcg ggagagcggg   2820
cgggtgagtc acccacacaa aggaaaaggg cctttccgtc ctcagccgtc gcttcatgtg   2880
actccacgga gtaccgggcg ccgtccaggc acctcgatta gttctcgagc ttttggagta   2940
cgtcgtcttt aggttggggg gaggggtttt atgcgatgga gtttccccac actgagtggg   3000
tggagactga agttaggcca gcttggcact tgatgtaatt ctccttggaa tttgcccttt   3060
ttgagtttgg atcttggttc attctcaagc ctcagacagt ggttcaaagt ttttttcttc   3120
catttcaggt gtcgtgacaa gtttgtacaa aaaagcaggc tgccaccatg gtgagcaagg   3180
gcgaggagct gttcaccggg gtggtgccca tcctggtcga gctggacggc gacgtaaacg   3240
gccacaagtt cagcgtgtcc ggcgagggcg agggcgatgc cacctacggc aagctgaccc   3300
tgaagttcat ctgcaccacc ggcaagctgc ccgtgccctg gcccaccctc gtgaccaccc   3360
tgacctacgg cgtgcagtgc ttcagccgct accccgacca catgaagcag cacgacttct   3420
```

```
tcaagtccgc catgcccgaa ggctacgtcc aggagcgcac catcttcttc aaggacgacg   3480
gcaactacaa gacccgcgcc gaggtgaagt tcgagggcga caccctggtg aaccgcatcg   3540
agctgaaggg catcgacttc aaggaggacg gcaacatcct ggggcacaag ctggagtaca   3600
actacaacag ccacaacgtc tatatcatgg ccgacaagca gaagaacggc atcaaggtga   3660
acttcaagat ccgccacaac atcgaggacg gcagcgtgca gctcgccgac cactaccagc   3720
agaacacccc catcggcgac ggccccgtgc tgctgcccga caaccactac ctgagcaccc   3780
agtccgccct gagcaaagac cccaacgaga agcgcgatca catggtcctg ctggagttcg   3840
tgaccgccgc cgggatcact ctcggcatgg acgagctgta caagtaaacc cagctttctt   3900
gtacaaagtg gtgataatcg aattccgata atcaacctct ggattacaaa atttgtgaaa   3960
gattgactgg tattcttaac tatgttgctc cttttacgct atgtggatac gctgctttaa   4020
tgcctttgta tcatgctatt gcttcccgta tggctttcat tttctcctcc ttgtataaat   4080
cctggttgct gtctctttat gaggagttgt ggcccgttgt caggcaacgt ggcgtggtgt   4140
gcactgtgtt tgctgacgca acccccactg gttggggcat tgccaccacc tgtcagctcc   4200
tttccgggac tttcgctttc cccctcccta ttgccacggc ggaactcatc gccgcctgcc   4260
ttgcccgctg ctggacaggg gctcggctgt tgggcactga caattccgtg gtgttgtcgg   4320
ggaagctgac gtcctttcca tggctgctcg cctgtgttgc cacctggatt ctgcgcggga   4380
cgtccttctg ctacgtccct tcggccctca atccagcgga ccttccttcc cgcggcctgc   4440
tgccggctct gcggcctctt ccgcgtcttc gccttcgccc tcagacgagt cggatctccc   4500
tttgggccgc ctccccgcat cgggaattcc cgcggttcgc tttaagacca atgacttaca   4560
aggcagctgt agatcttagc cactttttaa aagaaaaggg gggactggaa gggctaattc   4620
actcccaacg aagacaagat ctgctttttg cttgtactgg gtctctctgg ttagaccaga   4680
tctgagcctg ggagctctct ggctaactag ggaacccact gcttaagcct caataaagct   4740
tgccttgagt gcttcaagta gtgtgtgccc gtctgttgtg tgactctggt aactagagat   4800
ccctcagacc cttttagtca gtgtggaaaa tctctagcag tagtagttca tgtcatctta   4860
ttattcagta tttataactt gcaaagaaat gaatatcaga gagtgagagg aacttgttta   4920
ttgcagctta taatggttac aaataaagca atagcatcac aaatttcaca aataaagcat   4980
ttttttcact gcattctagt tgtggtttgt ccaaactcat caatgtatct tatcatgtct   5040
ggctctagct atcccgcccc taactccgcc catcccgccc ctaactccgc ccagttccgc   5100
ccattctccg ccccatggct gactaatttt ttttatttat gcagaggccg aggccgcctc   5160
ggcctctgag ctattccaga agtagtgagg aggctttttt ggaggcctag ggacgtaccc   5220
aattcgccct atagtgagtc gtattacgcg cgctcactgg ccgtcgtttt acaacgtcgt   5280
gactgggaaa accctggcgt tacccaactt aatcgccttg cagcacatcc ccctttcgcc   5340
agctggcgta atagcgaaga ggcccgcacc gatcgccctt cccaacagtt gcgcagcctg   5400
aatggcgaat gggacgcgcc ctgtagcggc gcattaagcg cggcgggtgt ggtggttacg   5460
cgcagcgtga ccgctacact tgccagcgcc ctagcgcccg ctcctttcgc tttcttccct   5520
tcctttctcg ccacgttcgc cggctttccc cgtcaagctc taaatcgggg gctcccttta   5580
gggttccgat ttagtgcttt acggcacctc gaccccaaaa aacttgatta gggtgatggt   5640
tcacgtagtg ggccatcgcc ctgatagacg gtttttcgcc ctttgacgtt ggagtccacg   5700
ttctttaata gtggactctt gttccaaact ggaacaacac tcaaccctat ctcggtctat   5760
tcttttgatt tataagggat ttgccgattt cggcctattg gttaaaaaa tgagctgatt   5820
```

```
taacaaaaat ttaacgcgaa ttttaacaaa atattaacgc ttacaattta ggtggcactt   5880
ttcggggaaa tgtgcgcgga acccctattt gtttattttt ctaaatacat tcaaatatgt   5940
atccgctcat gagacaataa ccctgataaa tgcttcaata atattgaaaa aggaagagta   6000
tgagtattca acatttccgt gtcgccctta ttcccttttt tgcggcattt tgccttcctg   6060
tttttgctca cccagaaacg ctggtgaaag taaaagatgc tgaagatcag ttgggtgcac   6120
gagtgggtta catcgaactg gatctcaaca gcggtaagat ccttgagagt tttcgccccg   6180
aagaacgttt tccaatgatg agcactttta aagttctgct atgtggcgcg gtattatccc   6240
gtattgacgc cgggcaagag caactcggtc gccgcataca ctattctcag aatgacttgg   6300
ttgagtactc accagtcaca gaaaagcatc ttacggatgg catgacagta agagaattat   6360
gcagtgctgc cataaccatg agtgataaca ctgcggccaa cttacttctg acaacgatcg   6420
gaggaccgaa ggagctaacc gcttttttgc acaacatggg ggatcatgta actcgccttg   6480
atcgttggga accggagctg aatgaagcca taccaaacga cgagcgtgac accacgatgc   6540
ctgtagcaat ggcaacaacg ttgcgcaaac tattaactgg cgaactactt actctagctt   6600
cccggcaaca attaatagac tggatggagg cggataaagt tgcaggacca cttctgcgct   6660
cggcccttcc ggctggctgg tttattgctg ataaatctgg agccggtgag cgtgggtctc   6720
gcggtatcat tgcagcactg gggccagatg gtaagccctc ccgtatcgta gttatctaca   6780
cgacggggag tcaggcaact atggatgaac gaaatagaca gatcgctgag ataggtgcct   6840
cactgattaa gcattggtaa ctgtcagacc aagtttactc atatatactt tagattgatt   6900
taaaacttca tttttaattt aaaaggatct aggtgaagat cctttttgat aatctcatga   6960
ccaaaatccc ttaacgtgag ttttcgttcc actgagcgtc agaccccgta gaaaagatca   7020
aaggatcttc ttgagatcct ttttttctgc gcgtaatctg ctgcttgcaa acaaaaaaac   7080
caccgctacc agcggtggtt tgtttgccgg atcaagagct accaactctt tttccgaagg   7140
taactggctt cagcagagcg cagataccaa atactgttct tctagtgtag ccgtagttag   7200
gccaccactt caagaactct gtagcaccgc ctacatacct cgctctgcta atcctgttac   7260
cagtggctgc tgccagtggc gataagtcgt gtcttaccgg gttggactca agacgatagt   7320
taccggataa ggcgcagcgg tcgggctgaa cggggggttc gtgcacacag cccagcttgg   7380
agcgaacgac ctacaccgaa ctgagatacc tacagcgtga gctatgagaa agcgccacgc   7440
ttcccgaaga gagaaaggcg gacaggtatc cggtaagcgg cagggtcgga acaggagagc   7500
gcacgaggga gcttccaggg ggaaacgcct ggtatcttta tagtcctgtc gggtttcgcc   7560
acctctgact tgagcgtcga tttttgtgat gctcgtcagg ggggcggagc ctatggaaaa   7620
acgccagcaa cgcggccttt ttacggttcc tggccttttg ctggcctttt gctcacatgt   7680
tctttcctgc gttatcccct gattctgtgg ataaccgtat taccgccttt gagtgagctg   7740
ataccgctcg ccgcagccga acgaccgagc gcagcgagtc agtgagcgag gaagcggaag   7800
agcgcccaat acgcaaaccg cctctccccg cgcgttggcc gattcattaa tgcagctggc   7860
acgacaggtt tcccgactgg aaagcgggca gtgagcgcaa cgcaattaat gtgagttagc   7920
tcactcatta ggcaccccag gctttacact ttatgcttcc ggctcgtatg ttgtgtggaa   7980
ttgtgagcgg ataacaattt cacacaggaa acagctatga ccatgattac gccaagcgcg   8040
caattaaccc tcactaaagg gaacaaaagc tggagctgca agctt                   8085
```

<210> SEQ ID NO 10

<211> LENGTH: 7138
<212> TYPE: DNA
<213> ORGANISM: Artificial Sequence
<220> FEATURE:
<223> OTHER INFORMATION: Synthetic lentiviral vector

<400> SEQUENCE: 10

```
aatgtagtct tatgcaatac tcttgtagtc ttgcaacatg gtaacgatga gttagcaaca     60
tgccttacaa ggagagaaaa agcaccgtgc atgccgattg gtggaagtaa ggtggtacga    120
tcgtgcctta ttaggaaggc aacagacggg tctgacatgg attggacgaa ccactgaatt    180
gccgcattgc agagatattg tatttaagtg cctagctcga tacataaacg ggtctctctg    240
gttagaccag atctgagcct gggagctctc tggctaacta gggaacccac tgcttaagcc    300
tcaataaagc ttgccttgag tgcttcaagt agtgtgtgcc cgtctgttgt gtgactctgg    360
taactagaga tccctcagac ccttttagtc agtgtggaaa atctctagca gtggcgcccg    420
aacagggact tgaaagcgaa agggaaacca gaggagctct ctcgacgcag gactcggctt    480
gctgaagcgc gcacggcaag aggcgagggg cggcgactgg tgagtacgcc aaaaattttg    540
actagcggag gctagaagga gagagatggg tgcgagagcg tcagtattaa gcgggggaga    600
attagatcgc gatgggaaaa aattcggtta aggccagggg gaaagaaaaa atataaatta    660
aaacatatag tatgggcaag cagggagcta gaacgattcg cagttaatcc tggcctgtta    720
gaaacatcag aaggctgtag acaaatactg ggacagctac aaccatccct tcagacagga    780
tcagaagaac ttagatcatt atataataca gtagcaaccc tctattgtgt gcatcaaagg    840
atagagataa aagacaccaa ggaagcttta gacaagatag aggaagagca aaacaaaagt    900
aagaccaccg cacagcaagc ggccgctgat cttcagacct ggaggaggag atatgaggga    960
caattggaga agtgaattat ataaatataa agtagtaaaa attgaaccat taggagtagc   1020
acccaccaag gcaaagagaa gagtggtgca gagagaaaaa agagcagtgg gaataggagc   1080
tttgttcctt gggttcttgg gagcagcagg aagcactatg ggcgcagcgt caatgacgct   1140
gacggtacag gccagacaat tattgtctgg tatagtgcag cagcagaaca atttgctgag   1200
ggctattgag gcgcaacagc atctgttgca actcacagtc tggggcatca agcagctcca   1260
ggcaagaatc ctggctgtgg aaagatacct aaaggatcaa cagctcctgg ggatttgggg   1320
ttgctctgga aaactcattt gcaccactgc tgtgccttgg aatgctagtt ggagtaataa   1380
atctctggaa cagatttgga atcacacgac ctggatggag tgggacagag aaattaacaa   1440
ttacacaagc ttaatacact ccttaattga agaatcgcaa aaccagcaag aaaagaatga   1500
acaagaatta ttggaattag ataaatgggc aagtttgtgg aattggttta acataacaaa   1560
ttggctgtgg tatataaaat tattcataat gatagtagga ggcttggtag gtttaagaat   1620
agtttttgct gtactttcta tagtgaatag agttaggcag ggatattcac cattatcgtt   1680
tcagacccac ctcccaaccc cgaggggacc cgacaggccc gaaggaatag aagaagaagg   1740
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttggg ctccggtgcc cgtcagtggg   1980
cagagcgcac atcgcccaca gtccccgaga agttgggggg aggggtcggc aattgatccg   2040
gtgcctagag aaggtggcgc ggggtaaact gggaaagtga tgtcgtgtac tggctccgcc   2100
tttttcccga gggtggggga gaaccgtata taagtgcagt agtcgccgtg aacgttcttt   2160
```

```
ttcgcaacgg gtttgccgcc agaacacagg caagtttgta caaaaaagca ggctgccacc   2220
atggtgagca agggcgagga gctgttcacc ggggtggtgc ccatcctggt cgagctggac   2280
ggcgacgtaa acggccacaa gttcagcgtg tccggcgagg gcgagggcga tgccacctac   2340
ggcaagctga ccctgaagtt catctgcacc accggcaagc tgcccgtgcc ctggcccacc   2400
ctcgtgacca ccctgaccta cggcgtgcag tgcttcagcc gctaccccga ccacatgaag   2460
cagcacgact tcttcaagtc cgccatgccc gaaggctacg tccaggagcg caccatcttc   2520
ttcaaggacg acggcaacta caagacccgc gccgaggtga agttcgaggg cgacaccctg   2580
gtgaaccgca tcgagctgaa gggcatcgac ttcaaggagg acggcaacat cctggggcac   2640
aagctggagt acaactacaa cagccacaac gtctatatca tggccgacaa gcagaagaac   2700
ggcatcaagg tgaacttcaa gatccgccac aacatcgagg acggcagcgt gcagctcgcc   2760
gaccactacc agcagaacac ccccatcggc gacggccccg tgctgctgcc cgacaaccac   2820
tacctgagca cccagtccgc cctgagcaaa gaccccaacg agaagcgcga tcacatggtc   2880
ctgctggagt tcgtgaccgc cgccgggatc actctcggca tggacgagct gtacaagtaa   2940
acccagcttt cttgtacaaa gtggtgataa tcgaattccg ataatcaacc tctggattac   3000
aaaatttgtg aaagattgac tggtattctt aactatgttg ctccttttac gctatgtgga   3060
tacgctgctt taatgccttt gtatcatgct attgcttccc gtatggcttt cattttctcc   3120
tccttgtata aatcctggtt gctgtctctt tatgaggagt tgtggcccgt tgtcaggcaa   3180
cgtggcgtgg tgtgcactgt gtttgctgac gcaaccccca ctggttgggg cattgccacc   3240
acctgtcagc tcctttccgg gactttcgct ttccccctcc ctattgccac ggcggaactc   3300
atcgccgcct gccttgcccg ctgctggaca ggggctcggc tgttgggcac tgacaattcc   3360
gtggtgttgt cggggaagct gacgtccttt ccatggctgc tcgcctgtgt tgccacctgg   3420
attctgcgcg ggacgtcctt ctgctacgtc ccttcggccc tcaatccagc ggaccttcct   3480
tcccgcggcc tgctgccggc tctgcggcct cttccgcgtc ttcgccttcg ccctcagacg   3540
agtcggatct ccctttgggc cgcctccccg catcgggaat tcccgcggtt cgctttaaga   3600
ccaatgactt acaaggcagc tgtagatctt agccactttt taaaagaaaa ggggggactg   3660
gaagggctaa ttcactccca acgaagacaa gatctgcttt ttgcttgtac tgggtctctc   3720
tggttagacc agatctgagc ctgggagctc tctggctaac tagggaaccc actgcttaag   3780
cctcaataaa gcttgccttg agtgcttcaa gtagtgtgtg cccgtctgtt gtgtgactct   3840
ggtaactaga gatccctcag acccttttag tcagtgtgga aaatctctag cagtagtagt   3900
tcatgtcatc ttattattca gtatttataa cttgcaaaga aatgaatatc agagagtgag   3960
aggaacttgt ttattgcagc ttataatggt tacaaataaa gcaatagcat cacaaatttc   4020
acaaataaag catttttttc actgcattct agttgtggtt tgtccaaact catcaatgta   4080
tcttatcatg tctggctcta gctatcccgc ccctaactcc gcccatcccg cccctaactc   4140
cgcccagttc cgcccattct ccgccccatg gctgactaat tttttttatt tatgcagagg   4200
ccgaggccgc ctcggcctct gagctattcc agaagtagtg aggaggcttt tttggaggcc   4260
tagggacgta cccaattcgc cctatagtga gtcgtattac gcgcgctcac tggccgtcgt   4320
tttacaacgt cgtgactggg aaaaccctgg cgttacccaa cttaatcgcc ttgcagcaca   4380
tccccctttc gccagctggc gtaatagcga agaggcccgc accgatcgcc cttcccaaca   4440
gttgcgcagc ctgaatggcg aatgggacgc gccctgtagc ggcgcattaa gcgcggcggg   4500
```

```
tgtggtggtt acgcgcagcg tgaccgctac acttgccagc gccctagcgc ccgctccttt   4560
cgctttcttc ccttcctttc tcgccacgtt cgccggcttt ccccgtcaag ctctaaatcg   4620
ggggctccct ttagggttcc gatttagtgc tttacggcac ctcgacccca aaaaacttga   4680
ttagggtgat ggttcacgta gtgggccatc gccctgatag acggtttttc gccctttgac   4740
gttggagtcc acgttcttta atagtggact cttgttccaa actggaacaa cactcaaccc   4800
tatctcggtc tattcttttg atttataagg gattttgccg atttcggcct attggttaaa   4860
aaatgagctg atttaacaaa aatttaacgc gaattttaac aaaatattaa cgcttacaat   4920
ttaggtggca cttttcgggg aaatgtgcgc ggaaccccta tttgtttatt tttctaaata   4980
cattcaaata tgtatccgct catgagacaa taaccctgat aaatgcttca ataatattga   5040
aaaaggaaga gtatgagtat tcaacatttc cgtgtcgccc ttattccctt ttttgcggca   5100
ttttgccttc ctgtttttgc tcacccagaa acgctggtga aagtaaaaga tgctgaagat   5160
cagttgggtg cacgagtggg ttacatcgaa ctggatctca acagcggtaa gatccttgag   5220
agttttcgcc ccgaagaacg ttttccaatg atgagcactt ttaaagttct gctatgtggc   5280
gcggtattat cccgtattga cgccgggcaa gagcaactcg gtcgccgcat acactattct   5340
cagaatgact tggttgagta ctcaccagtc acagaaaagc atcttacgga tggcatgaca   5400
gtaagagaat tatgcagtgc tgccataacc atgagtgata acactgcggc caacttactt   5460
ctgacaacga tcggaggacc gaaggagcta accgcttttt tgcacaacat gggggatcat   5520
gtaactcgcc ttgatcgttg ggaaccggag ctgaatgaag ccataccaaa cgacgagcgt   5580
gacaccacga tgcctgtagc aatggcaaca acgttgcgca aactattaac tggcgaacta   5640
cttactctag cttcccggca acaattaata gactggatgg aggcggataa agttgcagga   5700
ccacttctgc gctcggccct tccggctggc tggtttattg ctgataaatc tggagccggt   5760
gagcgtgggt ctcgcggtat cattgcagca ctggggccag atggtaagcc ctcccgtatc   5820
gtagttatct acacgacggg gagtcaggca actatggatg aacgaaatag acagatcgct   5880
gagataggtg cctcactgat taagcattgg taactgtcag accaagttta ctcatatata   5940
ctttagattg atttaaaact tcatttttaa tttaaaagga tctaggtgaa gatccttttt   6000
gataatctca tgaccaaaat cccttaacgt gagttttcgt tccactgagc gtcagacccc   6060
gtagaaaaga tcaaaggatc ttcttgagat cctttttttc tgcgcgtaat ctgctgcttg   6120
caaacaaaaa aaccaccgct accagcggtg gtttgtttgc cggatcaaga gctaccaact   6180
ctttttccga aggtaactgg cttcagcaga gcgcagatac caaatactgt tcttctagtg   6240
tagccgtagt taggccacca cttcaagaac tctgtagcac cgcctacata cctcgctctg   6300
ctaatcctgt taccagtggc tgctgccagt ggcgataagt cgtgtcttac cgggttggac   6360
tcaagacgat agttaccgga taaggcgcag cggtcgggct gaacgggggg ttcgtgcaca   6420
cagcccagct tggagcgaac gacctacacc gaactgagat acctacagcg tgagctatga   6480
gaaagcgcca cgcttcccga agagagaaag gcggacaggt atccggtaag cggcagggtc   6540
ggaacaggag agcgcacgag ggagcttcca gggggaaacg cctggtatct ttatagtcct   6600
gtcgggtttc gccacctctg acttgagcgt cgatttttgt gatgctcgtc aggggggcgg   6660
agcctatgga aaaacgccag caacgcggcc tttttacggt tcctggcctt ttgctggcct   6720
tttgctcaca tgttctttcc tgcgttatcc cctgattctg tggataaccg tattaccgcc   6780
tttgagtgag ctgataccgc tcgccgcagc cgaacgaccg agcgcagcga gtcagtgagc   6840
gaggaagcgg aagagcgccc aatacgcaaa ccgcctctcc ccgcgcgttg gccgattcat   6900
```

```
taatgcagct ggcacgacag gtttcccgac tggaaagcgg gcagtgagcg caacgcaatt   6960

aatgtgagtt agctcactca ttaggcaccc caggctttac actttatgct tccggctcgt   7020

atgttgtgtg gaattgtgag cggataacaa tttcacacag gaaacagcta tgaccatgat   7080

tacgccaagc gcgcaattaa ccctcactaa agggaacaaa agctggagct gcaagctt     7138
```

<210> SEQ ID NO 11
<211> LENGTH: 8639
<212> TYPE: DNA
<213> ORGANISM: Artificial Sequence
<220> FEATURE:
<223> OTHER INFORMATION: Synthetic lentiviral vector

<400> SEQUENCE: 11

```
aatgtagtct tatgcaatac tcttgtagtc ttgcaacatg gtaacgatga gttagcaaca     60

tgccttacaa ggagagaaaa agcaccgtgc atgccgattg gtggaagtaa ggtggtacga    120

tcgtgcctta ttaggaaggc aacagacggg tctgacatgg attggacgaa ccactgaatt    180

gccgcattgc agagatattg tatttaagtg cctagctcga tacataaacg ggtctctctg    240

gttagaccag atctgagcct gggagctctc tggctaacta gggaacccac tgcttaagcc    300

tcaataaagc ttgccttgag tgcttcaagt agtgtgtgcc cgtctgttgt gtgactctgg    360

taactagaga tccctcagac ccttttagtc agtgtggaaa atctctagca gtggcgcccg    420

aacagggact tgaaagcgaa agggaaacca gaggagctct ctcgacgcag gactcggctt    480

gctgaagcgc gcacggcaag aggcgagggg cggcgactgg tgagtacgcc aaaaattttg    540

actagcggag gctagaagga gagagatggg tgcgagagcg tcagtattaa gcgggggaga    600

attagatcgc gatgggaaaa aattcggtta aggccagggg gaaagaaaaa atataaatta    660

aaacatatag tatgggcaag cagggagcta gaacgattcg cagttaatcc tggcctgtta    720

gaaacatcag aaggctgtag acaaatactg ggacagctac aaccatccct tcagacagga    780

tcagaagaac ttagatcatt atataataca gtagcaaccc tctattgtgt gcatcaaagg    840

atagagataa aagacaccaa ggaagcttta gacaagatag aggaagagca aaacaaaagt    900

aagaccaccg cacagcaagc ggccgctgat cttcagacct ggaggaggag atatgaggga    960

caattggaga agtgaattat ataaatataa agtagtaaaa attgaaccat taggagtagc   1020

acccaccaag gcaaagagaa gagtggtgca gagagaaaaa agagcagtgg gaataggagc   1080

tttgttcctt gggttcttgg gagcagcagg aagcactatg ggcgcagcgt caatgacgct   1140

gacggtacag gccagacaat tattgtctgg tatagtgcag cagcagaaca atttgctgag   1200

ggctattgag gcgcaacagc atctgttgca actcacagtc tggggcatca agcagctcca   1260

ggcaagaatc ctggctgtgg aaagatacct aaaggatcaa cagctcctgg ggatttgggg   1320

ttgctctgga aaactcattt gcaccactgc tgtgccttgg aatgctagtt ggagtaataa   1380

atctctggaa cagatttgga atcacacgac ctggatggag tgggacagag aaattaacaa   1440

ttacacaagc ttaatacact ccttaattga agaatcgcaa aaccagcaag aaaagaatga   1500

acaagaatta ttggaattag ataaatgggc aagtttgtgg aattggttta acataacaaa   1560

ttggctgtgg tatataaaat tattcataat gatagtagga ggcttggtag gtttaagaat   1620

agtttttgct gtactttcta tagtgaatag agttaggcag ggatattcac cattatcgtt   1680

tcagacccac ctcccaaccc cgaggggacc cgacaggccc gaaggaatag aagaagaagg   1740

tggagagaga gacagagaca gatccattcg attagtgaac ggatctcgac ggtatcgcta   1800
```

-continued

```
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttgct cgacattgat tattgactag   1980
ttattaatag taatcaatta cggggtcatt agttcatagc ccatatatgg agttccgcgt   2040
tacataactt acggtaaatg gcccgcctgg ctgaccgccc aacgaccccc gcccattgac   2100
gtcaataatg acgtatgttc ccatagtaac gccaataggg actttccatt gacgtcaatg   2160
ggtggagtat ttacggtaaa ctgcccactt ggcagtacat caagtgtatc atatgccaag   2220
tacgccccct attgacgtca atgacggtaa atggcccgcc tggcattatg cccagtacat   2280
gaccttatgg gactttccta cttggcagta catctacgta ttagtcatcg ctattaccat   2340
ggtcgaggtg agccccacgt tctgcttcac tctccccatc tcccccccct ccccaccccc   2400
aattttgtat ttatttattt tttaattatt ttgtgcagcg atgggggcgg gggggggggg   2460
ggggcgcgcg ccaggcgggg cggggcgggg cgaggggcgg ggcggggcga ggcggagagg   2520
tgcggcggca gccaatcaga gcggcgcgct ccgaaagttt ccttttatgg cgaggcggcg   2580
gcggcggcgg ccctataaaa agcgaagcgc gcggcgggcg ggagtcgctg cgcgctgcct   2640
tcgccccgtg ccccgctccg ccgccgcctc gcgccgcccg ccccggctct gactgaccgc   2700
gttactccca caggtgagcg ggcgggacgg cccttctcct ccgggctgta attagcgctt   2760
ggtttaatga cggcttgttt cttttctgtg gctgcgtgaa agccttgagg ggctccggga   2820
gggccctttg tgcgggggga gcggctcggg gggtgcgtgc gtgtgtgtgt gcgtggggag   2880
cgccgcgtgc ggctccgcgc tgcccggcgg ctgtgagcgc tgcgggcgcg gcgcggggct   2940
ttgtgcgctc cgcagtgtgc gcgaggggag cgcggccggg ggcggtgccc cgcggtgcgg   3000
ggggggctgc gaggggaaca aaggctgcgt gcggggtgtg tgcgtggggg ggtgagcagg   3060
gggtgtgggc gcgtcggtcg ggctgcaacc ccccctgcac ccccctcccc gagttgctga   3120
gcacggcccg gcttcgggtg cggggctccg tacggggcgt ggcgcggggc tcgccgtgcc   3180
gggcgggggg tggcggcagg tgggggtgcc gggcggggcg gggccgcctc gggccgggga   3240
gggctcgggg gaggggcgcg gcggcccccg gagcgccggc ggctgtcgag gcgcggcgag   3300
ccgcagccat tgccttttat ggtaatcgtg cgagagggcg cagggacttc ctttgtccca   3360
aatctgtgcg gagccgaaat ctgggaggcg ccgccgcacc ccctctagcg ggcgcggggc   3420
gaagcggtgc ggcgccggca ggaaggaaat gggcggggag ggccttcgtg cgtcgccgcg   3480
ccgccgtccc cttctccctc tccagcctcg gggctgtccg cggggggacg gctgccttcg   3540
ggggggacgg ggcagggcgg ggttcggctt ctggcgtgtg accggcggct ctagagcctc   3600
tgctaaccat gttcatgcct tcttcttttt cctacagctc ctgggcaacg tgctggttat   3660
tgtgctgtct catcattttg gcaaagaatt gcaagtttgt acaaaaaagc aggctgccac   3720
catggtgagc aagggcgagg agctgttcac cggggtggtg cccatcctgg tcgagctgga   3780
cggcgacgta aacggccaca agttcagcgt gtccggcgag ggcgagggcg atgccaccta   3840
cggcaagctg accctgaagt tcatctgcac caccggcaag ctgcccgtgc cctggcccac   3900
cctcgtgacc accctgacct acggcgtgca gtgcttcagc cgctaccccg accacatgaa   3960
gcagcacgac ttcttcaagt ccgccatgcc cgaaggctac gtccaggagc gcaccatctt   4020
cttcaaggac gacggcaact acaagacccg cgccgaggtg aagttcgagg gcgacaccct   4080
ggtgaaccgc atcgagctga agggcatcga cttcaaggag gacggcaaca tcctggggca   4140
caagctggag tacaactaca acagccacaa cgtctatatc atggccgaca agcagaagaa   4200
```

```
cggcatcaag gtgaacttca agatccgcca caacatcgag gacggcagcg tgcagctcgc   4260
cgaccactac cagcagaaca cccccatcgg cgacggcccc gtgctgctgc ccgacaacca   4320
ctacctgagc acccagtccg ccctgagcaa agaccccaac gagaagcgcg atcacatggt   4380
cctgctggag ttcgtgaccg ccgccgggat cactctcggc atggacgagc tgtacaagta   4440
aacccagctt tcttgtacaa agtggtgata atcgaattcc gataatcaac ctctggatta   4500
caaaatttgt gaaagattga ctggtattct taactatgtt gctcctttta cgctatgtgg   4560
atacgctgct ttaatgcctt tgtatcatgc tattgcttcc cgtatggctt tcattttctc   4620
ctccttgtat aaatcctggt tgctgtctct ttatgaggag ttgtggcccg ttgtcaggca   4680
acgtggcgtg gtgtgcactg tgtttgctga cgcaaccccc actggttggg gcattgccac   4740
cacctgtcag ctcctttccg ggactttcgc tttccccctc cctattgcca cggcggaact   4800
catcgccgcc tgccttgccc gctgctggac aggggctcgg ctgttgggca ctgacaattc   4860
cgtggtgttg tcggggaagc tgacgtcctt tccatggctg ctcgcctgtg ttgccacctg   4920
gattctgcgc gggacgtcct tctgctacgt cccttcggcc ctcaatccag cggaccttcc   4980
ttcccgcggc ctgctgccgg ctctgcggcc tcttccgcgt cttcgccttc gccctcagac   5040
gagtcggatc tccctttggg ccgcctcccc gcatcgggaa ttcccgcggt tcgctttaag   5100
accaatgact tacaaggcag ctgtagatct tagccacttt ttaaaagaaa aggggggact   5160
ggaagggcta attcactccc aacgaagaca agatctgctt tttgcttgta ctgggtctct   5220
ctggttagac cagatctgag cctgggagct ctctggctaa ctagggaacc cactgcttaa   5280
gcctcaataa agcttgcctt gagtgcttca agtagtgtgt gcccgtctgt tgtgtgactc   5340
tggtaactag agatccctca gaccctttta gtcagtgtgg aaaatctcta gcagtagtag   5400
ttcatgtcat cttattattc agtatttata acttgcaaag aaatgaatat cagagagtga   5460
gaggaacttg tttattgcag cttataatgg ttacaaataa agcaatagca tcacaaattt   5520
cacaaataaa gcattttttt cactgcattc tagttgtggt ttgtccaaac tcatcaatgt   5580
atcttatcat gtctggctct agctatcccg cccctaactc cgcccatccc gcccctaact   5640
ccgcccagtt ccgcccattc tccgccccat ggctgactaa ttttttttat ttatgcagag   5700
gccgaggccg cctcggcctc tgagctattc cagaagtagt gaggaggctt ttttggaggc   5760
ctagggacgt acccaattcg ccctatagtg agtcgtatta cgcgcgctca ctggccgtcg   5820
ttttacaacg tcgtgactgg gaaaaccctg gcgttaccca acttaatcgc cttgcagcac   5880
atcccccttt cgccagctgg cgtaatagcg aagaggcccg caccgatcgc ccttcccaac   5940
agttgcgcag cctgaatggc gaatgggacg cgccctgtag cggcgcatta agcgcggcgg   6000
gtgtggtggt tacgcgcagc gtgaccgcta cacttgccag cgccctagcg cccgctcctt   6060
tcgctttctt cccttccttt ctcgccacgt tcgccggctt tccccgtcaa gctctaaatc   6120
gggggctccc tttagggttc cgatttagtg ctttacggca cctcgacccc aaaaaacttg   6180
attagggtga tggttcacgt agtgggccat cgccctgata gacggttttt cgccctttga   6240
cgttggagtc cacgttcttt aatagtggac tcttgttcca aactggaaca acactcaacc   6300
ctatctcggt ctattctttt gatttataag ggattttgcc gatttcggcc tattggttaa   6360
aaaatgagct gatttaacaa aaatttaacg cgaattttaa caaaatatta acgcttacaa   6420
tttaggtggc acttttcggg gaaatgtgcg cggaacccct atttgtttat ttttctaaat   6480
acattcaaat atgtatccgc tcatgagaca ataaccctga taaatgcttc aataatattg   6540
```

```
aaaaaggaag agtatgagta ttcaacattt ccgtgtcgcc cttattccct tttttgcggc   6600
attttgcctt cctgtttttg ctcacccaga aacgctggtg aaagtaaaag atgctgaaga   6660
tcagttgggt gcacgagtgg gttacatcga actggatctc aacagcggta agatccttga   6720
gagttttcgc cccgaagaac gttttccaat gatgagcact tttaaagttc tgctatgtgg   6780
cgcggtatta tcccgtattg acgccgggca agagcaactc ggtcgccgca tacactattc   6840
tcagaatgac ttggttgagt actcaccagt cacagaaaag catcttacgg atggcatgac   6900
agtaagagaa ttatgcagtg ctgccataac catgagtgat aacactgcgg ccaacttact   6960
tctgacaacg atcggaggac cgaaggagct aaccgctttt ttgcacaaca tgggggatca   7020
tgtaactcgc cttgatcgtt gggaaccgga gctgaatgaa gccataccaa acgacgagcg   7080
tgacaccacg atgcctgtag caatggcaac aacgttgcgc aaactattaa ctggcgaact   7140
acttactcta gcttcccggc aacaattaat agactggatg gaggcggata aagttgcagg   7200
accacttctg cgctcggccc ttccggctgg ctggtttatt gctgataaat ctggagccgg   7260
tgagcgtggg tctcgcggta tcattgcagc actggggcca gatggtaagc cctcccgtat   7320
cgtagttatc tacacgacgg ggagtcaggc aactatggat gaacgaaata gacagatcgc   7380
tgagataggt gcctcactga ttaagcattg gtaactgtca gaccaagttt actcatatat   7440
actttagatt gatttaaaac ttcattttta atttaaaagg atctaggtga agatcctttt   7500
tgataatctc atgaccaaaa tcccttaacg tgagttttcg ttccactgag cgtcagaccc   7560
cgtagaaaag atcaaaggat cttcttgaga tccttttttt ctgcgcgtaa tctgctgctt   7620
gcaaacaaaa aaaccaccgc taccagcggt ggtttgtttg ccggatcaag agctaccaac   7680
tctttttccg aaggtaactg gcttcagcag agcgcagata ccaaatactg ttcttctagt   7740
gtagccgtag ttaggccacc acttcaagaa ctctgtagca ccgcctacat acctcgctct   7800
gctaatcctg ttaccagtgg ctgctgccag tggcgataag tcgtgtctta ccgggttgga   7860
ctcaagacga tagttaccgg ataaggcgca gcggtcgggc tgaacggggg gttcgtgcac   7920
acagcccagc ttggagcgaa cgacctacac cgaactgaga tacctacagc gtgagctatg   7980
agaaagcgcc acgcttcccg aagagagaaa ggcggacagg tatccggtaa gcggcagggt   8040
cggaacagga gagcgcacga gggagcttcc agggggaaac gcctggtatc tttatagtcc   8100
tgtcgggttt cgccacctct gacttgagcg tcgatttttg tgatgctcgt caggggggcg   8160
gagcctatgg aaaaacgcca gcaacgcggc ctttttacgg ttcctggcct tttgctggcc   8220
ttttgctcac atgttctttc ctgcgttatc ccctgattct gtggataacc gtattaccgc   8280
ctttgagtga gctgataccg ctcgccgcag ccgaacgacc gagcgcagcg agtcagtgag   8340
cgaggaagcg gaagagcgcc caatacgcaa accgcctctc cccgcgcgtt ggccgattca   8400
ttaatgcagc tggcacgaca ggtttcccga ctggaaagcg ggcagtgagc gcaacgcaat   8460
taatgtgagt tagctcactc attaggcacc ccaggcttta cactttatgc ttccggctcg   8520
tatgttgtgt ggaattgtga gcggataaca atttcacaca ggaaacagct atgaccatga   8580
ttacgccaag cgcgcaatta accctcacta aagggaacaa aagctggagc tgcaagctt    8639
```

<210> SEQ ID NO 12
<211> LENGTH: 7704
<212> TYPE: DNA
<213> ORGANISM: Artificial Sequence
<220> FEATURE:
<223> OTHER INFORMATION: Synthetic lentiviral vector

<400> SEQUENCE: 12

```
aatgtagtct tatgcaatac tcttgtagtc ttgcaacatg gtaacgatga gttagcaaca     60
tgccttacaa ggagagaaaa agcaccgtgc atgccgattg gtggaagtaa ggtggtacga    120
tcgtgcctta ttaggaaggc aacagacggg tctgacatgg attggacgaa ccactgaatt    180
gccgcattgc agagatattg tatttaagtg cctagctcga tacataaacg ggtctctctg    240
gttagaccag atctgagcct gggagctctc tggctaacta gggaacccac tgcttaagcc    300
tcaataaagc ttgccttgag tgcttcaagt agtgtgtgcc cgtctgttgt gtgactctgg    360
taactagaga tccctcagac ccttttagtc agtgtggaaa atctctagca gtggcgcccg    420
aacagggact tgaaagcgaa agggaaacca gaggagctct ctcgacgcag gactcggctt    480
gctgaagcgc gcacggcaag aggcgagggg cggcgactgg tgagtacgcc aaaaattttg    540
actagcggag gctagaagga gagagatggg tgcgagagcg tcagtattaa gcgggggaga    600
attagatcgc gatgggaaaa aattcggtta aggccagggg gaaagaaaaa atataaatta    660
aaacatatag tatgggcaag cagggagcta gaacgattcg cagttaatcc tggcctgtta    720
gaaacatcag aaggctgtag acaaatactg ggacagctac aaccatccct tcagacagga    780
tcagaagaac ttagatcatt atataataca gtagcaaccc tctattgtgt gcatcaaagg    840
atagagataa aagacaccaa ggaagcttta gacaagatag aggaagagca aaacaaaagt    900
aagaccaccg cacagcaagc ggccgctgat cttcagacct ggaggaggag atatgaggga    960
caattggaga agtgaattat ataaatataa agtagtaaaa attgaaccat taggagtagc   1020
acccaccaag gcaaagagaa gagtggtgca gagagaaaaa agagcagtgg gaataggagc   1080
tttgttcctt gggttcttgg gagcagcagg aagcactatg ggcgcagcgt caatgacgct   1140
gacggtacag gccagacaat tattgtctgg tatagtgcag cagcagaaca atttgctgag   1200
ggctattgag gcgcaacagc atctgttgca actcacagtc tggggcatca agcagctcca   1260
ggcaagaatc ctggctgtgg aaagatacct aaaggatcaa cagctcctgg ggatttgggg   1320
ttgctctgga aaactcattt gcaccactgc tgtgccttgg aatgctagtt ggagtaataa   1380
atctctggaa cagatttgga atcacacgac ctggatggag tgggacagag aaattaacaa   1440
ttacacaagc ttaatacact ccttaattga agaatcgcaa aaccagcaag aaaagaatga   1500
acaagaatta ttggaattag ataaatgggc aagtttgtgg aattggttta acataacaaa   1560
ttggctgtgg tatataaaat tattcataat gatagtagga ggcttggtag gtttaagaat   1620
agtttttgct gtactttcta tagtgaatag agttaggcag ggatattcac cattatcgtt   1680
tcagacccac ctcccaaccc cgaggggacc cgacaggccc gaaggaatag aagaagaagg   1740
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttgcg ttacataact tacggtaaat   1980
ggcccgcctg gctgaccgcc caacgacccc cgcccattga cgtcaatagt aacgccaata   2040
gggactttcc attgacgtca atgggtggag tatttacggt aaactgccca cttggcagta   2100
catcaagtgt atcatatgcc aagtacgccc cctattgacg tcaatgacgg taaatggccc   2160
gcctggcatt gtgcccagta catgacctta tgggactttc ctacttggca gtacatctac   2220
gtattagtca tcgctattac catggtcgag gtgagcccca cgttctgctt cactctcccc   2280
atctcccccc cctccccacc cccaattttg tatttattta tttttttaatt attttgtgca   2340
```

```
gcgatggggg cggggggggg gggggggcgc gcgccaggcg gggcggggcg gggcgagggg   2400
cggggcgggg cgaggcggag aggtgcggcg gcagccaatc agagcggcgc gctccgaaag   2460
tttcctttta tggcgaggcg gcggcggcgg cggccctata aaaagcgaag cgcgcggcgg   2520
gcgggagtcg ctgcgcgctg ccttcgcccc gtgccccgct ccgccgccgc ctcgcgccgc   2580
ccgccccggc tctgactgac cgcgttactc ccacaggtga gcgggcggga cggcccttct   2640
cctccgggct gtaattagct gagcaagagg taagggttta agggatggtt ggttggtggg   2700
gtattaatgt ttaattacct ggagcacctg cctgaaatca cttttttca ggttggcaag    2760
tttgtacaaa aaagcaggct gccaccatgg tgagcaaggg cgaggagctg ttcaccgggg   2820
tggtgcccat cctggtcgag ctggacggcg acgtaaacgg ccacaagttc agcgtgtccg   2880
gcgagggcga gggcgatgcc acctacggca agctgaccct gaagttcatc tgcaccaccg   2940
gcaagctgcc cgtgccctgg cccaccctcg tgaccaccct gacctacggc gtgcagtgct   3000
tcagccgcta ccccgaccac atgaagcagc acgacttctt caagtccgcc atgcccgaag   3060
gctacgtcca ggagcgcacc atcttcttca aggacgacgg caactacaag acccgcgccg   3120
aggtgaagtt cgagggcgac accctggtga accgcatcga gctgaagggc atcgacttca   3180
aggaggacgg caacatcctg gggcacaagc tggagtacaa ctacaacagc cacaacgtct   3240
atatcatggc cgacaagcag aagaacggca tcaaggtgaa cttcaagatc cgccacaaca   3300
tcgaggacgg cagcgtgcag ctcgccgacc actaccagca gaacaccccc atcggcgacg   3360
gccccgtgct gctgcccgac aaccactacc tgagcaccca gtccgccctg agcaaagacc   3420
ccaacgagaa gcgcgatcac atggtcctgc tggagttcgt gaccgccgcc gggatcactc   3480
tcggcatgga cgagctgtac aagtaaaccc agctttcttg tacaaagtgg tgataatcga   3540
attccgataa tcaacctctg gattacaaaa tttgtgaaag attgactggt attcttaact   3600
atgttgctcc ttttacgcta tgtggatacg ctgctttaat gcctttgtat catgctattg   3660
cttcccgtat ggctttcatt ttctcctcct tgtataaatc ctggttgctg tctctttatg   3720
aggagttgtg gcccgttgtc aggcaacgtg gcgtggtgtg cactgtgttt gctgacgcaa   3780
cccccactgg ttggggcatt gccaccacct gtcagctcct ttccgggact ttcgctttcc   3840
ccctccctat tgccacggcg gaactcatcg ccgcctgcct tgcccgctgc tggacagggg   3900
ctcggctgtt gggcactgac aattccgtgg tgttgtcggg gaagctgacg tcctttccat   3960
ggctgctcgc ctgtgttgcc acctggattc tgcgcgggac gtccttctgc tacgtccctt   4020
cggccctcaa tccagcggac cttccttccc gcggcctgct gccggctctg cggcctcttc   4080
cgcgtcttcg ccttcgccct cagacgagtc ggatctccct ttgggccgcc tccccgcatc   4140
gggaattccc gcggttcgct ttaagaccaa tgacttacaa ggcagctgta gatcttagcc   4200
actttttaaa agaaaagggg ggactggaag ggctaattca ctcccaacga agacaagatc   4260
tgctttttgc ttgtactggg tctctctggt tagaccagat ctgagcctgg gagctctctg   4320
gctaactagg gaacccactg cttaagcctc aataaagctt gccttgagtg cttcaagtag   4380
tgtgtgcccg tctgttgtgt gactctggta actagagatc cctcagaccc ttttagtcag   4440
tgtggaaaat ctctagcagt agtagttcat gtcatcttat tattcagtat ttataacttg   4500
caaagaaatg aatatcagag agtgagagga acttgtttat tgcagcttat aatggttaca   4560
aataaagcaa tagcatcaca aatttcacaa ataaagcatt tttttcactg cattctagtt   4620
gtggtttgtc caaactcatc aatgtatctt atcatgtctg gctctagcta tcccgcccct   4680
aactccgccc atcccgcccc taactccgcc cagttccgcc cattctccgc cccatggctg   4740
```

```
actaattttt tttatttatg cagaggccga ggccgcctcg gcctctgagc tattccagaa   4800
gtagtgagga ggcttttttg gaggcctagg gacgtaccca attcgcccta tagtgagtcg   4860
tattacgcgc gctcactggc cgtcgtttta caacgtcgtg actgggaaaa ccctggcgtt   4920
acccaactta atcgccttgc agcacatccc cctttcgcca gctggcgtaa tagcgaagag   4980
gcccgcaccg atcgcccttc ccaacagttg cgcagcctga atggcgaatg ggacgcgccc   5040
tgtagcggcg cattaagcgc ggcgggtgtg gtggttacgc gcagcgtgac cgctacactt   5100
gccagcgccc tagcgcccgc tcctttcgct ttcttccctt cctttctcgc cacgttcgcc   5160
ggctttcccc gtcaagctct aaatcggggg ctccctttag ggttccgatt tagtgcttta   5220
cggcacctcg accccaaaaa acttgattag ggtgatggtt cacgtagtgg gccatcgccc   5280
tgatagacgg tttttcgccc tttgacgttg gagtccacgt tctttaatag tggactcttg   5340
ttccaaactg gaacaacact caaccctatc tcggtctatt cttttgattt ataagggatt   5400
ttgccgattt cggcctattg gttaaaaaat gagctgattt aacaaaaatt taacgcgaat   5460
tttaacaaaa tattaacgct tacaatttag gtggcacttt tcggggaaat gtgcgcggaa   5520
cccctatttg tttatttttc taaatacatt caaatatgta tccgctcatg agacaataac   5580
cctgataaat gcttcaataa tattgaaaaa ggaagagtat gagtattcaa catttccgtg   5640
tcgcccttat tccctttttt gcggcatttt gccttcctgt ttttgctcac ccagaaacgc   5700
tggtgaaagt aaaagatgct gaagatcagt tgggtgcacg agtgggttac atcgaactgg   5760
atctcaacag cggtaagatc cttgagagtt ttcgccccga agaacgtttt ccaatgatga   5820
gcacttttaa agttctgcta tgtggcgcgg tattatcccg tattgacgcc gggcaagagc   5880
aactcggtcg ccgcatacac tattctcaga atgacttggt tgagtactca ccagtcacag   5940
aaaagcatct tacggatggc atgacagtaa gagaattatg cagtgctgcc ataaccatga   6000
gtgataacac tgcggccaac ttacttctga caacgatcgg aggaccgaag gagctaaccg   6060
cttttttgca caacatgggg gatcatgtaa ctcgccttga tcgttgggaa ccggagctga   6120
atgaagccat accaaacgac gagcgtgaca ccacgatgcc tgtagcaatg gcaacaacgt   6180
tgcgcaaact attaactggc gaactactta ctctagcttc ccggcaacaa ttaatagact   6240
ggatggaggc ggataaagtt gcaggaccac ttctgcgctc ggcccttccg gctggctggt   6300
ttattgctga taaatctgga gccggtgagc gtgggtctcg cggtatcatt gcagcactgg   6360
ggccagatgg taagccctcc cgtatcgtag ttatctacac gacggggagt caggcaacta   6420
tggatgaacg aaatagacag atcgctgaga taggtgcctc actgattaag cattggtaac   6480
tgtcagacca agtttactca tatatacttt agattgattt aaaacttcat ttttaattta   6540
aaaggatcta ggtgaagatc ctttttgata atctcatgac caaaatccct taacgtgagt   6600
tttcgttcca ctgagcgtca gaccccgtag aaaagatcaa aggatcttct tgagatcctt   6660
tttttctgcg cgtaatctgc tgcttgcaaa caaaaaaacc accgctacca gcggtggttt   6720
gtttgccgga tcaagagcta ccaactcttt ttccgaaggt aactggcttc agcagagcgc   6780
agataccaaa tactgttctt ctagtgtagc cgtagttagg ccaccacttc aagaactctg   6840
tagcaccgcc tacatacctc gctctgctaa tcctgttacc agtggctgct gccagtggcg   6900
ataagtcgtg tcttaccggg ttggactcaa gacgatagtt accggataag gcgcagcggt   6960
cgggctgaac ggggggttcg tgcacacagc ccagcttgga gcgaacgacc tacaccgaac   7020
tgagatacct acagcgtgag ctatgagaaa gcgccacgct tcccgaagag agaaaggcgg   7080
```

```
acaggtatcc ggtaagcggc agggtcggaa caggagagcg cacgagggag cttccagggg   7140

gaaacgcctg gtatctttat agtcctgtcg ggtttcgcca cctctgactt gagcgtcgat   7200

ttttgtgatg ctcgtcaggg gggcggagcc tatggaaaaa cgccagcaac gcggcctttt   7260

tacggttcct ggccttttgc tggccttttg ctcacatgtt ctttcctgcg ttatcccctg   7320

attctgtgga taaccgtatt accgcctttg agtgagctga taccgctcgc cgcagccgaa   7380

cgaccgagcg cagcgagtca gtgagcgagg aagcggaaga gcgcccaata cgcaaaccgc   7440

ctctccccgc gcgttggccg attcattaat gcagctggca cgacaggttt cccgactgga   7500

aagcgggcag tgagcgcaac gcaattaatg tgagttagct cactcattag gcaccccagg   7560

ctttacactt tatgcttccg gctcgtatgt tgtgtggaat tgtgagcgga taacaatttc   7620

acacaggaaa cagctatgac catgattacg ccaagcgcgc aattaaccct cactaaaggg   7680

aacaaaagct ggagctgcaa gctt                                          7704
```

<210> SEQ ID NO 13
<211> LENGTH: 7250
<212> TYPE: DNA
<213> ORGANISM: Artificial Sequence
<220> FEATURE:
<223> OTHER INFORMATION: Synthetic lentiviral vector

<400> SEQUENCE: 13

```
aatgtagtct tatgcaatac tcttgtagtc ttgcaacatg gtaacgatga gttagcaaca     60

tgccttacaa ggagagaaaa agcaccgtgc atgccgattg gtggaagtaa ggtggtacga    120

tcgtgcctta ttaggaaggc aacagacggg tctgacatgg attggacgaa ccactgaatt    180

gccgcattgc agagatattg tatttaagtg cctagctcga tacataaacg ggtctctctg    240

gttagaccag atctgagcct gggagctctc tggctaacta gggaacccac tgcttaagcc    300

tcaataaagc ttgccttgag tgcttcaagt agtgtgtgcc cgtctgttgt gtgactctgg    360

taactagaga tccctcagac ccttttagtc agtgtggaaa atctctagca gtggcgcccg    420

aacagggact tgaaagcgaa agggaaacca gaggagctct ctcgacgcag gactcggctt    480

gctgaagcgc gcacggcaag aggcgagggg cggcgactgg tgagtacgcc aaaaattttg    540

actagcggag gctagaagga gagagatggg tgcgagagcg tcagtattaa gcgggggaga    600

attagatcgc gatgggaaaa aattcggtta aggccagggg gaaagaaaaa atataaatta    660

aaacatatag tatgggcaag cagggagcta gaacgattcg cagttaatcc tggcctgtta    720

gaaacatcag aaggctgtag acaaatactg ggacagctac aaccatccct tcagacagga    780

tcagaagaac ttagatcatt atataataca gtagcaaccc tctattgtgt gcatcaaagg    840

atagagataa aagacaccaa ggaagcttta gacaagatag aggaagagca aaacaaaagt    900

aagaccaccg cacagcaagc ggccgctgat cttcagacct ggaggaggag atatgaggga    960

caattggaga agtgaattat ataaatataa agtagtaaaa attgaaccat taggagtagc   1020

acccaccaag gcaaagagaa gagtggtgca gagagaaaaa agagcagtgg gaataggagc   1080

tttgttcctt gggttcttgg gagcagcagg aagcactatg ggcgcagcgt caatgacgct   1140

gacggtacag gccagacaat tattgtctgg tatagtgcag cagcagaaca atttgctgag   1200

ggctattgag gcgcaacagc atctgttgca actcacagtc tggggcatca agcagctcca   1260

ggcaagaatc ctggctgtgg aaagatacct aaaggatcaa cagctcctgg ggatttgggg   1320

ttgctctgga aaactcattt gcaccactgc tgtgccttgg aatgctagtt ggagtaataa   1380

atctctggaa cagatttgga atcacacgac ctggatggag tgggacagag aaattaacaa   1440
```

```
ttacacaagc ttaatacact ccttaattga agaatcgcaa aaccagcaag aaaagaatga   1500

acaagaatta ttggaattag ataaatgggc aagtttgtgg aattggttta acataacaaa   1560

ttggctgtgg tatataaaat tattcataat gatagtagga ggcttggtag gtttaagaat   1620

agtttttgct gtactttcta tagtgaatag agttaggcag ggatattcac cattatcgtt   1680

tcagacccac ctcccaaccc cgaggggacc cgacaggccc gaaggaatag aagaagaagg   1740

tggagagaga gacagagaca gatccattcg attagtgaac ggatctcgac ggtatcgcta   1800

gcttttaaaa gaaaaggggg gattgggggg tacagtgcag gggaaagaat agtagacata   1860

atagcaacag acatacaaac taaagaatta caaaaacaaa ttacaaaaat tcaaaatttt   1920

actagtgatt atcggatcaa ctttgtatag aaaagttgct gtggaatgtg tgtcagttag   1980

ggtgtggaaa gtccccaggc tccccagcag gcagaagtat gcaaagcatg catctcaatt   2040

agtcagcaac caggtgtgga aagtccccag gctccccagc aggcagaagt atgcaaagca   2100

tgcatctcaa ttagtcagca accatagtcc cgcccctaac tccgcccatc ccgcccctaa   2160

ctccgcccag ttccgcccat tctccgcccc atggctgact aatttttttt atttatgcag   2220

aggccgaggc cgcctctgcc tctgagctat tccagaagta gtgaggaggc ttttttggag   2280

gcctaggctt ttgcaaaaag ctcaagtttg tacaaaaaag caggctgcca ccatggtgag   2340

caagggcgag gagctgttca ccggggtggt gcccatcctg gtcgagctgg acggcgacgt   2400

aaacggccac aagttcagcg tgtccggcga gggcgagggc gatgccacct acggcaagct   2460

gaccctgaag ttcatctgca ccaccggcaa gctgcccgtg ccctggccca ccctcgtgac   2520

caccctgacc tacggcgtgc agtgcttcag ccgctacccc gaccacatga agcagcacga   2580

cttcttcaag tccgccatgc ccgaaggcta cgtccaggag cgcaccatct tcttcaagga   2640

cgacggcaac tacaagaccc gcgccgaggt gaagttcgag ggcgacaccc tggtgaaccg   2700

catcgagctg aagggcatcg acttcaagga ggacggcaac atcctggggc acaagctgga   2760

gtacaactac aacagccaca acgtctatat catggccgac aagcagaaga acggcatcaa   2820

ggtgaacttc aagatccgcc acaacatcga ggacggcagc gtgcagctcg ccgaccacta   2880

ccagcagaac acccccatcg gcgacggccc cgtgctgctg cccgacaacc actacctgag   2940

cacccagtcc gccctgagca aagaccccaa cgagaagcgc gatcacatgg tcctgctgga   3000

gttcgtgacc gccgccggga tcactctcgg catggacgag ctgtacaagt aaacccagct   3060

ttcttgtaca aagtggtgat aatcgaattc cgataatcaa cctctggatt acaaaatttg   3120

tgaaagattg actggtattc ttaactatgt tgctcctttt acgctatgtg gatacgctgc   3180

tttaatgcct ttgtatcatg ctattgcttc ccgtatggct ttcattttct cctccttgta   3240

taaatcctgg ttgctgtctc tttatgagga gttgtggccc gttgtcaggc aacgtggcgt   3300

ggtgtgcact gtgtttgctg acgcaacccc cactggttgg ggcattgcca ccacctgtca   3360

gctcctttcc gggactttcg ctttccccct ccctattgcc acggcggaac tcatcgccgc   3420

ctgccttgcc cgctgctgga caggggctcg gctgttgggc actgacaatt ccgtggtgtt   3480

gtcggggaag ctgacgtcct ttccatggct gctcgcctgt gttgccacct ggattctgcg   3540

cgggacgtcc ttctgctacg tcccttcggc cctcaatcca gcggaccttc cttcccgcgg   3600

cctgctgccg gctctgcggc ctcttccgcg tcttcgcctt cgccctcaga cgagtcggat   3660

ctccctttgg gccgcctccc cgcatcggga attcccgcgg ttcgctttaa gaccaatgac   3720

ttacaaggca gctgtagatc ttagccactt tttaaaagaa aaggggggac tggaagggct   3780
```

-continued

```
aattcactcc caacgaagac aagatctgct tttgcttgt actgggtctc tctggttaga   3840
ccagatctga gcctgggagc tctctggcta actagggaac ccactgctta agcctcaata   3900
aagcttgcct tgagtgcttc aagtagtgtg tgcccgtctg ttgtgtgact ctggtaacta   3960
gagatccctc agaccctttt agtcagtgtg gaaaatctct agcagtagta gttcatgtca   4020
tcttattatt cagtatttat aacttgcaaa gaaatgaata tcagagagtg agaggaactt   4080
gtttattgca gcttataatg gttacaaata aagcaatagc atcacaaatt tcacaaataa   4140
agcatttttt tcactgcatt ctagttgtgg tttgtccaaa ctcatcaatg tatcttatca   4200
tgtctggctc tagctatccc gcccctaact ccgcccatcc cgcccctaac tccgcccagt   4260
tccgcccatt ctccgcccca tggctgacta atttttttta tttatgcaga ggccgaggcc   4320
gcctcggcct ctgagctatt ccagaagtag tgaggaggct tttttggagg cctagggacg   4380
tacccaattc gccctatagt gagtcgtatt acgcgcgctc actggccgtc gttttacaac   4440
gtcgtgactg ggaaaaccct ggcgttaccc aacttaatcg ccttgcagca catcccccct   4500
tcgccagctg gcgtaatagc gaagaggccc gcaccgatcg cccttcccaa cagttgcgca   4560
gcctgaatgg cgaatgggac gcgccctgta gcggcgcatt aagcgcggcg ggtgtggtgg   4620
ttacgcgcag cgtgaccgct acacttgcca gcgccctagc gcccgctcct ttcgctttct   4680
tcccttcctt tctcgccacg ttcgccggct ttccccgtca agctctaaat cgggggctcc   4740
ctttagggtt ccgatttagt gctttacggc acctcgaccc caaaaaactt gattagggtg   4800
atggttcacg tagtgggcca tcgccctgat agacggtttt tcgccctttg acgttggagt   4860
ccacgttctt taatagtgga ctcttgttcc aaactggaac aacactcaac cctatctcgg   4920
tctattcttt tgatttataa gggattttgc cgatttcggc ctattggtta aaaaatgagc   4980
tgatttaaca aaaatttaac gcgaatttta acaaaatatt aacgcttaca atttaggtgg   5040
cacttttcgg ggaaatgtgc gcggaacccc tatttgttta tttttctaaa tacattcaaa   5100
tatgtatccg ctcatgagac aataaccctg ataaatgctt caataatatt gaaaaaggaa   5160
gagtatgagt attcaacatt tccgtgtcgc ccttattccc ttttttgcgg cattttgcct   5220
tcctgttttt gctcacccag aaacgctggt gaaagtaaaa gatgctgaag atcagttggg   5280
tgcacgagtg ggttacatcg aactggatct caacagcggt aagatccttg agagttttcg   5340
ccccgaagaa cgttttccaa tgatgagcac ttttaaagtt ctgctatgtg gcgcggtatt   5400
atcccgtatt gacgccgggc aagagcaact cggtcgccgc atacactatt ctcagaatga   5460
cttggttgag tactcaccag tcacagaaaa gcatcttacg gatggcatga cagtaagaga   5520
attatgcagt gctgccataa ccatgagtga taacactgcg gccaacttac ttctgacaac   5580
gatcggagga ccgaaggagc taaccgcttt tttgcacaac atgggggatc atgtaactcg   5640
ccttgatcgt tgggaaccgg agctgaatga agccatacca aacgacgagc gtgacaccac   5700
gatgcctgta gcaatggcaa caacgttgcg caaactatta actggcgaac tacttactct   5760
agcttcccgg caacaattaa tagactggat ggaggcggat aaagttgcag gaccacttct   5820
gcgctcggcc cttccggctg gctggtttat tgctgataaa tctggagccg gtgagcgtgg   5880
gtctcgcggt atcattgcag cactggggcc agatggtaag ccctcccgta tcgtagttat   5940
ctacacgacg gggagtcagg caactatgga tgaacgaaat agacagatcg ctgagatagg   6000
tgcctcactg attaagcatt ggtaactgtc agaccaagtt tactcatata tactttagat   6060
tgatttaaaa cttcattttt aatttaaaag gatctaggtg aagatccttt ttgataatct   6120
catgaccaaa atcccttaac gtgagttttc gttccactga gcgtcagacc ccgtagaaaa   6180
```

```
gatcaaagga tcttcttgag atcctttttt tctgcgcgta atctgctgct tgcaaacaaa   6240
aaaaccaccg ctaccagcgg tggtttgttt gccggatcaa gagctaccaa ctctttttcc   6300
gaaggtaact ggcttcagca gagcgcagat accaaatact gttcttctag tgtagccgta   6360
gttaggccac cacttcaaga actctgtagc accgcctaca tacctcgctc tgctaatcct   6420
gttaccagtg gctgctgcca gtggcgataa gtcgtgtctt accgggttgg actcaagacg   6480
atagttaccg gataaggcgc agcggtcggg ctgaacgggg ggttcgtgca cacagcccag   6540
cttggagcga acgacctaca ccgaactgag atacctacag cgtgagctat gagaaagcgc   6600
cacgcttccc gaagagagaa aggcggacag gtatccggta agcggcaggg tcggaacagg   6660
agagcgcacg agggagcttc cagggggaaa cgcctggtat ctttatagtc ctgtcgggtt   6720
tcgccacctc tgacttgagc gtcgattttt gtgatgctcg tcaggggggc ggagcctatg   6780
gaaaaacgcc agcaacgcgg cctttttacg gttcctggcc ttttgctggc cttttgctca   6840
catgttcttt cctgcgttat cccctgattc tgtggataac cgtattaccg cctttgagtg   6900
agctgatacc gctcgccgca gccgaacgac cgagcgcagc gagtcagtga gcgaggaagc   6960
ggaagagcgc ccaatacgca aaccgcctct ccccgcgcgt tggccgattc attaatgcag   7020
ctggcacgac aggtttcccg actggaaagc gggcagtgag cgcaacgcaa ttaatgtgag   7080
ttagctcact cattaggcac cccaggcttt acactttatg cttccggctc gtatgttgtg   7140
tggaattgtg agcggataac aatttcacac aggaaacagc tatgaccatg attacgccaa   7200
gcgcgcaatt aaccctcact aaagggaaca aaagctggag ctgcaagctt              7250
```

<210> SEQ ID NO 14
<211> LENGTH: 7417
<212> TYPE: DNA
<213> ORGANISM: Artificial Sequence
<220> FEATURE:
<223> OTHER INFORMATION: Synthetic lentiviral vector

<400> SEQUENCE: 14

```
aatgtagtct tatgcaatac tcttgtagtc ttgcaacatg gtaacgatga gttagcaaca     60
tgccttacaa ggagagaaaa agcaccgtgc atgccgattg gtggaagtaa ggtggtacga    120
tcgtgcctta ttaggaaggc aacagacggg tctgacatgg attggacgaa ccactgaatt    180
gccgcattgc agagatattg tatttaagtg cctagctcga tacataaacg ggtctctctg    240
gttagaccag atctgagcct gggagctctc tggctaacta gggaacccac tgcttaagcc    300
tcaataaagc ttgccttgag tgcttcaagt agtgtgtgcc cgtctgttgt gtgactctgg    360
taactagaga tccctcagac ccttttagtc agtgtggaaa atctctagca gtggcgcccg    420
aacagggact tgaaagcgaa agggaaacca gaggagctct ctcgacgcag gactcggctt    480
gctgaagcgc gcacggcaag aggcgagggg cggcgactgg tgagtacgcc aaaaattttg    540
actagcggag gctagaagga gagagatggg tgcgagagcg tcagtattaa gcgggggaga    600
attagatcgc gatgggaaaa aattcggtta aggccagggg gaaagaaaaa atataaatta    660
aaacatatag tatgggcaag cagggagcta gaacgattcg cagttaatcc tggcctgtta    720
gaaacatcag aaggctgtag acaaatactg ggacagctac aaccatccct tcagacagga    780
tcagaagaac ttagatcatt atataataca gtagcaaccc tctattgtgt gcatcaaagg    840
atagagataa aagacaccaa ggaagcttta gacaagatag aggaagagca aaacaaaagt    900
aagaccaccg cacagcaagc ggccgctgat cttcagacct ggaggaggag atatgaggga    960
```

```
caattggaga agtgaattat ataaatataa agtagtaaaa attgaaccat taggagtagc   1020
acccaccaag gcaaagagaa gagtggtgca gagagaaaaa agagcagtgg gaataggagc   1080
tttgttcctt gggttcttgg gagcagcagg aagcactatg ggcgcagcgt caatgacgct   1140
gacggtacag gccagacaat tattgtctgg tatagtgcag cagcagaaca atttgctgag   1200
ggctattgag gcgcaacagc atctgttgca actcacagtc tggggcatca agcagctcca   1260
ggcaagaatc ctggctgtgg aaagatacct aaaggatcaa cagctcctgg ggatttgggg   1320
ttgctctgga aaactcattt gcaccactgc tgtgccttgg aatgctagtt ggagtaataa   1380
atctctggaa cagatttgga atcacacgac ctggatggag tgggacagag aaattaacaa   1440
ttacacaagc ttaatacact ccttaattga agaatcgcaa aaccagcaag aaaagaatga   1500
acaagaatta ttggaattag ataaatgggc aagtttgtgg aattggttta acataacaaa   1560
ttggctgtgg tatataaaat tattcataat gatagtagga ggcttggtag gtttaagaat   1620
agtttttgct gtactttcta tagtgaatag agttaggcag ggatattcac cattatcgtt   1680
tcagacccac ctcccaaccc cgaggggacc cgacaggccc gaaggaatag aagaagaagg   1740
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttgtt ctaccgggta ggggaggcgc   1980
ttttcccaag gcagtctgga gcatgcgctt tagcagcccc gctgggcact tggcgctaca   2040
caagtggcct ctggcctcgc acacattcca catccaccgg taggcgccaa ccggctccgt   2100
tctttggtgg ccccttcgcg ccaccttcta ctcctcccct agtcaggaag ttcccccccg   2160
ccccgcagct cgcgtcgtgc aggacgtgac aaatggaagt agcacgtctc actagtctcg   2220
tgcagatgga cagcaccgct gagcaatgga agcgggtagg cctttggggc agcggccaat   2280
agcagctttg ctccttcgct ttctgggctc agaggctggg aaggggtggg tccgggggcg   2340
ggctcagggg cgggctcagg ggcggggcgg gcgcccgaag gtcctccgga ggcccggcat   2400
tctgcacgct tcaaaagcgc acgtctgccg cgctgttctc ctcttcctca tctccgggcc   2460
tttcgacctc aagtttgtac aaaaaagcag gctgccacca tggtgagcaa gggcgaggag   2520
ctgttcaccg gggtggtgcc catcctggtc gagctggacg gcgacgtaaa cggccacaag   2580
ttcagcgtgt ccggcgaggg cgagggcgat gccacctacg gcaagctgac cctgaagttc   2640
atctgcacca ccggcaagct gcccgtgccc tggcccaccc tcgtgaccac cctgacctac   2700
ggcgtgcagt gcttcagccg ctaccccgac cacatgaagc agcacgactt cttcaagtcc   2760
gccatgcccg aaggctacgt ccaggagcgc accatcttct tcaaggacga cggcaactac   2820
aagacccgcg ccgaggtgaa gttcgagggc gacaccctgg tgaaccgcat cgagctgaag   2880
ggcatcgact tcaaggagga cggcaacatc ctggggcaca agctggagta caactacaac   2940
agccacaacg tctatatcat ggccgacaag cagaagaacg gcatcaaggt gaacttcaag   3000
atccgccaca acatcgagga cggcagcgtg cagctcgccg accactacca gcagaacacc   3060
cccatcggcg acggccccgt gctgctgccc gacaaccact acctgagcac ccagtccgcc   3120
ctgagcaaag accccaacga gaagcgcgat cacatggtcc tgctggagtt cgtgaccgcc   3180
gccgggatca ctctcggcat ggacgagctg tacaagtaaa cccagctttc ttgtacaaag   3240
tggtgataat cgaattccga taatcaacct ctggattaca aaatttgtga aagattgact   3300
ggtattctta actatgttgc tccttttacg ctatgtggat acgctgcttt aatgcctttg   3360
```

```
tatcatgcta ttgcttcccg tatggctttc attttctcct ccttgtataa atcctggttg   3420
ctgtctcttt atgaggagtt gtggcccgtt gtcaggcaac gtggcgtggt gtgcactgtg   3480
tttgctgacg caacccccac tggttggggc attgccacca cctgtcagct cctttccggg   3540
actttcgctt tccccctccc tattgccacg gcggaactca tcgccgcctg ccttgcccgc   3600
tgctggacag gggctcggct gttgggcact gacaattccg tggtgttgtc ggggaagctg   3660
acgtcctttc catggctgct cgcctgtgtt gccacctgga ttctgcgcgg gacgtccttc   3720
tgctacgtcc cttcggccct caatccagcg gaccttcctt cccgcggcct gctgccggct   3780
ctgcggcctc ttccgcgtct tcgccttcgc cctcagacga gtcggatctc cctttgggcc   3840
gcctccccgc atcgggaatt cccgcggttc gctttaagac caatgactta caaggcagct   3900
gtagatctta gccacttttt aaaagaaaag gggggactgg aagggctaat tcactcccaa   3960
cgaagacaag atctgctttt tgcttgtact gggtctctct ggttagacca gatctgagcc   4020
tgggagctct ctggctaact agggaaccca ctgcttaagc ctcaataaag cttgccttga   4080
gtgcttcaag tagtgtgtgc ccgtctgttg tgtgactctg gtaactagag atccctcaga   4140
cccttttagt cagtgtggaa aatctctagc agtagtagtt catgtcatct tattattcag   4200
tatttataac ttgcaaagaa atgaatatca gagagtgaga ggaacttgtt tattgcagct   4260
tataatggtt acaaataaag caatagcatc acaaatttca caaataaagc atttttttca   4320
ctgcattcta gttgtggttt gtccaaactc atcaatgtat cttatcatgt ctggctctag   4380
ctatcccgcc cctaactccg cccatcccgc ccctaactcc gcccagttcc gcccattctc   4440
cgccccatgg ctgactaatt ttttttattt atgcagaggc cgaggccgcc tcggcctctg   4500
agctattcca gaagtagtga ggaggctttt ttggaggcct agggacgtac ccaattcgcc   4560
ctatagtgag tcgtattacg cgcgctcact ggccgtcgtt ttacaacgtc gtgactggga   4620
aaaccctggc gttacccaac ttaatcgcct tgcagcacat ccccctttcg ccagctggcg   4680
taatagcgaa gaggcccgca ccgatcgccc ttcccaacag ttgcgcagcc tgaatggcga   4740
atgggacgcg ccctgtagcg gcgcattaag cgcggcgggt gtggtggtta cgcgcagcgt   4800
gaccgctaca cttgccagcg ccctagcgcc cgctcctttc gctttcttcc cttcctttct   4860
cgccacgttc gccggctttc cccgtcaagc tctaaatcgg gggctccctt tagggttccg   4920
atttagtgct ttacggcacc tcgaccccaa aaaacttgat tagggtgatg gttcacgtag   4980
tgggccatcg ccctgataga cggtttttcg ccctttgacg ttggagtcca cgttctttaa   5040
tagtggactc ttgttccaaa ctggaacaac actcaaccct atctcggtct attcttttga   5100
tttataaggg attttgccga tttcggccta ttggttaaaa aatgagctga tttaacaaaa   5160
atttaacgcg aattttaaca aaatattaac gcttacaatt taggtggcac ttttcgggga   5220
aatgtgcgcg gaacccctat ttgtttattt ttctaaatac attcaaatat gtatccgctc   5280
atgagacaat aaccctgata aatgcttcaa taatattgaa aaaggaagag tatgagtatt   5340
caacatttcc gtgtcgccct tattcccttt tttgcggcat tttgccttcc tgtttttgct   5400
cacccagaaa cgctggtgaa agtaaaagat gctgaagatc agttgggtgc acgagtgggt   5460
tacatcgaac tggatctcaa cagcggtaag atccttgaga gttttcgccc cgaagaacgt   5520
tttccaatga tgagcacttt taaagttctg ctatgtggcg cggtattatc ccgtattgac   5580
gccgggcaag agcaactcgg tcgccgcata cactattctc agaatgactt ggttgagtac   5640
tcaccagtca cagaaaagca tcttacggat ggcatgacag taagagaatt atgcagtgct   5700
```

```
gccataacca tgagtgataa cactgcggcc aacttacttc tgacaacgat cggaggaccg   5760

aaggagctaa ccgctttttt gcacaacatg ggggatcatg taactcgcct tgatcgttgg   5820

gaaccggagc tgaatgaagc cataccaaac gacgagcgtg acaccacgat gcctgtagca   5880

atggcaacaa cgttgcgcaa actattaact ggcgaactac ttactctagc ttcccggcaa   5940

caattaatag actggatgga ggcggataaa gttgcaggac cacttctgcg ctcggccctt   6000

ccggctggct ggtttattgc tgataaatct ggagccggtg agcgtgggtc tcgcggtatc   6060

attgcagcac tggggccaga tggtaagccc tcccgtatcg tagttatcta cacgacgggg   6120

agtcaggcaa ctatggatga acgaaataga cagatcgctg agataggtgc ctcactgatt   6180

aagcattggt aactgtcaga ccaagtttac tcatatatac tttagattga tttaaaactt   6240

catttttaat ttaaaaggat ctaggtgaag atcctttttg ataatctcat gaccaaaatc   6300

ccttaacgtg agttttcgtt ccactgagcg tcagaccccg tagaaaagat caaaggatct   6360

tcttgagatc cttttttttct gcgcgtaatc tgctgcttgc aaacaaaaaa accaccgcta   6420

ccagcggtgg tttgtttgcc ggatcaagag ctaccaactc tttttccgaa ggtaactggc   6480

ttcagcagag cgcagatacc aaatactgtt cttctagtgt agccgtagtt aggccaccac   6540

ttcaagaact ctgtagcacc gcctacatac ctcgctctgc taatcctgtt accagtggct   6600

gctgccagtg gcgataagtc gtgtcttacc gggttggact caagacgata gttaccggat   6660

aaggcgcagc ggtcgggctg aacggggggt tcgtgcacac agcccagctt ggagcgaacg   6720

acctacaccg aactgagata cctacagcgt gagctatgag aaagcgccac gcttcccgaa   6780

gagagaaagg cggacaggta tccggtaagc ggcagggtcg gaacaggaga gcgcacgagg   6840

gagcttccag ggggaaacgc ctggtatctt tatagtcctg tcgggtttcg ccacctctga   6900

cttgagcgtc gatttttgtg atgctcgtca ggggggcgga gcctatggaa aaacgccagc   6960

aacgcggcct ttttacggtt cctggccttt tgctggcctt ttgctcacat gttctttcct   7020

gcgttatccc ctgattctgt ggataaccgt attaccgcct ttgagtgagc tgataccgct   7080

cgccgcagcc gaacgaccga gcgcagcgag tcagtgagcg aggaagcgga agagcgccca   7140

atacgcaaac cgcctctccc cgcgcgttgg ccgattcatt aatgcagctg gcacgacagg   7200

tttcccgact ggaaagcggg cagtgagcgc aacgcaatta atgtgagtta gctcactcat   7260

taggcacccc aggctttaca ctttatgctt ccggctcgta tgttgtgtgg aattgtgagc   7320

ggataacaat ttcacacagg aaacagctat gaccatgatt acgccaagcg cgcaattaac   7380

cctcactaaa gggaacaaaa gctggagctg caagctt                            7417

<210> SEQ ID NO 15
<211> LENGTH: 8084
<212> TYPE: DNA
<213> ORGANISM: Artificial Sequence
<220> FEATURE:
<223> OTHER INFORMATION: Synthetic lentiviral vector

<400> SEQUENCE: 15

aatgtagtct tatgcaatac tcttgtagtc ttgcaacatg gtaacgatga gttagcaaca     60

tgccttacaa ggagagaaaa agcaccgtgc atgccgattg gtggaagtaa ggtggtacga    120

tcgtgcctta ttaggaaggc aacagacggg tctgacatgg attggacgaa ccactgaatt    180

gccgcattgc agagatattg tatttaagtg cctagctcga tacataaacg ggtctctctg    240

gttagaccag atctgagcct gggagctctc tggctaacta gggaacccac tgcttaagcc    300

tcaataaagc ttgccttgag tgcttcaagt agtgtgtgcc cgtctgttgt gtgactctgg    360
```

```
taactagaga tccctcagac ccttttagtc agtgtggaaa atctctagca gtggcgcccg    420
aacagggact tgaaagcgaa agggaaacca gaggagctct ctcgacgcag gactcggctt    480
gctgaagcgc gcacggcaag aggcgagggg cggcgactgg tgagtacgcc aaaaattttg    540
actagcggag gctagaagga gagagatggg tgcgagagcg tcagtattaa gcgggggaga    600
attagatcgc gatgggaaaa aattcggtta aggccagggg gaaagaaaaa atataaatta    660
aaacatatag tatgggcaag cagggagcta gaacgattcg cagttaatcc tggcctgtta    720
gaaacatcag aaggctgtag acaaatactg ggacagctac aaccatccct tcagacagga    780
tcagaagaac ttagatcatt atataataca gtagcaaccc tctattgtgt gcatcaaagg    840
atagagataa aagacaccaa ggaagcttta gacaagatag aggaagagca aaacaaaagt    900
aagaccaccg cacagcaagc ggccgctgat cttcagacct ggaggaggag atatgaggga    960
caattggaga agtgaattat ataaatataa agtagtaaaa attgaaccat taggagtagc   1020
acccaccaag gcaaagagaa gagtggtgca gagagaaaaa agagcagtgg gaataggagc   1080
tttgttcctt gggttcttgg gagcagcagg aagcactatg ggcgcagcgt caatgacgct   1140
gacggtacag gccagacaat tattgtctgg tatagtgcag cagcagaaca atttgctgag   1200
ggctattgag gcgcaacagc atctgttgca actcacagtc tggggcatca agcagctcca   1260
ggcaagaatc ctggctgtgg aaagatacct aaaggatcaa cagctcctgg ggatttgggg   1320
ttgctctgga aaactcattt gcaccactgc tgtgccttgg aatgctagtt ggagtaataa   1380
atctctggaa cagatttgga atcacacgac ctggatggag tgggacagag aaattaacaa   1440
ttacacaagc ttaatacact ccttaattga agaatcgcaa aaccagcaag aaaagaatga   1500
acaagaatta ttggaattag ataaatgggc aagtttgtgg aattggttta acataacaaa   1560
ttggctgtgg tatataaaat tattcataat gatagtagga ggcttggtag gtttaagaat   1620
agtttttgct gtactttcta tagtgaatag agttaggcag ggatattcac cattatcgtt   1680
tcagacccac ctcccaaccc cgaggggacc cgacaggccc gaaggaatag aagaagaagg   1740
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttggg tgcagcggcc tccgcgccgg   1980
gttttggcgc ctcccgcggg cgcccccctc ctcacggcga gcgctgccac gtcagacgaa   2040
gggcgcagcg agcgtcctga tccttccgcc cggacgctca ggacagcggc ccgctgctca   2100
taagactcgg ccttagaacc ccagtatcag cagaaggaca ttttaggacg ggacttgggt   2160
gactctaggg cactggtttt ctttccagag agcggaacag gcgaggaaaa gtagtccctt   2220
ctcggcgatt ctgcggaggg atctccgtgg ggcggtgaac gccgatgatt atataaggac   2280
gcgccgggtg tggcacagct agttccgtcg cagccgggat ttgggtcgcg gttcttgttt   2340
gtggatcgct gtgatcgtca cttggtgagt agcgggctgc tgggctggcc ggggctttcg   2400
tggccgccgg gccgctcggt gggacggaag cgtgtggaga gaccgccaag ggctgtagtc   2460
tgggtccgcg agcaaggttg ccctgaactg ggggttgggg ggagcgcagc aaaatggcgg   2520
ctgttcccga gtcttgaatg gaagacgctt gtgaggcggg ctgtgaggtc gttgaaacaa   2580
ggtggggggc atggtgggcg gcaagaaccc aaggtcttga ggccttcgct aatgcgggaa   2640
agctcttatt cgggtgagat gggctggggc accatctggg gaccctgacg tgaagtttgt   2700
```

```
cactgactgg agaactcggt ttgtcgtctg ttgcgggggc ggcagttatg gcggtgccgt   2760
tgggcagtgc acccgtacct ttgggagcgc gcgccctcgt cgtgtcgtga cgtcacccgt   2820
tctgttggct tataatgcag ggtggggcca cctgccggta ggtgtgcggt aggcttttct   2880
ccgtcgcagg acgcagggtt cgggcctagg gtaggctctc ctgaatcgac aggcgccgga   2940
cctctggtga ggggagggat aagtgaggcg tcagtttctt tggtcggttt tatgtaccta   3000
tcttcttaag tagctgaagc tccggttttg aactatgcgc tcggggttgg cgagtgtgtt   3060
ttgtgaagtt ttttaggcac cttttgaaat gtaatcattt gggtcaatat gtaattttca   3120
gtgttagact agtaaacaag tttgtacaaa aaagcaggct gccaccatgg tgagcaaggg   3180
cgaggagctg ttcaccgggg tggtgcccat cctggtcgag ctggacggcg acgtaaacgg   3240
ccacaagttc agcgtgtccg gcgagggcga gggcgatgcc acctacggca agctgaccct   3300
gaagttcatc tgcaccaccg gcaagctgcc cgtgccctgg cccaccctcg tgaccaccct   3360
gacctacggc gtgcagtgct tcagccgcta ccccgaccac atgaagcagc acgacttctt   3420
caagtccgcc atgcccgaag gctacgtcca ggagcgcacc atcttcttca aggacgacgg   3480
caactacaag acccgcgccg aggtgaagtt cgagggcgac accctggtga accgcatcga   3540
gctgaagggc atcgacttca aggaggacgg caacatcctg gggcacaagc tggagtacaa   3600
ctacaacagc cacaacgtct atatcatggc cgacaagcag aagaacggca tcaaggtgaa   3660
cttcaagatc cgccacaaca tcgaggacgg cagcgtgcag ctcgccgacc actaccagca   3720
gaacaccccc atcggcgacg gccccgtgct gctgcccgac aaccactacc tgagcaccca   3780
gtccgccctg agcaaagacc ccaacgagaa gcgcgatcac atggtcctgc tggagttcgt   3840
gaccgccgcc gggatcactc tcggcatgga cgagctgtac aagtaaaccc agctttcttg   3900
tacaaagtgg tgataatcga attccgataa tcaacctctg gattacaaaa tttgtgaaag   3960
attgactggt attcttaact atgttgctcc ttttacgcta tgtggatacg ctgctttaat   4020
gcctttgtat catgctattg cttcccgtat ggctttcatt ttctcctcct tgtataaatc   4080
ctggttgctg tctctttatg aggagttgtg gcccgttgtc aggcaacgtg gcgtggtgtg   4140
cactgtgttt gctgacgcaa cccccactgg ttggggcatt gccaccacct gtcagctcct   4200
ttccgggact ttcgctttcc ccctccctat tgccacggcg gaactcatcg ccgcctgcct   4260
tgcccgctgc tggacagggg ctcggctgtt gggcactgac aattccgtgg tgttgtcggg   4320
gaagctgacg tcctttccat ggctgctcgc ctgtgttgcc acctggattc tgcgcgggac   4380
gtccttctgc tacgtccctt cggccctcaa tccagcggac cttccttccc gcggcctgct   4440
gccggctctg cggcctcttc cgcgtcttcg ccttcgccct cagacgagtc ggatctccct   4500
ttgggccgcc tccccgcatc gggaattccc gcggttcgct ttaagaccaa tgacttacaa   4560
ggcagctgta gatcttagcc actttttaaa agaaaagggg ggactggaag ggctaattca   4620
ctcccaacga agacaagatc tgcttttttgc ttgtactggg tctctctggt tagaccagat   4680
ctgagcctgg gagctctctg gctaactagg gaacccactg cttaagcctc aataaagctt   4740
gccttgagtg cttcaagtag tgtgtgcccg tctgttgtgt gactctggta actagagatc   4800
cctcagaccc ttttagtcag tgtggaaaat ctctagcagt agtagttcat gtcatcttat   4860
tattcagtat ttataacttg caaagaaatg aatatcagag agtgagagga acttgtttat   4920
tgcagcttat aatggttaca aataaagcaa tagcatcaca aatttcacaa ataaagcatt   4980
tttttcactg cattctagtt gtggtttgtc caaactcatc aatgtatctt atcatgtctg   5040
gctctagcta tcccgcccct aactccgccc atcccgcccc taactccgcc cagttccgcc   5100
```

```
cattctccgc cccatggctg actaattttt tttatttatg cagaggccga ggccgcctcg   5160
gcctctgagc tattccagaa gtagtgagga ggcttttttg gaggcctagg gacgtaccca   5220
attcgcccta tagtgagtcg tattacgcgc gctcactggc cgtcgtttta caacgtcgtg   5280
actgggaaaa ccctggcgtt acccaactta atcgccttgc agcacatccc cctttcgcca   5340
gctggcgtaa tagcgaagag gcccgcaccg atcgcccttc ccaacagttg cgcagcctga   5400
atggcgaatg ggacgcgccc tgtagcggcg cattaagcgc ggcgggtgtg gtggttacgc   5460
gcagcgtgac cgctacactt gccagcgccc tagcgcccgc tcctttcgct ttcttccctt   5520
cctttctcgc cacgttcgcc ggctttcccc gtcaagctct aaatcggggg ctccctttag   5580
ggttccgatt tagtgcttta cggcacctcg accccaaaaa acttgattag ggtgatggtt   5640
cacgtagtgg gccatcgccc tgatagacgg tttttcgccc tttgacgttg gagtccacgt   5700
tctttaatag tggactcttg ttccaaactg gaacaacact caaccctatc tcggtctatt   5760
cttttgattt ataagggatt ttgccgattt cggcctattg gttaaaaaat gagctgattt   5820
aacaaaaatt taacgcgaat tttaacaaaa tattaacgct tacaatttag gtggcacttt   5880
tcggggaaat gtgcgcggaa cccctatttg tttatttttc taaatacatt caaatatgta   5940
tccgctcatg agacaataac cctgataaat gcttcaataa tattgaaaaa ggaagagtat   6000
gagtattcaa catttccgtg tcgcccttat tccctttttt gcggcatttt gccttcctgt   6060
ttttgctcac ccagaaacgc tggtgaaagt aaaagatgct gaagatcagt tgggtgcacg   6120
agtgggttac atcgaactgg atctcaacag cggtaagatc cttgagagtt ttcgccccga   6180
agaacgtttt ccaatgatga gcacttttaa agttctgcta tgtggcgcgg tattatcccg   6240
tattgacgcc gggcaagagc aactcggtcg ccgcatacac tattctcaga atgacttggt   6300
tgagtactca ccagtcacag aaaagcatct tacggatggc atgacagtaa gagaattatg   6360
cagtgctgcc ataaccatga gtgataacac tgcggccaac ttacttctga caacgatcgg   6420
aggaccgaag gagctaaccg cttttttgca caacatgggg gatcatgtaa ctcgccttga   6480
tcgttgggaa ccggagctga atgaagccat accaaacgac gagcgtgaca ccacgatgcc   6540
tgtagcaatg gcaacaacgt tgcgcaaact attaactggc gaactactta ctctagcttc   6600
ccggcaacaa ttaatagact ggatggaggc ggataaagtt gcaggaccac ttctgcgctc   6660
ggcccttccg gctggctggt ttattgctga taaatctgga gccggtgagc gtgggtctcg   6720
cggtatcatt gcagcactgg ggccagatgg taagccctcc cgtatcgtag ttatctacac   6780
gacggggagt caggcaacta tggatgaacg aaatagacag atcgctgaga taggtgcctc   6840
actgattaag cattggtaac tgtcagacca agtttactca tatatacttt agattgattt   6900
aaaacttcat ttttaattta aaaggatcta ggtgaagatc ctttttgata atctcatgac   6960
caaaatccct taacgtgagt tttcgttcca ctgagcgtca gaccccgtag aaaagatcaa   7020
aggatcttct tgagatcctt tttttctgcg cgtaatctgc tgcttgcaaa caaaaaaacc   7080
accgctacca gcggtggttt gtttgccgga tcaagagcta ccaactcttt ttccgaaggt   7140
aactggcttc agcagagcgc agataccaaa tactgttctt ctagtgtagc cgtagttagg   7200
ccaccacttc aagaactctg tagcaccgcc tacatacctc gctctgctaa tcctgttacc   7260
agtggctgct gccagtggcg ataagtcgtg tcttaccggg ttggactcaa gacgatagtt   7320
accggataag gcgcagcggt cgggctgaac ggggggttcg tgcacacagc ccagcttgga   7380
gcgaacgacc tacaccgaac tgagatacct acagcgtgag ctatgagaaa gcgccacgct   7440
```

```
tcccgaagag agaaaggcgg acaggtatcc ggtaagcggc agggtcggaa caggagagcg   7500
cacgagggag cttccagggg gaaacgcctg gtatctttat agtcctgtcg ggtttcgcca   7560
cctctgactt gagcgtcgat ttttgtgatg ctcgtcaggg gggcggagcc tatggaaaaa   7620
cgccagcaac gcggcctttt tacggttcct ggccttttgc tggccttttg ctcacatgtt   7680
ctttcctgcg ttatcccctg attctgtgga taaccgtatt accgcctttg agtgagctga   7740
taccgctcgc cgcagccgaa cgaccgagcg cagcgagtca gtgagcgagg aagcggaaga   7800
gcgcccaata cgcaaaccgc ctctccccgc gcgttggccg attcattaat gcagctggca   7860
cgacaggttt cccgactgga aagcgggcag tgagcgcaac gcaattaatg tgagttagct   7920
cactcattag gcaccccagg ctttacactt tatgcttccg gctcgtatgt tgtgtggaat   7980
tgtgagcgga taacaatttc acacaggaaa cagctatgac catgattacg ccaagcgcgc   8040
aattaaccct cactaaaggg aacaaaagct ggagctgcaa gctt                    8084
```

<210> SEQ ID NO 16
<211> LENGTH: 7756
<212> TYPE: DNA
<213> ORGANISM: Artificial Sequence
<220> FEATURE:
<223> OTHER INFORMATION: Synthetic lentiviral vector

<400> SEQUENCE: 16

```
aatgtagtct tatgcaatac tcttgtagtc ttgcaacatg gtaacgatga gttagcaaca     60
tgccttacaa ggagagaaaa agcaccgtgc atgccgattg gtggaagtaa ggtggtacga    120
tcgtgcctta ttaggaaggc aacagacggg tctgacatgg attggacgaa ccactgaatt    180
gccgcattgc agagatattg tatttaagtg cctagctcga tacataaacg ggtctctctg    240
gttagaccag atctgagcct gggagctctc tggctaacta gggaacccac tgcttaagcc    300
tcaataaagc ttgccttgag tgcttcaagt agtgtgtgcc cgtctgttgt gtgactctgg    360
taactagaga tccctcagac ccttttagtc agtgtggaaa atctctagca gtggcgcccg    420
aacagggact tgaaagcgaa agggaaacca gaggagctct ctcgacgcag gactcggctt    480
gctgaagcgc gcacggcaag aggcgagggg cggcgactgg tgagtacgcc aaaaattttg    540
actagcggag gctagaagga gagagatggg tgcgagagcg tcagtattaa gcgggggaga    600
attagatcgc gatgggaaaa aattcggtta aggccagggg gaaagaaaaa atataaatta    660
aaacatatag tatgggcaag cagggagcta gaacgattcg cagttaatcc tggcctgtta    720
gaaacatcag aaggctgtag acaaatactg ggacagctac aaccatccct tcagacagga    780
tcagaagaac ttagatcatt atataataca gtagcaaccc tctattgtgt gcatcaaagg    840
atagagataa aagacaccaa ggaagcttta gacaagatag aggaagagca aaacaaaagt    900
aagaccaccg cacagcaagc ggccgctgat cttcagacct ggaggaggag atatgaggga    960
caattggaga agtgaattat ataaatataa agtagtaaaa attgaaccat taggagtagc   1020
acccaccaag gcaaagagaa gagtggtgca gagagaaaaa agagcagtgg gaataggagc   1080
tttgttcctt gggttcttgg gagcagcagg aagcactatg ggcgcagcgt caatgacgct   1140
gacggtacag gccagacaat tattgtctgg tatagtgcag cagcagaaca atttgctgag   1200
ggctattgag gcgcaacagc atctgttgca actcacagtc tggggcatca agcagctcca   1260
ggcaagaatc ctggctgtgg aaagatacct aaaggatcaa cagctcctgg ggatttgggg   1320
ttgctctgga aaactcattt gcaccactgc tgtgccttgg aatgctagtt ggagtaataa   1380
atctctggaa cagatttgga atcacacgac ctggatggag tgggacagag aaattaacaa   1440
```

```
ttacacaagc ttaatacact ccttaattga agaatcgcaa aaccagcaag aaaagaatga   1500
acaagaatta ttggaattag ataaatgggc aagtttgtgg aattggttta acataacaaa   1560
ttggctgtgg tatataaaat tattcataat gatagtagga ggcttggtag gtttaagaat   1620
agtttttgct gtactttcta tagtgaatag agttaggcag ggatattcac cattatcgtt   1680
tcagacccac ctcccaaccc cgaggggacc cgacaggccc gaaggaatag aagaagaagg   1740
tggagagaga gacagagaca gatccattcg attagtgaac ggatctcgac ggtatcgcta   1800
gcttttaaaa gaaaaggggg gattgggggg tacagtgcag gggaaagaat agtagacata   1860
atagcaacag acatacaaac taaagaatta caaaaacaaa ttacaaaaat tcaaaatttt   1920
actagtgatt atcggatcaa ctttgtatag aaaagttgtt ctaccgggta ggggaggcgc   1980
ttttcccaag gcagtctgga gcatgcgctt tagcagcccc gctgggcact tggcgctaca   2040
caagtggcct ctggcctcgc acacattcca catccaccgg taggcgccaa ccggctccgt   2100
tctttggtgg ccccttcgcg ccaccttcta ctcctcccct agtcaggaag ttcccccccg   2160
ccccgcagct cgcgtcgtgc aggacgtgac aaatggaagt agcacgtctc actagtctcg   2220
tgcagatgga cagcaccgct gagcaatgga agcgggtagg cctttggggc agcggccaat   2280
agcagctttg ctccttcgct ttctgggctc agaggctggg aaggggtggg tccgggggcg   2340
ggctcagggg cgggctcagg ggcggggcgg gcgcccgaag gtcctccgga ggcccggcat   2400
tctgcacgct tcaaaagcgc acgtctgccg cgctgttctc ctcttcctca tctccgggcc   2460
tttcgacctc aagtttgtac aaaaaagcag gctgccacca tggaggggat cagtatatac   2520
acttcagata actacaccga ggaaatgggc tcaggggact atgactccat gaaggaaccc   2580
tgtttccgtg aagaaaatgc taatttcaat aaaatcttcc tgcccaccat ctactccatc   2640
atcttcttaa ctggcattgt gggcaatgga ttggtcatcc tggtcatggg ttaccagaag   2700
aaactgagaa gcatgacgga caagtacagg ctgcacctgt cagtggccga cctcctcttt   2760
gtcatcacgc ttcccttctg ggcagttgat gccgtggcaa actggtactt tgggaacttc   2820
ctatgcaagg cagtccatgt catctacaca gtcaacctct acagcagtgt cctcatcctg   2880
gccttcatca gtctggaccg ctacctggcc atcgtccacg ccaccaacag tcagaggcca   2940
aggaagctgt tggctgaaaa ggtggtctat gttggcgtct ggatccctgc cctcctgctg   3000
actattcccg acttcatctt tgccaacgtc agtgaggcag atgacagata tatctgtgac   3060
cgcttctacc ccaatgactt gtgggtggtt gtgttccagt ttcagcacat catggttggc   3120
cttatcctgc ctggtattgt catcctgtcc tgctattgca ttatcatctc caagctgtca   3180
cactccaagg gccaccagaa gcgcaaggcc ctcaagacca cagtcatcct catcctggct   3240
ttcttcgcct gttggctgcc ttactacatt gggatcagca tcgactcctt catcctcctg   3300
gaaatcatca agcaagggtg tgagtttgag aacactgtgc acaagtggat ttccatcacc   3360
gaggccctag ctttcttcca ctgttgtctg aaccccatcc tctatgcttt ccttggagcc   3420
aaatttaaaa cctctgccca gcacgcactc acctctgtga gcagagggtc cagcctcaag   3480
atcctctcca aaggaaagcg aggtggacat tcatctgttt ccactgagtc tgagtcttca   3540
agttttcact ccagctaaac ccagctttct tgtacaaagt ggtgataatc gaattccgat   3600
aatcaacctc tggattacaa aatttgtgaa agattgactg gtattcttaa ctatgttgct   3660
ccttttacgc tatgtggata cgctgcttta atgcctttgt atcatgctat tgcttcccgt   3720
atggctttca ttttctcctc cttgtataaa tcctggttgc tgtctcttta tgaggagttg   3780
```

-continued

```
tggcccgttg tcaggcaacg tggcgtggtg tgcactgtgt ttgctgacgc aacccccact   3840
ggttggggca ttgccaccac ctgtcagctc ctttccggga ctttcgcttt ccccctccct   3900
attgccacgg cggaactcat cgccgcctgc cttgcccgct gctggacagg ggctcggctg   3960
ttgggcactg acaattccgt ggtgttgtcg gggaagctga cgtcctttcc atggctgctc   4020
gcctgtgttg ccacctggat tctgcgcggg acgtccttct gctacgtccc ttcggccctc   4080
aatccagcgg accttccttc ccgcggcctg ctgccggctc tgcggcctct tccgcgtctt   4140
cgccttcgcc ctcagacgag tcggatctcc ctttgggccg cctccccgca tcgggaattc   4200
ccgcggttcg ctttaagacc aatgacttac aaggcagctg tagatcttag ccacttttta   4260
aaagaaaagg ggggactgga agggctaatt cactcccaac gaagacaaga tctgcttttt   4320
gcttgtactg ggtctctctg gttagaccag atctgagcct gggagctctc tggctaacta   4380
gggaacccac tgcttaagcc tcaataaagc ttgccttgag tgcttcaagt agtgtgtgcc   4440
cgtctgttgt gtgactctgg taactagaga tccctcagac ccttttagtc agtgtggaaa   4500
atctctagca gtagtagttc atgtcatctt attattcagt atttataact tgcaaagaaa   4560
tgaatatcag agagtgagag gaacttgttt attgcagctt ataatggtta caaataaagc   4620
aatagcatca caaatttcac aaataaagca tttttttcac tgcattctag ttgtggtttg   4680
tccaaactca tcaatgtatc ttatcatgtc tggctctagc tatcccgccc ctaactccgc   4740
ccatcccgcc cctaactccg cccagttccg cccattctcc gccccatggc tgactaattt   4800
tttttattta tgcagaggcc gaggccgcct cggcctctga gctattccag aagtagtgag   4860
gaggcttttt tggaggccta gggacgtacc caattcgccc tatagtgagt cgtattacgc   4920
gcgctcactg gccgtcgttt tacaacgtcg tgactgggaa aaccctggcg ttacccaact   4980
taatcgcctt gcagcacatc ccccctttcgc cagctggcgt aatagcgaag aggcccgcac   5040
cgatcgccct tcccaacagt tgcgcagcct gaatggcgaa tggacgcgc cctgtagcgg   5100
cgcattaagc gcggcgggtg tggtggttac gcgcagcgtg accgctacac ttgccagcgc   5160
cctagcgccc gctcctttcg ctttcttccc ttcctttctc gccacgttcg ccggctttcc   5220
ccgtcaagct ctaaatcggg ggctcccttt agggttccga tttagtgctt tacggcacct   5280
cgaccccaaa aaacttgatt agggtgatgg ttcacgtagt gggccatcgc cctgatagac   5340
ggtttttcgc cctttgacgt tggagtccac gttctttaat agtggactct tgttccaaac   5400
tggaacaaca ctcaacccta tctcggtcta ttcttttgat ttataaggga ttttgccgat   5460
ttcggcctat tggttaaaaa atgagctgat ttaacaaaaa tttaacgcga attttaacaa   5520
aatattaacg cttacaattt aggtggcact tttcggggaa atgtgcgcgg aacccctatt   5580
tgtttatttt tctaaataca ttcaaatatg tatccgctca tgagacaata accctgataa   5640
atgcttcaat aatattgaaa aaggaagagt atgagtattc aacatttccg tgtcgccctt   5700
attccctttt ttgcggcatt ttgccttcct gtttttgctc acccagaaac gctggtgaaa   5760
gtaaaagatg ctgaagatca gttgggtgca cgagtgggtt acatcgaact ggatctcaac   5820
agcggtaaga tccttgagag ttttcgcccc gaagaacgtt ttccaatgat gagcactttt   5880
aaagttctgc tatgtggcgc ggtattatcc cgtattgacg ccgggcaaga gcaactcggt   5940
cgccgcatac actattctca gaatgacttg gttgagtact caccagtcac agaaaagcat   6000
cttacggatg gcatgacagt aagagaatta tgcagtgctg ccataaccat gagtgataac   6060
actgcggcca acttacttct gacaacgatc ggaggaccga aggagctaac cgcttttttg   6120
cacaacatgg gggatcatgt aactcgcctt gatcgttggg aaccggagct gaatgaagcc   6180
```

```
ataccaaacg acgagcgtga caccacgatg cctgtagcaa tggcaacaac gttgcgcaaa   6240
ctattaactg gcgaactact tactctagct tcccggcaac aattaataga ctggatggag   6300
gcggataaag ttgcaggacc acttctgcgc tcggcccttc cggctggctg gtttattgct   6360
gataaatctg gagccggtga gcgtgggtct cgcggtatca ttgcagcact ggggccagat   6420
ggtaagccct cccgtatcgt agttatctac acgacgggga gtcaggcaac tatggatgaa   6480
cgaaatagac agatcgctga gataggtgcc tcactgatta agcattggta actgtcagac   6540
caagtttact catatatact ttagattgat ttaaaacttc atttttaatt taaaaggatc   6600
taggtgaaga tcctttttga taatctcatg accaaaatcc cttaacgtga gttttcgttc   6660
cactgagcgt cagaccccgt agaaaagatc aaaggatctt cttgagatcc tttttttctg   6720
cgcgtaatct gctgcttgca aacaaaaaaa ccaccgctac cagcggtggt ttgtttgccg   6780
gatcaagagc taccaactct ttttccgaag gtaactggct tcagcagagc gcagatacca   6840
aatactgttc ttctagtgta gccgtagtta ggccaccact tcaagaactc tgtagcaccg   6900
cctacatacc tcgctctgct aatcctgtta ccagtggctg ctgccagtgg cgataagtcg   6960
tgtcttaccg ggttggactc aagacgatag ttaccggata aggcgcagcg gtcgggctga   7020
acggggggtt cgtgcacaca gcccagcttg gagcgaacga cctacaccga actgagatac   7080
ctacagcgtg agctatgaga aagcgccacg cttcccgaag agagaaaggc ggacaggtat   7140
ccggtaagcg gcagggtcgg aacaggagag cgcacgaggg agcttccagg gggaaacgcc   7200
tggtatcttt atagtcctgt cgggtttcgc cacctctgac ttgagcgtcg atttttgtga   7260
tgctcgtcag gggggcggag cctatggaaa aacgccagca acgcggcctt tttacggttc   7320
ctggcctttt gctggccttt tgctcacatg ttctttcctg cgttatcccc tgattctgtg   7380
gataaccgta ttaccgcctt tgagtgagct gataccgctc gccgcagccg aacgaccgag   7440
cgcagcgagt cagtgagcga ggaagcggaa gagcgcccaa tacgcaaacc gcctctcccc   7500
gcgcgttggc cgattcatta atgcagctgg cacgacaggt ttcccgactg gaaagcgggc   7560
agtgagcgca acgcaattaa tgtgagttag ctcactcatt aggcacccca ggctttacac   7620
tttatgcttc cggctcgtat gttgtgtgga attgtgagcg gataacaatt tcacacagga   7680
aacagctatg accatgatta cgccaagcgc gcaattaacc ctcactaaag ggaacaaaag   7740
ctggagctgc aagctt                                                   7756
```

<210> SEQ ID NO 17
<211> LENGTH: 8767
<212> TYPE: DNA
<213> ORGANISM: Artificial Sequence
<220> FEATURE:
<223> OTHER INFORMATION: Synthetic lentiviral vector

<400> SEQUENCE: 17

```
aatgtagtct tatgcaatac tcttgtagtc ttgcaacatg gtaacgatga gttagcaaca     60
tgccttacaa ggagagaaaa agcaccgtgc atgccgattg gtggaagtaa ggtggtacga    120
tcgtgcctta ttaggaaggc aacagacggg tctgacatgg attggacgaa ccactgaatt    180
gccgcattgc agagatattg tatttaagtg cctagctcga tacataaacg ggtctctctg    240
gttagaccag atctgagcct gggagctctc tggctaacta gggaacccac tgcttaagcc    300
tcaataaagc ttgccttgag tgcttcaagt agtgtgtgcc cgtctgttgt gtgactctgg    360
taactagaga tccctcagac ccttttagtc agtgtggaaa atctctagca gtggcgcccg    420
```

-continued

```
aacagggact tgaaagcgaa agggaaacca gaggagctct ctcgacgcag gactcggctt    480

gctgaagcgc gcacggcaag aggcgagggg cggcgactgg tgagtacgcc aaaaattttg    540

actagcggag gctagaagga gagagatggg tgcgagagcg tcagtattaa gcgggggaga    600

attagatcgc gatgggaaaa aattcggtta aggccagggg gaaagaaaaa atataaatta    660

aaacatatag tatgggcaag cagggagcta gaacgattcg cagttaatcc tggcctgtta    720

gaaacatcag aaggctgtag acaaatactg ggacagctac aaccatccct tcagacagga    780

tcagaagaac ttagatcatt atataataca gtagcaaccc tctattgtgt gcatcaaagg    840

atagagataa aagacaccaa ggaagcttta gacaagatag aggaagagca aaacaaaagt    900

aagaccaccg cacagcaagc ggccgctgat cttcagacct ggaggaggag atatgaggga    960

caattggaga agtgaattat ataaatataa agtagtaaaa attgaaccat taggagtagc   1020

acccaccaag gcaaagagaa gagtggtgca gagagaaaaa agagcagtgg gaataggagc   1080

tttgttcctt gggttcttgg gagcagcagg aagcactatg ggcgcagcgt caatgacgct   1140

gacggtacag gccagacaat tattgtctgg tatagtgcag cagcagaaca atttgctgag   1200

ggctattgag gcgcaacagc atctgttgca actcacagtc tggggcatca agcagctcca   1260

ggcaagaatc ctggctgtgg aaagatacct aaaggatcaa cagctcctgg ggatttgggg   1320

ttgctctgga aaactcattt gcaccactgc tgtgccttgg aatgctagtt ggagtaataa   1380

atctctggaa cagatttgga atcacacgac ctggatggag tgggacagag aaattaacaa   1440

ttacacaagc ttaatacact ccttaattga agaatcgcaa aaccagcaag aaaagaatga   1500

acaagaatta ttggaattag ataaatgggc aagtttgtgg aattggttta acataacaaa   1560

ttggctgtgg tatataaaat tattcataat gatagtagga ggcttggtag gtttaagaat   1620

agtttttgct gtactttcta tagtgaatag agttaggcag ggatattcac cattatcgtt   1680

tcagacccac ctcccaaccc cgaggggacc cgacaggccc gaaggaatag aagaagaagg   1740

tggagagaga gacagagaca gatccattcg attagtgaac ggatctcgac ggtatcgcta   1800

gcttttaaaa gaaaaggggg gattgggggg tacagtgcag gggaaagaat agtagacata   1860

atagcaacag acatacaaac taaagaatta caaaaacaaa ttacaaaaat tcaaaatttt   1920

actagtgatt atcggatcaa ctttgtatag aaaagttgtt ctaccgggta ggggaggcgc   1980

ttttcccaag gcagtctgga gcatgcgctt tagcagcccc gctgggcact tggcgctaca   2040

caagtggcct ctggcctcgc acacattcca catccaccgg taggcgccaa ccggctccgt   2100

tctttggtgg ccccttcgcg ccaccttcta ctcctcccct agtcaggaag ttcccccccg   2160

ccccgcagct cgcgtcgtgc aggacgtgac aaatggaagt agcacgtctc actagtctcg   2220

tgcagatgga cagcaccgct gagcaatgga agcgggtagg cctttggggc agcggccaat   2280

agcagctttg ctccttcgct ttctgggctc agaggctggg aaggggtggg tccgggggcg   2340

ggctcagggg cgggctcagg ggcggggcgg gcgcccgaag gtcctccgga ggcccggcat   2400

tctgcacgct tcaaaagcgc acgtctgccg cgctgttctc ctcttcctca tctccgggcc   2460

tttcgacctc aagtttgtac aaaaaagcag gctgccacca tgccgcgggg ctggaccgcg   2520

ctttgcttgc tgagtttgct gccttctggg ttcatgagtc ttgacaacaa cggtactgct   2580

accccagagt tacctaccca gggaacattt tcaaatgttt ctacaaatgt atcctaccaa   2640

gaaactacaa cacctagtac ccttggaagt accagcctgc accctgtgtc tcaacatggc   2700

aatgaggcca caacaaacat cacagaaacg acagtcaaat tcacatctac ctctgtgata   2760

acctcagttt atggaaacac aaactcttct gtccagtcac agacctctgt aatcagcaca   2820
```

```
gtgttcacca ccccagccaa cgtttcaact ccagagacaa ccttgaagcc tagcctgtca   2880
cctggaaatg tttcagacct ttcaaccact agcactagcc ttgcaacatc tcccactaaa   2940
ccctatacat catcttctcc tatcctaagt gacatcaagg cagaaatcaa atgttcaggc   3000
atcagagaag tgaaattgac tcagggcatc tgcctggagc aaaataagac ctccagctgt   3060
gcggagttta agaaggacag gggagagggc ctggcccgag tgctgtgtgg ggaggagcag   3120
gctgatgctg atgctggggc ccaggtatgc tccctgctcc ttgcccagtc tgaggtgagg   3180
cctcagtgtc tactgctggt cttggccaac agaacagaaa tttccagcaa actccaactt   3240
atgaaaaagc accaatctga cctgaaaaag ctggggatcc tagatttcac tgagcaagat   3300
gttgcaagcc accagagcta ttcccaaaag accctgattg cactggtcac ctcgggagcc   3360
ctgctggctg tcttgggcat cactggctat ttcctgatga atcgccgcag ctggagcccc   3420
acaggagaaa ggctggaact agaaccagga agcggagagg gcaggggaag tcttctaaca   3480
tgcggggacg tggaggaaaa tcccggcccc atggagggga tcagtatata cacttcagat   3540
aactacaccg aggaaatggg ctcaggggac tatgactcca tgaaggaacc ctgtttccgt   3600
gaagaaaatg ctaatttcaa taaaatcttc ctgcccacca tctactccat catcttctta   3660
actggcattg tgggcaatgg attggtcatc ctggtcatgg gttaccagaa gaaactgaga   3720
agcatgacgg acaagtacag gctgcacctg tcagtggccg acctcctctt tgtcatcacg   3780
cttcccttct gggcagttga tgccgtggca aactggtact ttgggaactt cctatgcaag   3840
gcagtccatg tcatctacac agtcaacctc tacagcagtg tcctcatcct ggccttcatc   3900
agtctggacc gctacctggc catcgtccac gccaccaaca gtcagaggcc aaggaagctg   3960
ttggctgaaa aggtggtcta tgttggcgtc tggatccctg ccctcctgct gactattccc   4020
gacttcatct ttgccaacgt cagtgaggca gatgacagat atatctgtga ccgcttctac   4080
cccaatgact tgtgggtggt tgtgttccag tttcagcaca tcatggttgg ccttatcctg   4140
cctggtattg tcatcctgtc ctgctattgc attatcatct ccaagctgtc acactccaag   4200
ggccaccaga agcgcaaggc cctcaagacc acagtcatcc tcatcctggc tttcttcgcc   4260
tgttggctgc cttactacat tgggatcagc atcgactcct tcatcctcct ggaaatcatc   4320
aagcaagggt gtgagtttga gaacactgtg cacaagtgga tttccatcac cgaggcccta   4380
gctttcttcc actgttgtct gaaccccatc ctctatgctt tccttggagc caaatttaaa   4440
acctctgccc agcacgcact cacctctgtg agcagagggt ccagcctcaa gatcctctcc   4500
aaaggaaagc gaggtggaca ttcatctgtt tccactgagt ctgagtcttc aagttttcac   4560
tccagctaaa cccagctttc ttgtacaaag tggtgataat cgaattccga taatcaacct   4620
ctggattaca aaatttgtga aagattgact ggtattctta actatgttgc tccttttacg   4680
ctatgtggat acgctgcttt aatgcctttg tatcatgcta ttgcttcccg tatggctttc   4740
attttctcct ccttgtataa atcctggttg ctgtctcttt atgaggagtt gtggcccgtt   4800
gtcaggcaac gtggcgtggt gtgcactgtg tttgctgacg caacccccac tggttggggc   4860
attgccacca cctgtcagct cctttccggg actttcgctt tccccctccc tattgccacg   4920
gcggaactca tcgccgcctg ccttgcccgc tgctggacag gggctcggct gttgggcact   4980
gacaattccg tggtgttgtc ggggaagctg acgtcctttc catggctgct cgcctgtgtt   5040
gccacctgga ttctgcgcgg gacgtccttc tgctacgtcc cttcggccct caatccagcg   5100
gaccttcctt cccgcggcct gctgccggct ctgcggcctc ttccgcgtct tcgccttcgc   5160
```

```
cctcagacga gtcggatctc cctttgggcc gcctccccgc atcgggaatt cccgcggttc   5220
gctttaagac caatgactta caaggcagct gtagatctta gccacttttt aaaagaaaag   5280
gggggactgg aagggctaat tcactcccaa cgaagacaag atctgctttt tgcttgtact   5340
gggtctctct ggttagacca gatctgagcc tgggagctct ctggctaact agggaaccca   5400
ctgcttaagc ctcaataaag cttgccttga gtgcttcaag tagtgtgtgc ccgtctgttg   5460
tgtgactctg gtaactagag atccctcaga cccttttagt cagtgtggaa aatctctagc   5520
agtagtagtt catgtcatct tattattcag tatttataac ttgcaaagaa atgaatatca   5580
gagagtgaga ggaacttgtt tattgcagct tataatggtt acaaataaag caatagcatc   5640
acaaatttca caaataaagc atttttttca ctgcattcta gttgtggttt gtccaaactc   5700
atcaatgtat cttatcatgt ctggctctag ctatcccgcc cctaactccg cccatcccgc   5760
ccctaactcc gcccagttcc gcccattctc cgccccatgg ctgactaatt ttttttattt   5820
atgcagaggc cgaggccgcc tcggcctctg agctattcca gaagtagtga ggaggctttt   5880
ttggaggcct agggacgtac ccaattcgcc ctatagtgag tcgtattacg cgcgctcact   5940
ggccgtcgtt ttacaacgtc gtgactggga aaaccctggc gttacccaac ttaatcgcct   6000
tgcagcacat ccccctttcg ccagctggcg taatagcgaa gaggcccgca ccgatcgccc   6060
ttcccaacag ttgcgcagcc tgaatggcga atgggacgcg ccctgtagcg gcgcattaag   6120
cgcggcgggt gtggtggtta cgcgcagcgt gaccgctaca cttgccagcg ccctagcgcc   6180
cgctcctttc gctttcttcc cttcctttct cgccacgttc gccggctttc cccgtcaagc   6240
tctaaatcgg gggctccctt tagggttccg atttagtgct ttacggcacc tcgaccccaa   6300
aaaacttgat tagggtgatg gttcacgtag tgggccatcg ccctgataga cggtttttcg   6360
ccctttgacg ttggagtcca cgttctttaa tagtggactc ttgttccaaa ctggaacaac   6420
actcaaccct atctcggtct attcttttga tttataaggg attttgccga tttcggccta   6480
ttggttaaaa aatgagctga tttaacaaaa atttaacgcg aattttaaca aaatattaac   6540
gcttacaatt taggtggcac ttttcgggga aatgtgcgcg gaacccctat ttgtttattt   6600
ttctaaatac attcaaatat gtatccgctc atgagacaat aaccctgata aatgcttcaa   6660
taatattgaa aaaggaagag tatgagtatt caacatttcc gtgtcgccct tattcccttt   6720
tttgcggcat tttgccttcc tgtttttgct cacccagaaa cgctggtgaa agtaaaagat   6780
gctgaagatc agttgggtgc acgagtgggt tacatcgaac tggatctcaa cagcggtaag   6840
atccttgaga gttttcgccc cgaagaacgt tttccaatga tgagcacttt taaagttctg   6900
ctatgtggcg cggtattatc ccgtattgac gccgggcaag agcaactcgg tcgccgcata   6960
cactattctc agaatgactt ggttgagtac tcaccagtca cagaaaagca tcttacggat   7020
ggcatgacag taagagaatt atgcagtgct gccataacca tgagtgataa cactgcggcc   7080
aacttacttc tgacaacgat cggaggaccg aaggagctaa ccgctttttt gcacaacatg   7140
ggggatcatg taactcgcct tgatcgttgg gaaccggagc tgaatgaagc cataccaaac   7200
gacgagcgtg acaccacgat gcctgtagca atggcaacaa cgttgcgcaa actattaact   7260
ggcgaactac ttactctagc ttcccggcaa caattaatag actggatgga ggcggataaa   7320
gttgcaggac cacttctgcg ctcggccctt ccggctggct ggtttattgc tgataaatct   7380
ggagccggtg agcgtgggtc tcgcggtatc attgcagcac tggggccaga tggtaagccc   7440
tcccgtatcg tagttatcta cacgacgggg agtcaggcaa ctatggatga acgaaataga   7500
cagatcgctg agataggtgc ctcactgatt aagcattggt aactgtcaga ccaagtttac   7560
```

-continued

```
tcatatatac tttagattga tttaaaactt catttttaat ttaaaaggat ctaggtgaag   7620
atcctttttg ataatctcat gaccaaaatc ccttaacgtg agttttcgtt ccactgagcg   7680
tcagaccccg tagaaaagat caaaggatct tcttgagatc ctttttttct gcgcgtaatc   7740
tgctgcttgc aaacaaaaaa accaccgcta ccagcggtgg tttgtttgcc ggatcaagag   7800
ctaccaactc tttttccgaa ggtaactggc ttcagcagag cgcagatacc aaatactgtt   7860
cttctagtgt agccgtagtt aggccaccac ttcaagaact ctgtagcacc gcctacatac   7920
ctcgctctgc taatcctgtt accagtggct gctgccagtg gcgataagtc gtgtcttacc   7980
gggttggact caagacgata gttaccggat aaggcgcagc ggtcgggctg aacggggggt   8040
tcgtgcacac agcccagctt ggagcgaacg acctacaccg aactgagata cctacagcgt   8100
gagctatgag aaagcgccac gcttcccgaa gagagaaagg cggacaggta tccggtaagc   8160
ggcagggtcg gaacaggaga gcgcacgagg gagcttccag ggggaaacgc ctggtatctt   8220
tatagtcctg tcgggtttcg ccacctctga cttgagcgtc gatttttgtg atgctcgtca   8280
ggggggcgga gcctatggaa aaacgccagc aacgcggcct ttttacggtt cctggccttt   8340
tgctggcctt ttgctcacat gttctttcct gcgttatccc ctgattctgt ggataaccgt   8400
attaccgcct ttgagtgagc tgataccgct cgccgcagcc gaacgaccga gcgcagcgag   8460
tcagtgagcg aggaagcgga agagcgccca atacgcaaac cgcctctccc cgcgcgttgg   8520
ccgattcatt aatgcagctg gcacgacagg tttcccgact ggaaagcggg cagtgagcgc   8580
aacgcaatta atgtgagtta gctcactcat taggcacccc aggctttaca ctttatgctt   8640
ccggctcgta tgttgtgtgg aattgtgagc ggataacaat ttcacacagg aaacagctat   8700
gaccatgatt acgccaagcg cgcaattaac cctcactaaa gggaacaaaa gctggagctg   8760
caagctt                                                             8767
```

METHODS OF PRODUCING MODIFIED NATURAL KILLER CELLS AND METHODS OF USE

CROSS REFERENCE TO RELATED APPLICATIONS

This application is a divisional of U.S. application Ser. No. 15/801,085, filed Nov. 1, 2017, which is a continuation-in-part of International Application No. PCT/US2017/043774, filed Jul. 25, 2017, which claims the benefit of U.S. Provisional Application No. 62/366,493, filed Jul. 25, 2016, both of which are herein incorporated by reference in their entirety.

FIELD

This disclosure relates to methods of producing modified natural killer cells, compositions comprising the modified natural killer cells, and methods of their use.

BACKGROUND

Besides antigen-specific cytotoxic T lymphocytes, cellular components of the innate immune system can contribute to immune surveillance of malignant cell growth. In particular, natural killer (NK) cells can eliminate abnormal cells without priming or sensitization. Their activity is determined by the balance of signals from inhibitory and activating NK cell receptors. Inhibitory receptors, such as killer immunoglobulin receptors (KIRs), interact with self major histocompatibility complex (MHC) class I antigens and protect normal cells from NK cell attack.

Efforts at harnessing the anti-tumor activity of NK cells have been investigated for the immunotherapy of human cancer for over two decades. However, many malignant cells express MHC class I antigens and are thus naturally resistant to lysis by autologous NK cells. Accordingly, the first clinical trials using adoptive transfer of autologous NK cells have failed to produce significant therapeutic effects. Modulation of NK cell cytokine, chemokine, and activation/inhibitory receptor expression is an attractive strategy to bolster NK cell anti-tumor activity. However, efficient genetic modification of primary NK cells has been difficult to achieve.

SUMMARY

There is a need for simple and efficient gene transfer methods to effectively deliver and express genes of interest in primary NK cells. Disclosed herein are efficient viral vector-based methods for gene transfer into NK cells that demonstrate stable and robust long-term expression of transgenes.

Disclosed herein are method of producing NK cells that include or express one or more heterologous nucleic acids (referred to herein in some examples as "modified" NK cells). The methods include culturing a population of isolated NK cells (such as NK cells isolated or purified from a subject) in the presence of one or more cytokines (for example, interleukin (IL)-2, IL-15, and/or IL-21) to produce a population of activated NK cells. The population of activated NK cells are transduced with a viral vector including the one or more heterologous nucleic acids, for example by contacting the activated NK cells with viral particles including the viral vector. The resulting transduced NK cells are then cultured in the presence of one or more cytokines (for example, IL-2), and optionally in the presence of feeder cells, to produce a population of expanded transduced NK cells.

Also disclosed herein are methods of treating a subject with a disorder (such as a tumor or hyperproliferative disorder or a viral infection) with the modified NK cells. In some embodiments, the methods include obtaining a population of isolated NK cells from the subject or from a donor and culturing the population of isolated NK cells in the presence of one or more cytokines (for example, IL-2, IL-15, and/or IL-21) to produce a population of activated NK cells. The population of activated NK cells are transduced with a viral vector including one or more heterologous nucleic acids suitable for treating the subject's disorder, for example by contacting the activated NK cells with viral particles including the viral vector. The resulting transduced NK cells are then cultured in the presence of one or more cytokines (for example, IL-2), and optionally in the presence of feeder cells, to produce a population of expanded transduced NK cells, which are administered to the subject (for example, in a composition including a pharmaceutically acceptable carrier).

Also disclosed herein are modified NK cells (such as a population of modified NK cells) including one or more heterologous nucleic acids, such as NK cells transduced with a viral vector (such as a lentiviral vector) that includes one or more nucleic acids of interest. In some examples, the heterologous nucleic acid encodes CXCR4, CCR7, CXCR3, or CD16 (for example, high affinity CD16 or CD16-V158). Additional nucleic acids of interest are shown in Table 1, below. Also disclosed are compositions that include modified NK cells (such as a population of modified NK cells) and a pharmaceutically acceptable carrier. In some embodiments, the modified NK cells are produced by the methods disclosed herein.

The foregoing and other features of the disclosure will become more apparent from the following detailed description, which proceeds with reference to the accompanying figures.

post-transduction in NK cells primed with 500 IU/ml IL-2 for three days prior to transduction.

Figure 6:
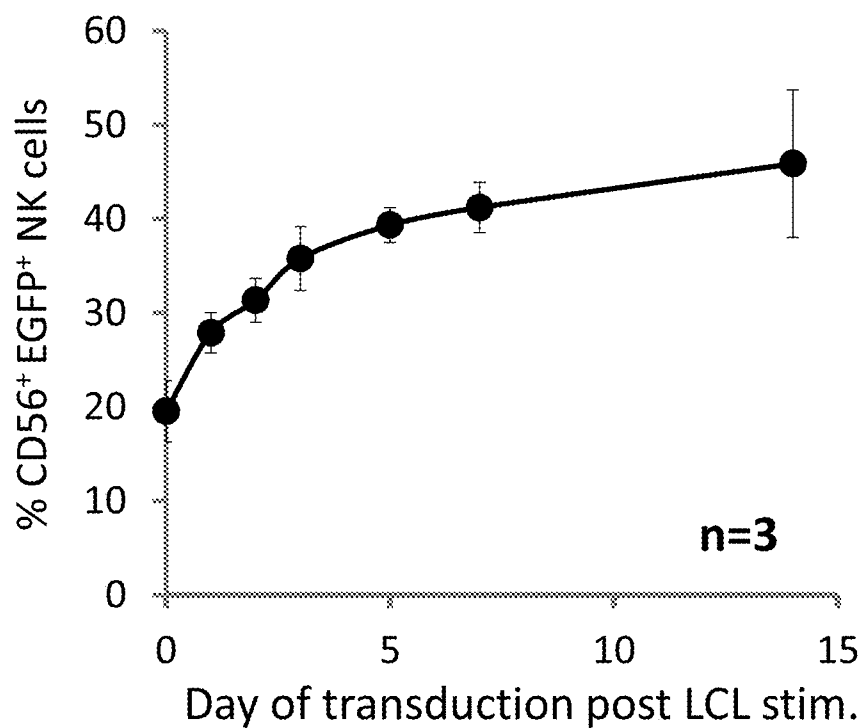

FIG. 6 is a graph showing transduction efficiency in CD56+ NK cells cultured on irradiated LCLs in media containing 500 IU/ml IL-2 for the indicated number of days prior to transduction. Two days after transduction, viral particles were removed and the cells were maintained in media containing 500 IU/ml IL-2. eGFP expression was analyzed by FACs seven days post-transduction.

Figure 7:
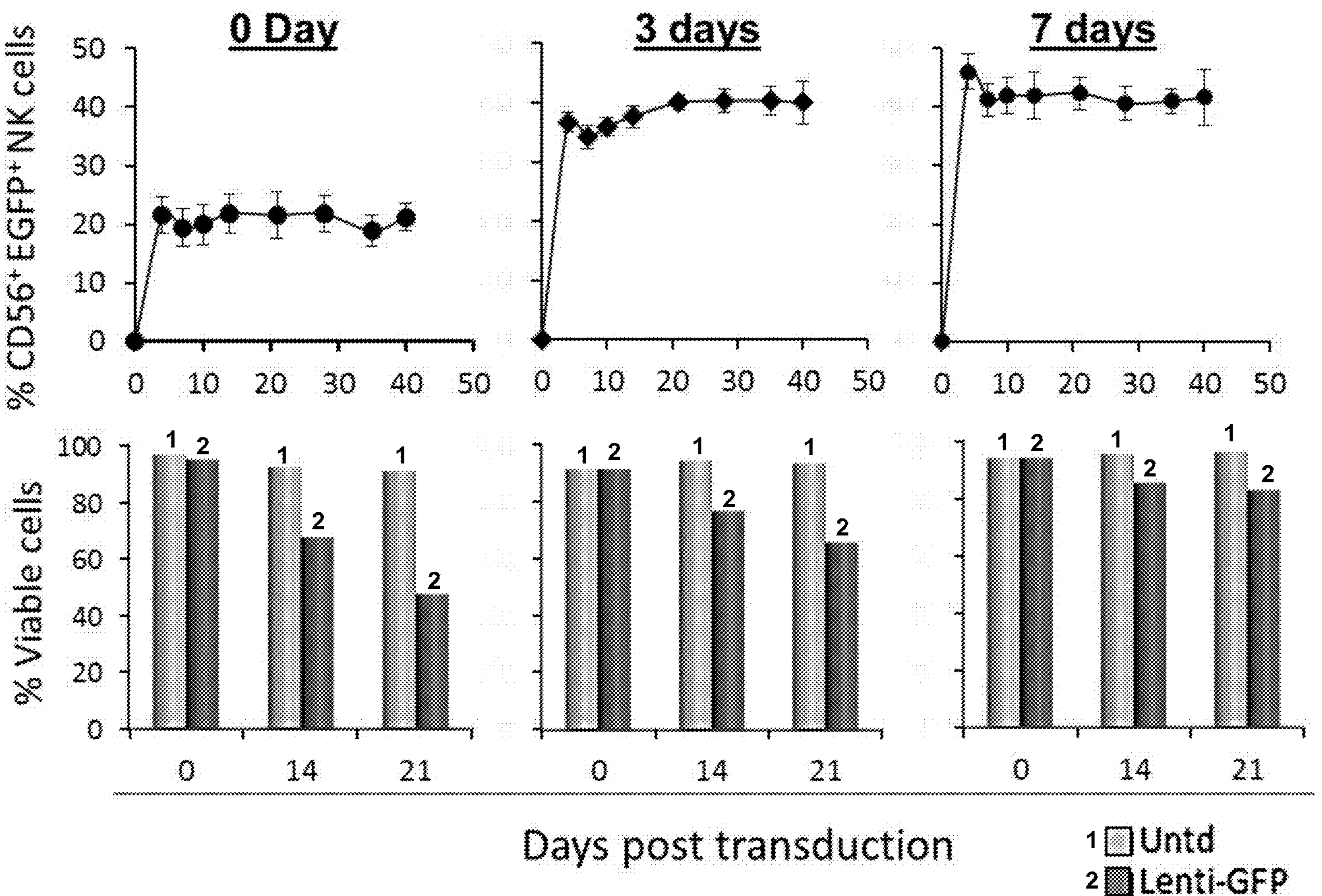

FIG. 7 is a series of graphs showing persistence of eGFP expression in transduced NK cells (top) and cell viability (bottom) at the indicated number of days post-transduction. Cells were cultured in medium containing 500 IU/ml IL-2 and irradiated feeder cells for 0, 3, or 7 days prior to transduction. eGFP expression was analyzed by FACS and cell viability was determined by trypan blue.

Figure 8A:
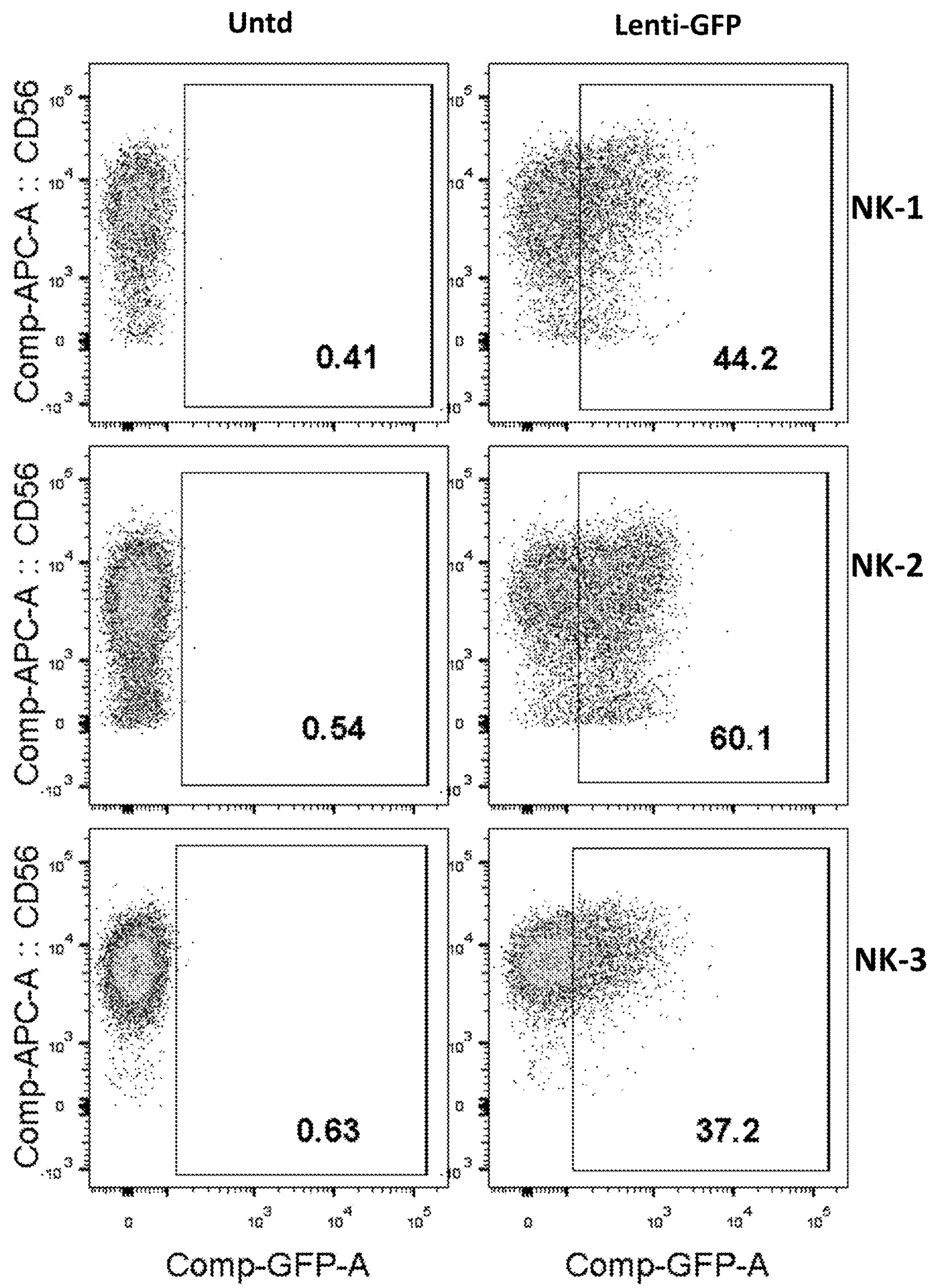
Figure 8B:
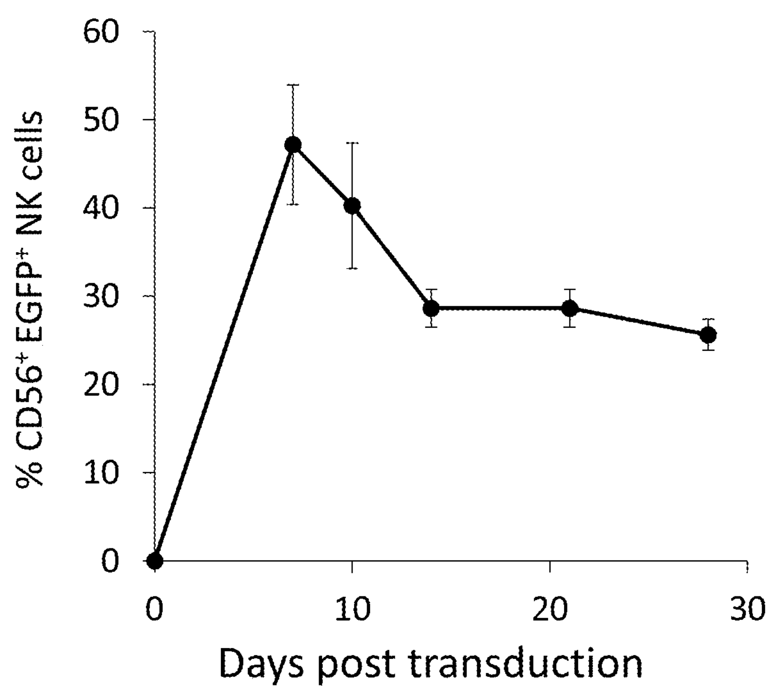

FIGS. 8A and 8B are a series of panels showing transduction efficiency of primary peripheral blood NK cells from three subjects (NK-1, NK-2, NK-3), expanded with irradiated LCL and 500 IU/ml IL-2 for 14 days prior to transduction. FIG. 8A shows FACS analysis of each cell line seven days post-transduction. FIG. 8B is a graph quantitating percent of CD56+ eGFP+ NK cells on the indicated number of days post-transduction.

Figure 9:
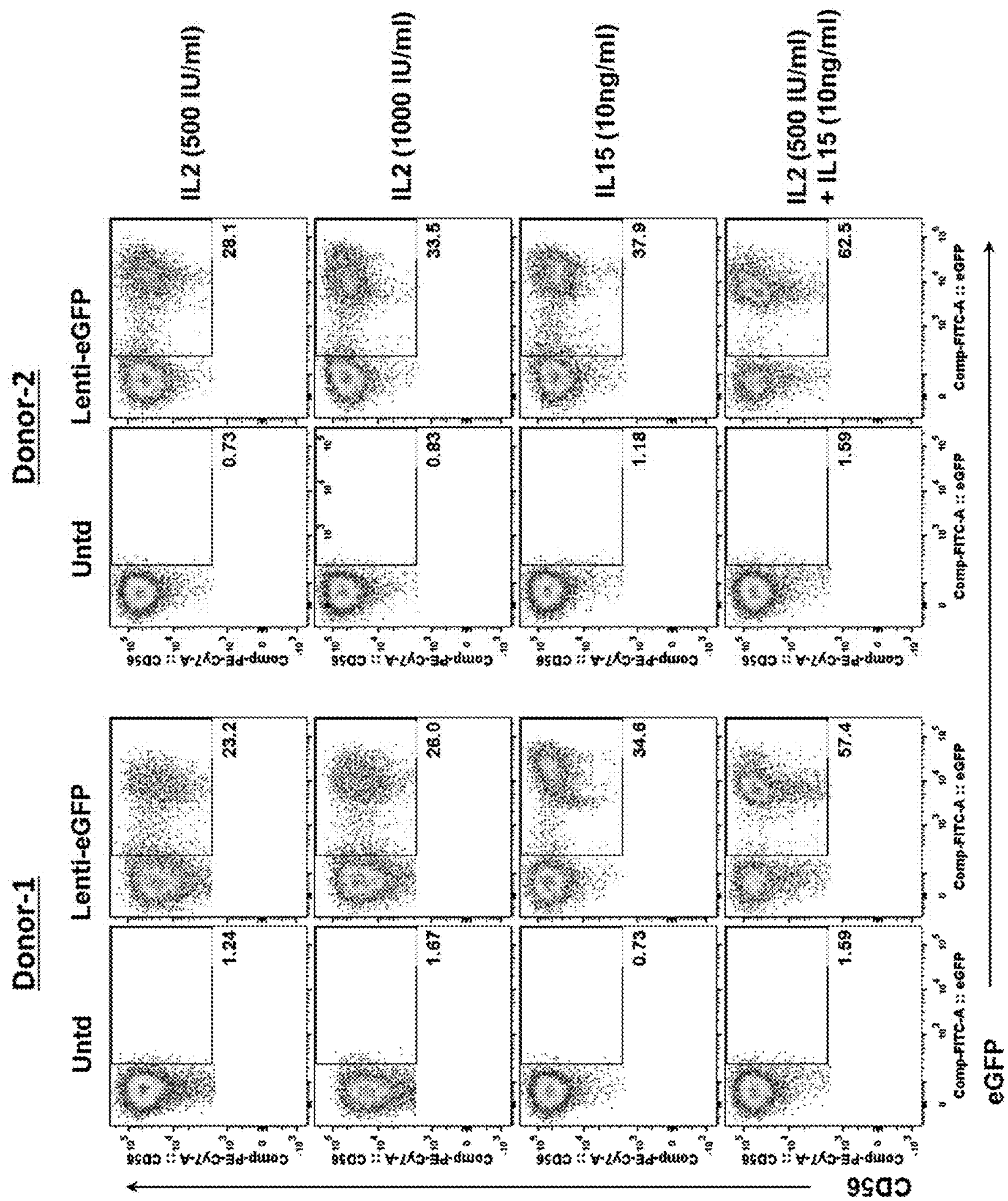

FIG. 9 is a series of panels showing eGFP expression in NK cells primed with 500 IU/ml IL-2 (top row), 1000 IU/ml IL-2 (second row), 10 ng/ml IL-15 (third row), or 500 IU/ml IL-2 plus 10 ng/ml IL-15 (bottom row) for three days prior to transduction. Two days post-transduction, viral particles were removed and cells were maintained on irradiated LCLs (10:1 LCL:NK) with 500 IU/ml IL-2. eGFP expression was analyzed by FACS two weeks post-transduction.

Figure 10:
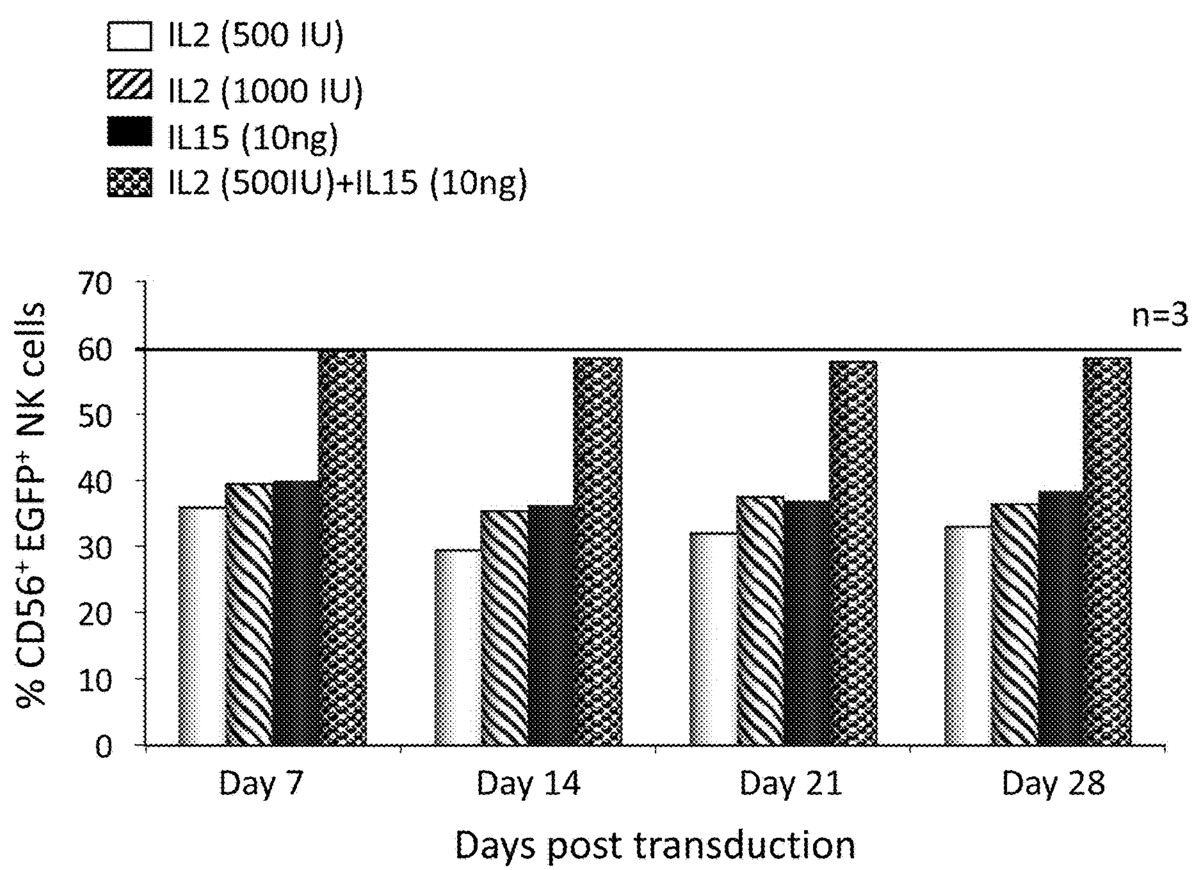

FIG. 10 is a graph showing persistence of transgene expression at the indicated number of days post-transduction with the indicated treatment for three days prior to transduction.

Figure 11:
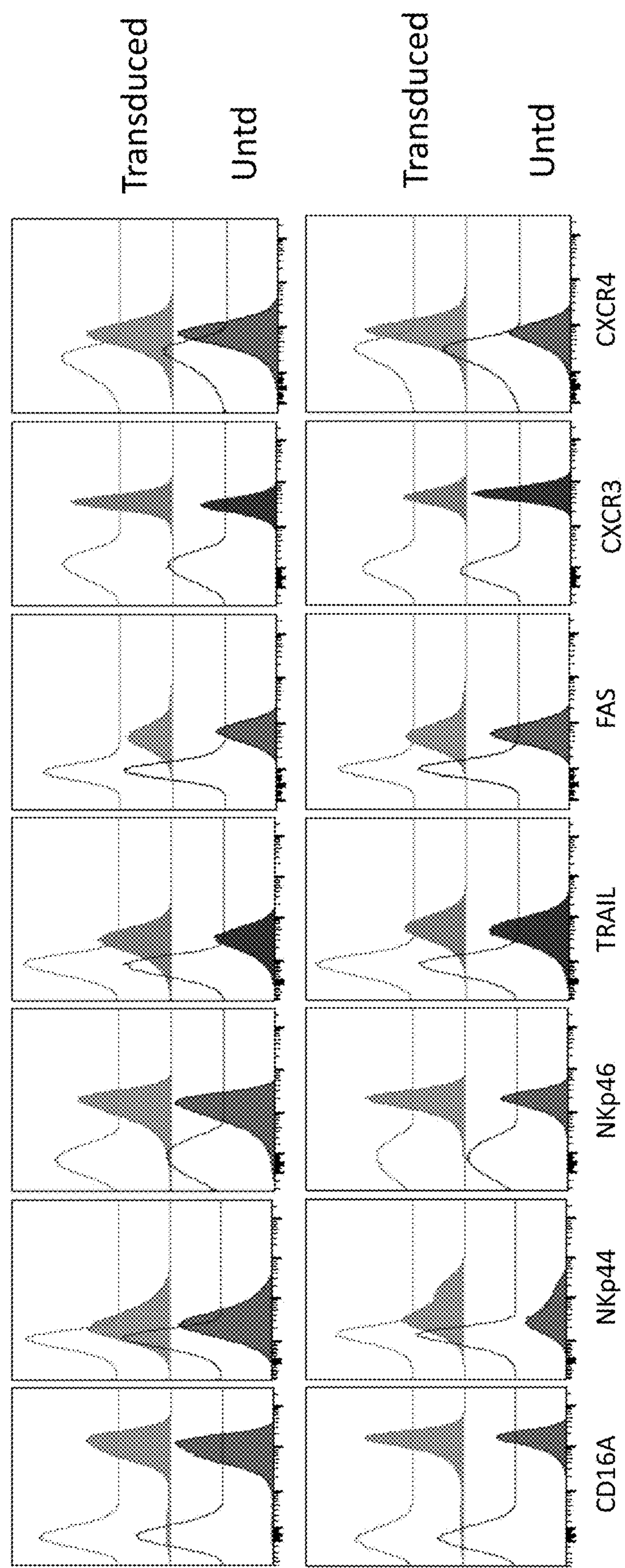

FIG. 11 is a series of panels showing expression of the indicated receptors on NK cells primed with 500 IU/ml IL (top) or 500 IU/ml IL-2 plus 10 ng/ml IL-15 (bottom) for three days prior to transduction. Two days post-transduction, viral particles were removed and irradiated LCLs (10:1 LCL:NK cells) were added and cells were maintained in media with 500 IU/ml IL-2. Analysis was by FACS at two weeks post-transduction. Open traces, IsoAb, filled traces, Ag-specific Ab.

Figure 12:
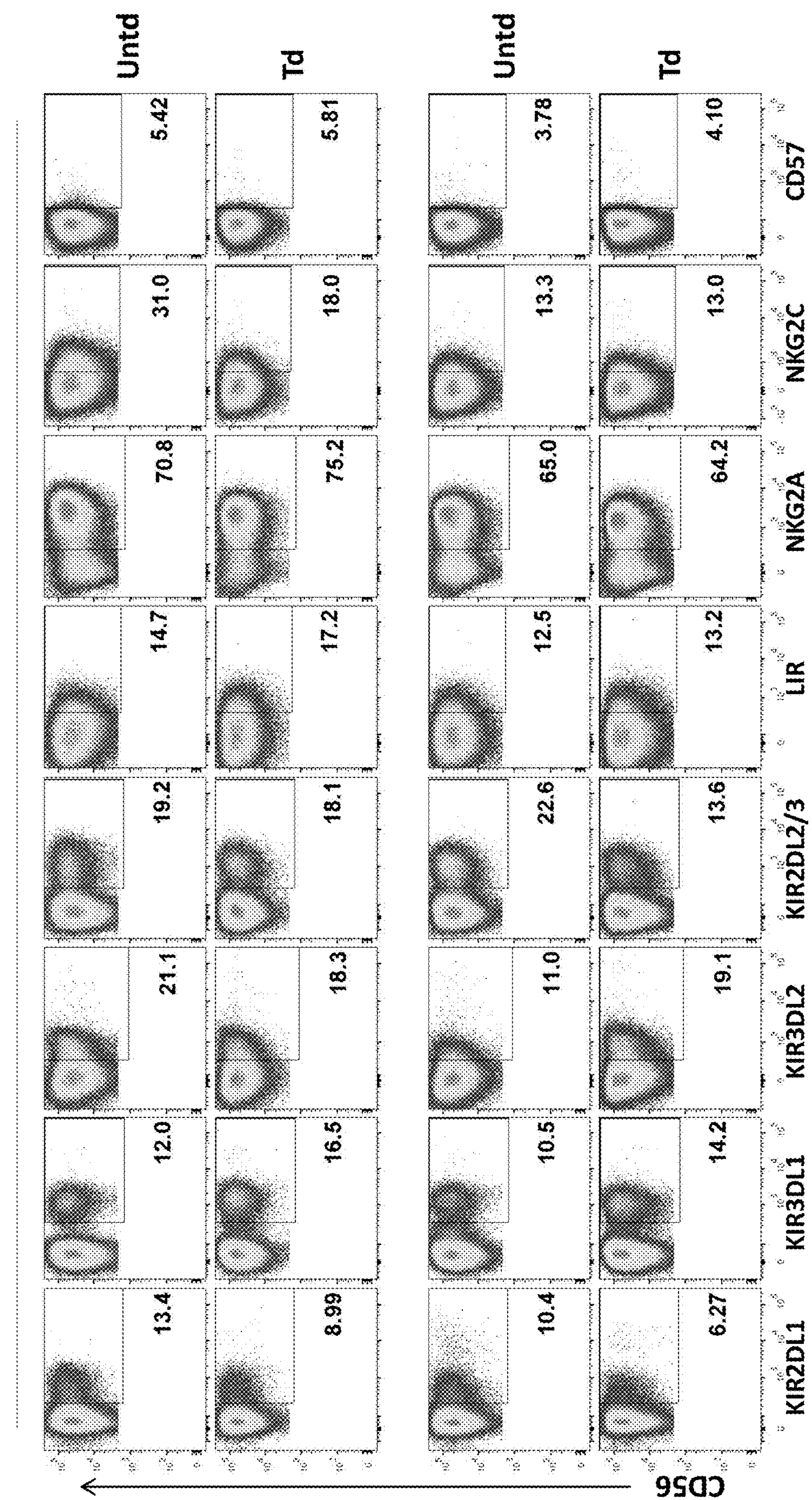

FIG. 12 is a series of panels showing expression of the indicated receptors on NK cells primed with 500 IU/ml IL (top) or 500 IU/ml IL-2 plus 10 ng/ml IL-15 (bottom) for three days prior to transduction. Two days post-transduction, viral particles were removed and irradiated LCLs (10:1 LCL:NK cells) were added and cells were maintained in media with 500 IU/ml IL-2. Analysis was by FACS at two weeks post-transduction.

Figure 13:
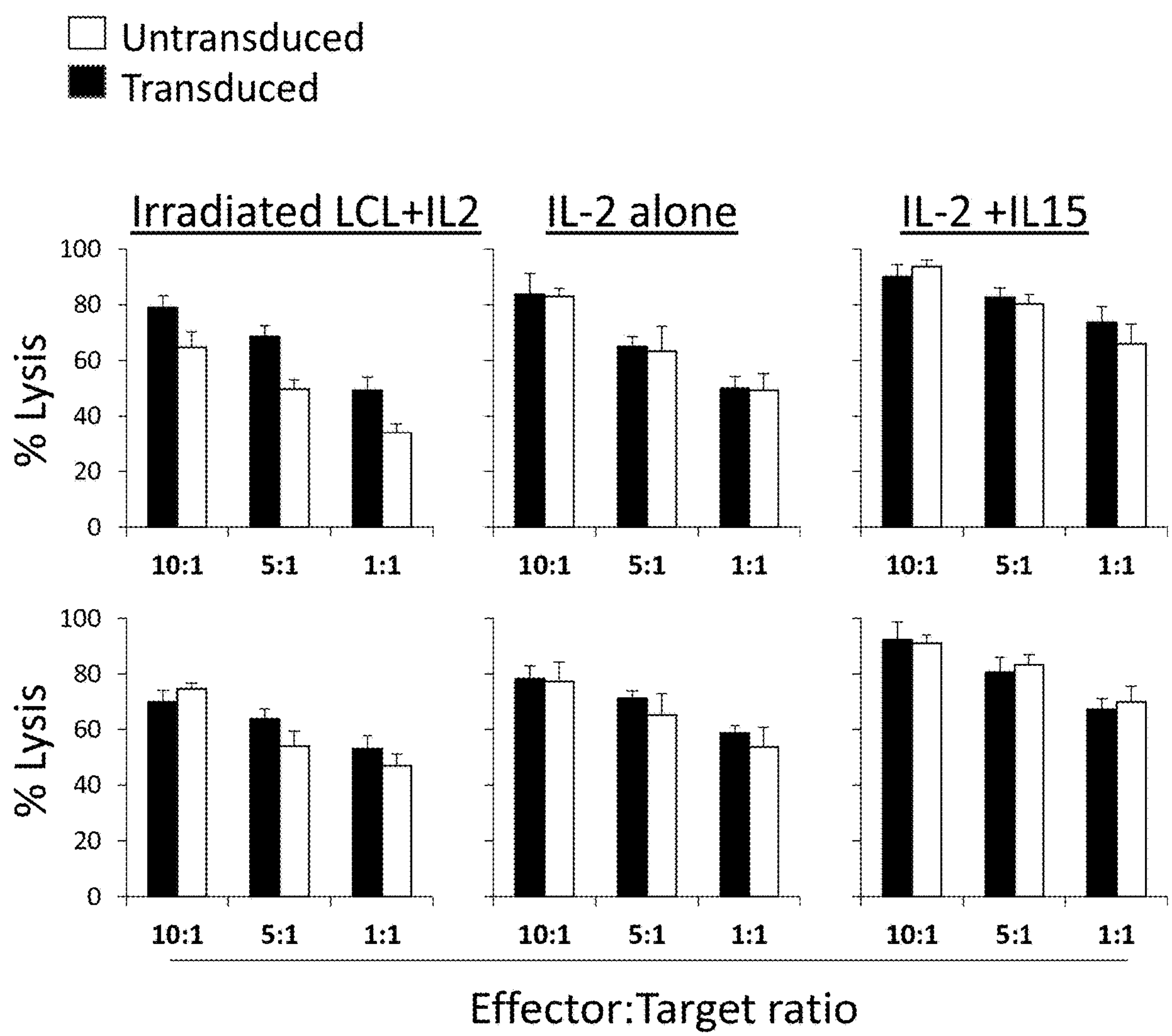

FIG. 13 is a series of graphs showing tumor cell lysis of K562 cells (top) or MOLM14 cells (bottom) in NK cells primed with the indicated conditions for three days prior to transduction. Cells were expanded with irradiated LCLs for 14 days prior to testing their tumor killing capacity by $^{51}$Cr release assay.

Figure 14:
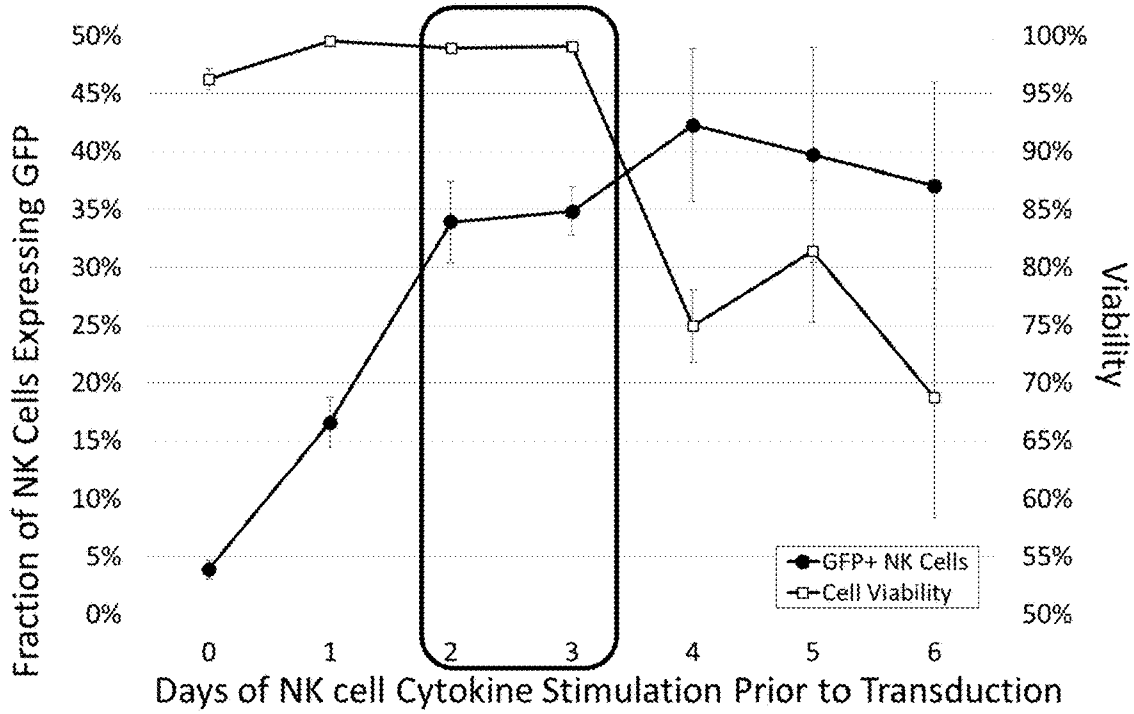

FIG. 14 is a graph showing fraction of NK cells expressing GFP (circles) and cell viability (squares) versus the number of days of cytokine stimulation (500 IU/ml IL-2) prior to transduction. A balance of transgene expression and viability was achieved with 2-3 days of cytokine stimulation prior to transduction (boxed area).

Figure 15:
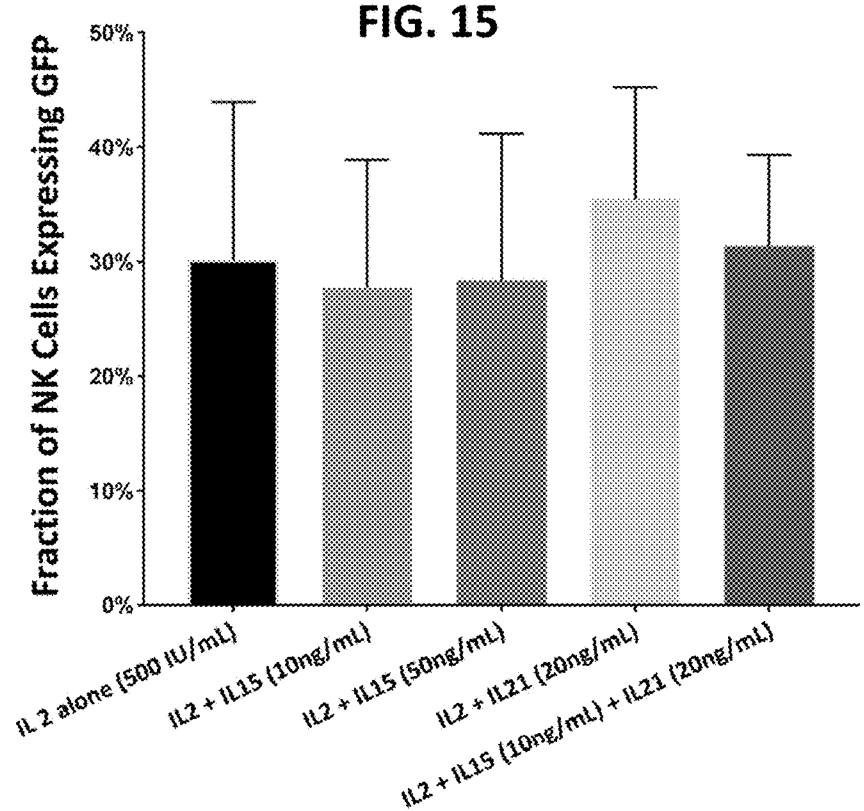

FIG. 15 is a graph showing the fraction of NK cells expressing GFP in NK cells treated with the indicated cytokines prior to transduction. There was no significant difference between IL-2 alone and combinations of IL-2 with IL-15 and/or IL-21.

Figure 16A:
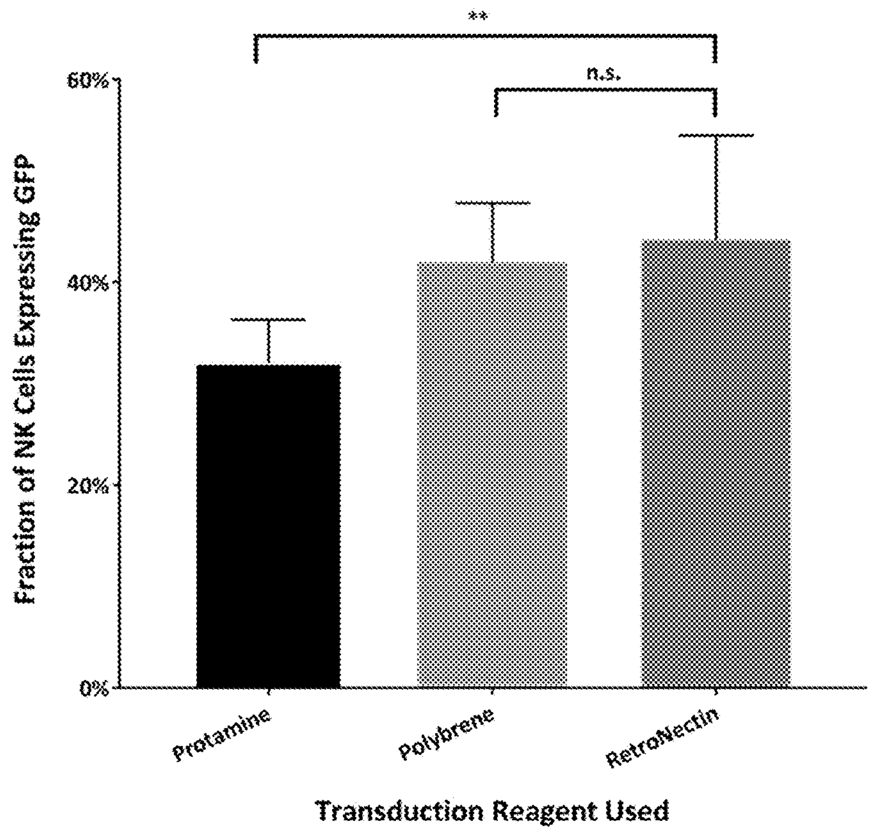
Figure 16B:
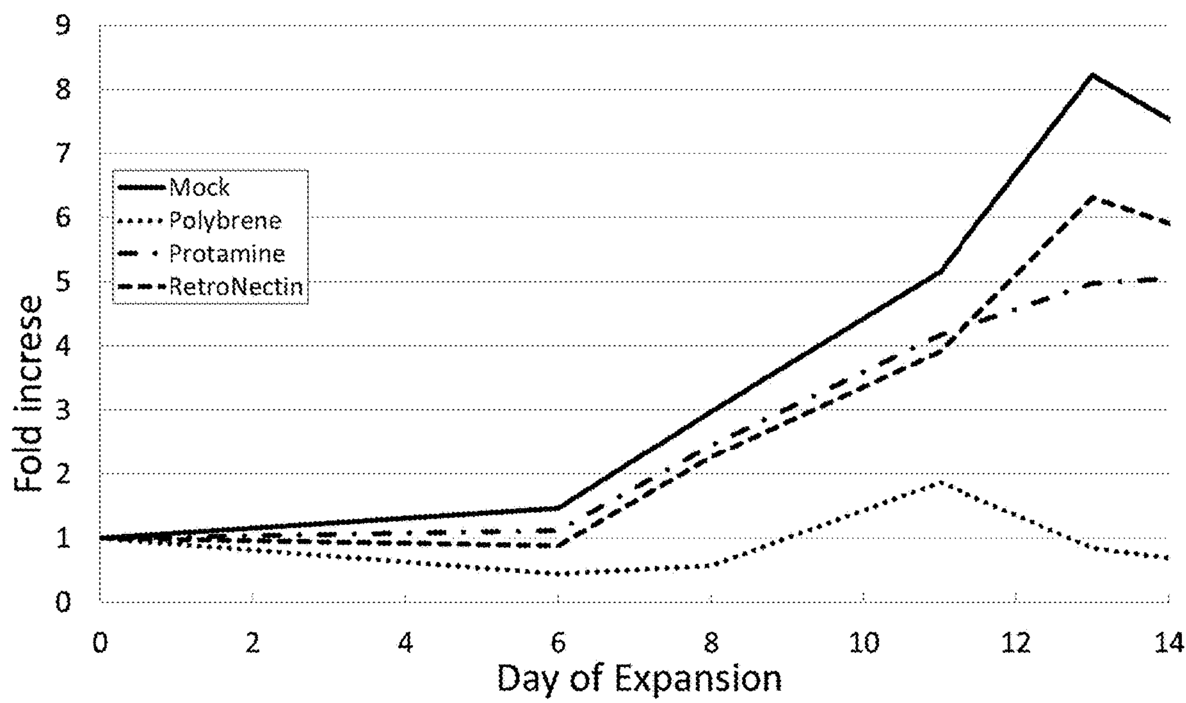

FIGS. 16A and 16B are graphs showing the effect of transduction reagents on transduction efficiency (FIG. 16A) and NK cell expansion (FIG. 16B).

Figure 17:
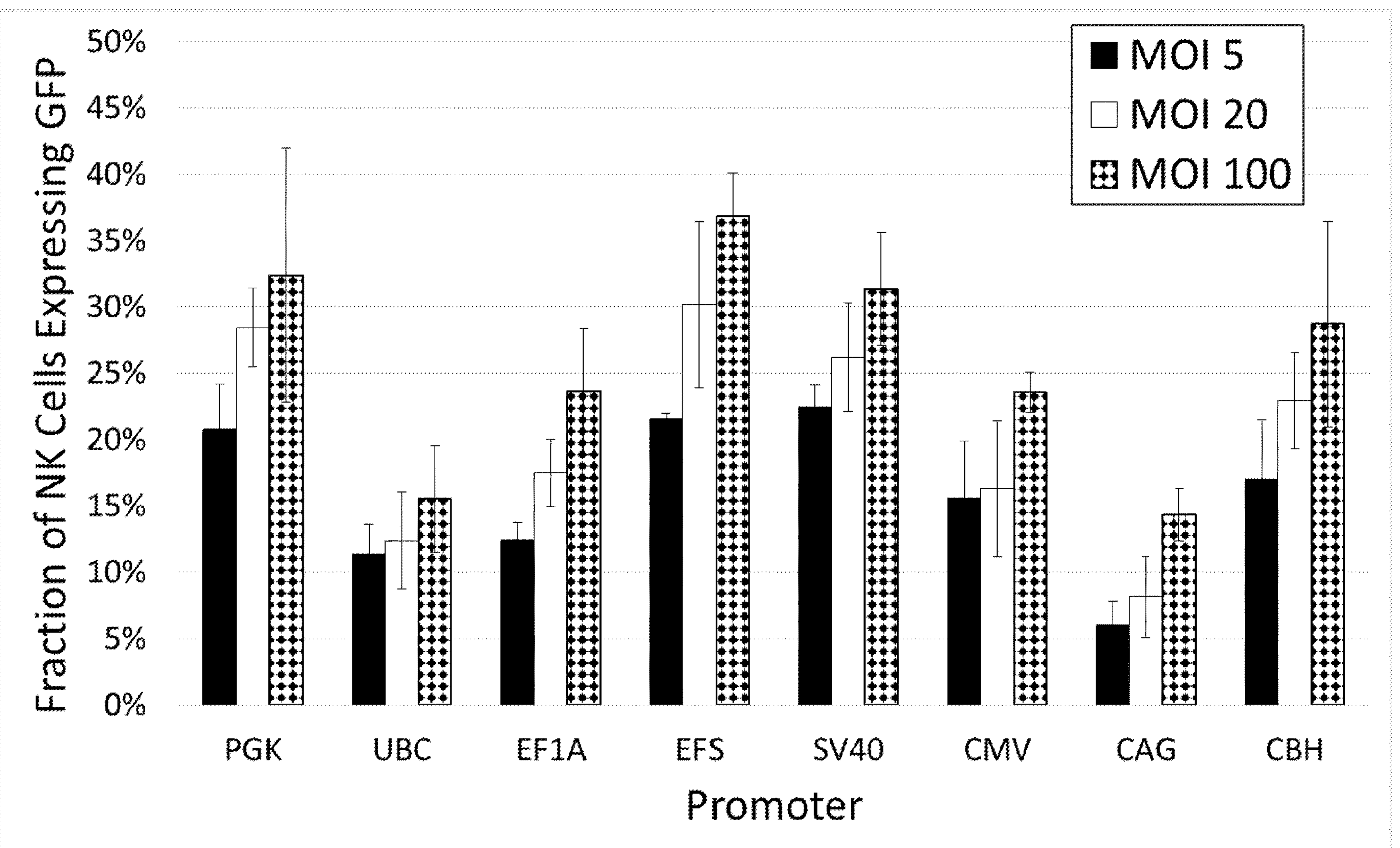

FIG. 17 is a graph showing transduction efficiency of NK cells transduced with GFP under the control of the indicated promoters at MOI of 5, 20, or 100.

Figure 18:
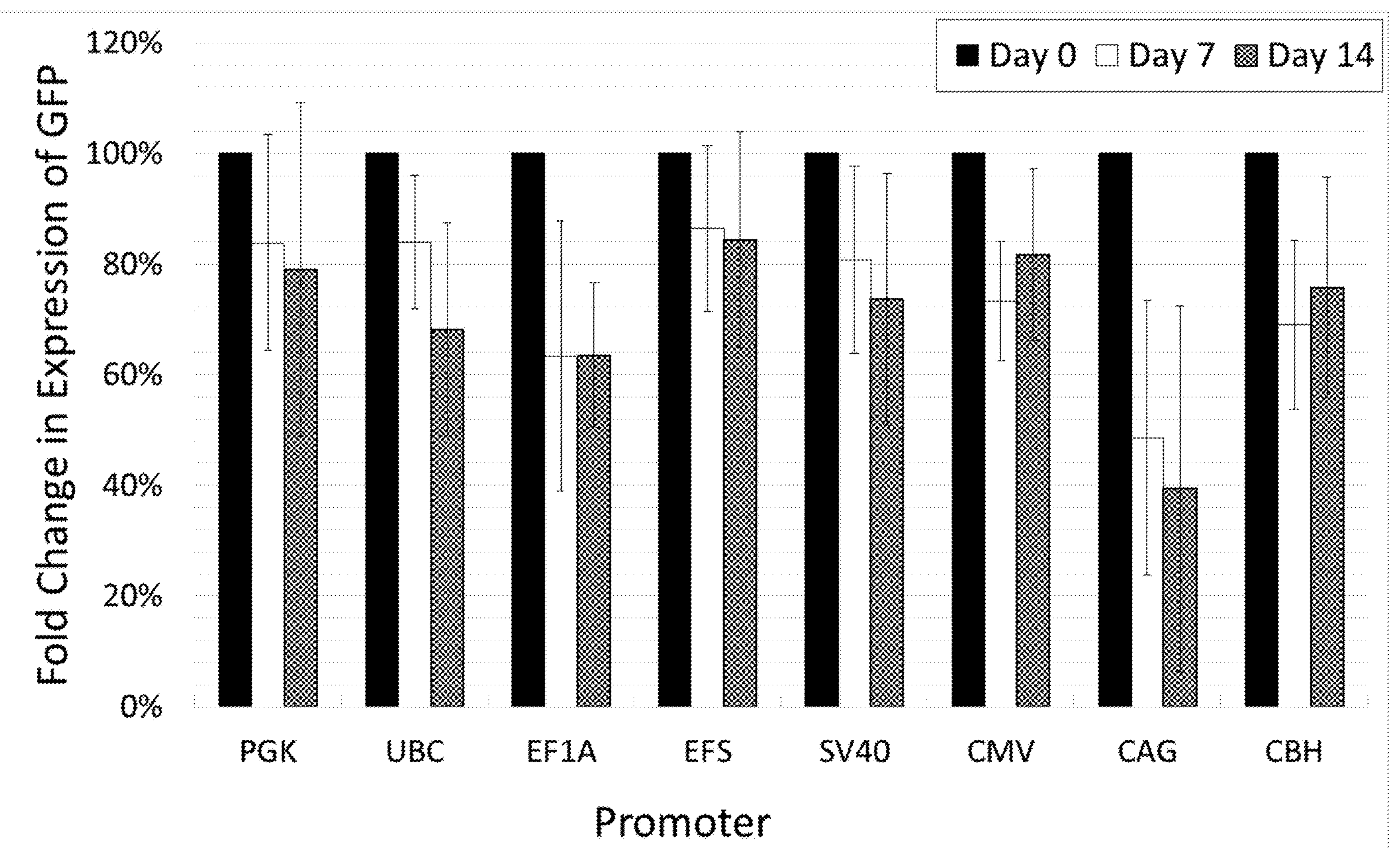

FIG. 18 is a graph showing the fold-change in expression of GFP in NK cells transduced with GFP under the control of the indicated promoters on days 7 and 14 post-transduction, compared to expression on day 0 (100%).

Figure 19:
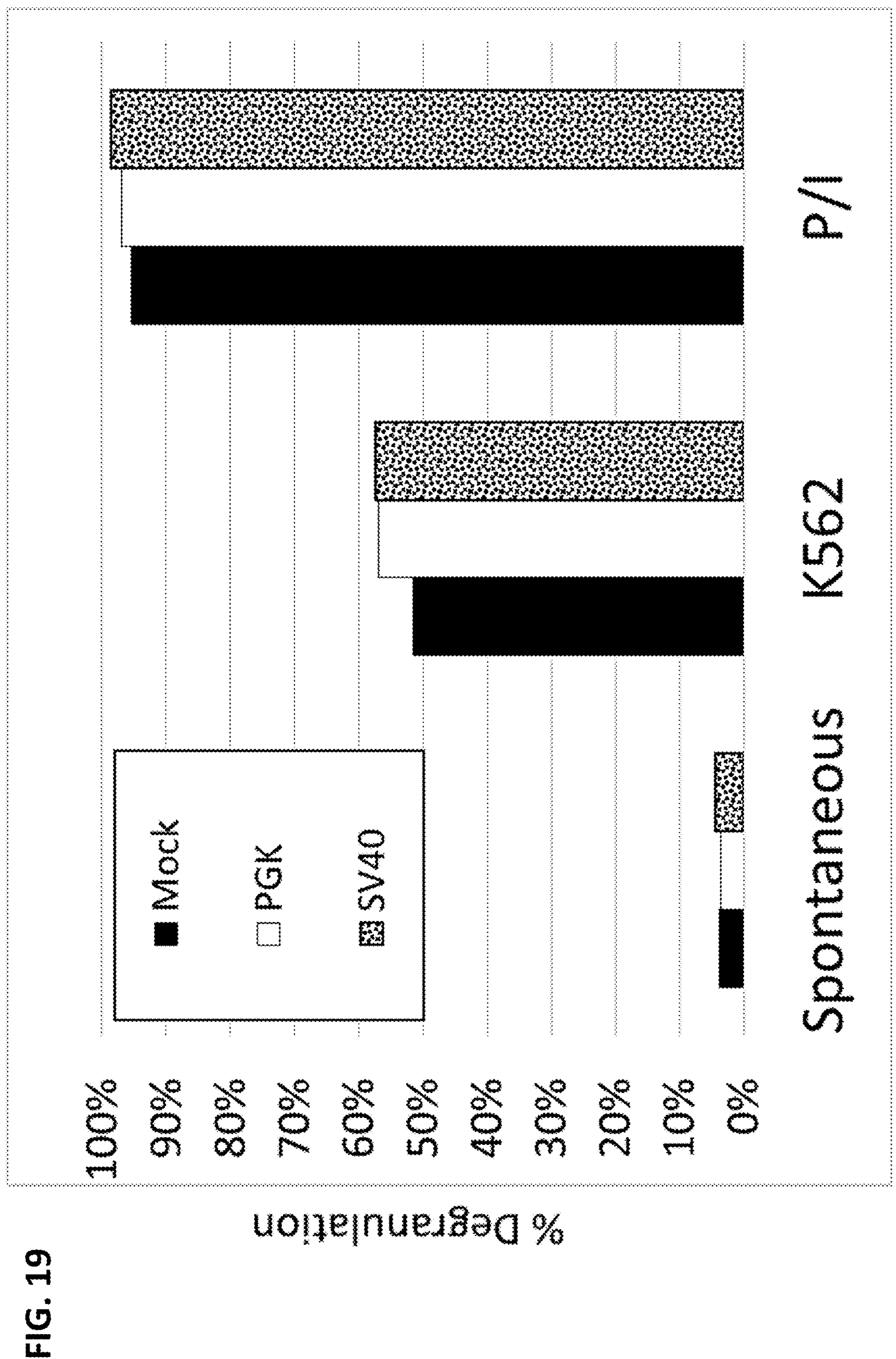

FIG. 19 is a graph showing activity (% degranulation) of NK cells transduced with GFP under the control of the indicated promoters or mock transduced cells after 14 days of expansion when contacted with K562 cells. P/I indicates treatment with PMA/ionomycin to show maximal degranulation capacity.

Figure 20:
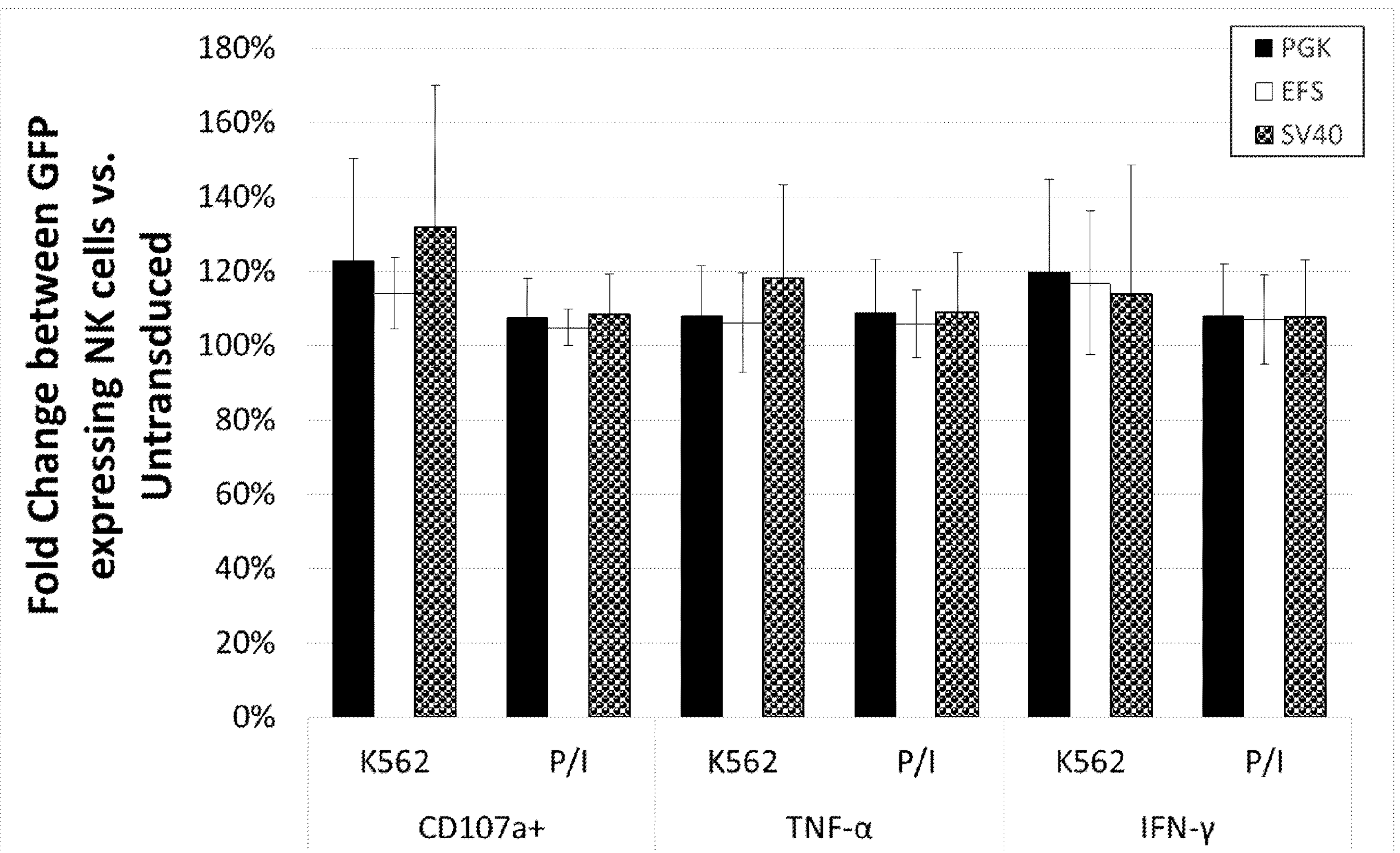

FIG. 20 is a graph showing activity of NK cells transduced with GFP under the control of the indicated promoters compared to untransduced cells after 14 days of expansion when contacted with K562 cells. P/I indicates treatment with PMA/ionomycin to show maximal degranulation capacity.

Figure 21A:
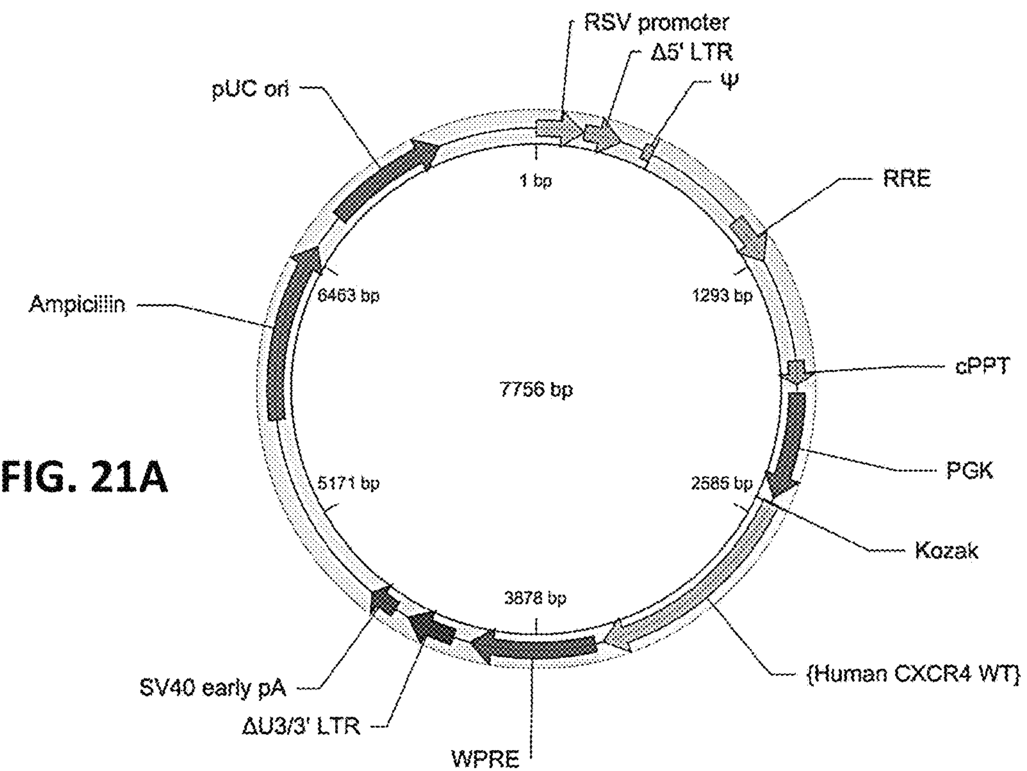
Figure 21B:
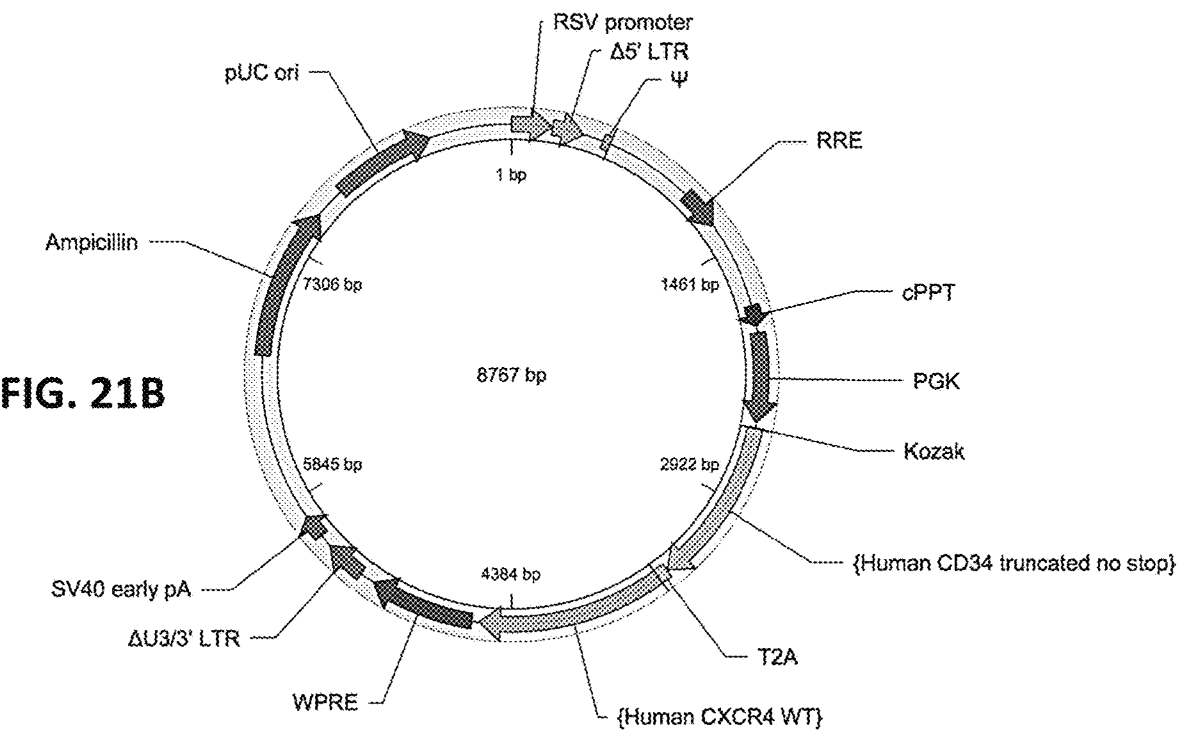

FIGS. 21A and 21B are schematic diagrams of a lentiviral vector for expression of CXCR4 (FIG. 21A) or a lentiviral vector for expression of CD34t and CXCR4 (FIG. 21B).

Figure 22B:
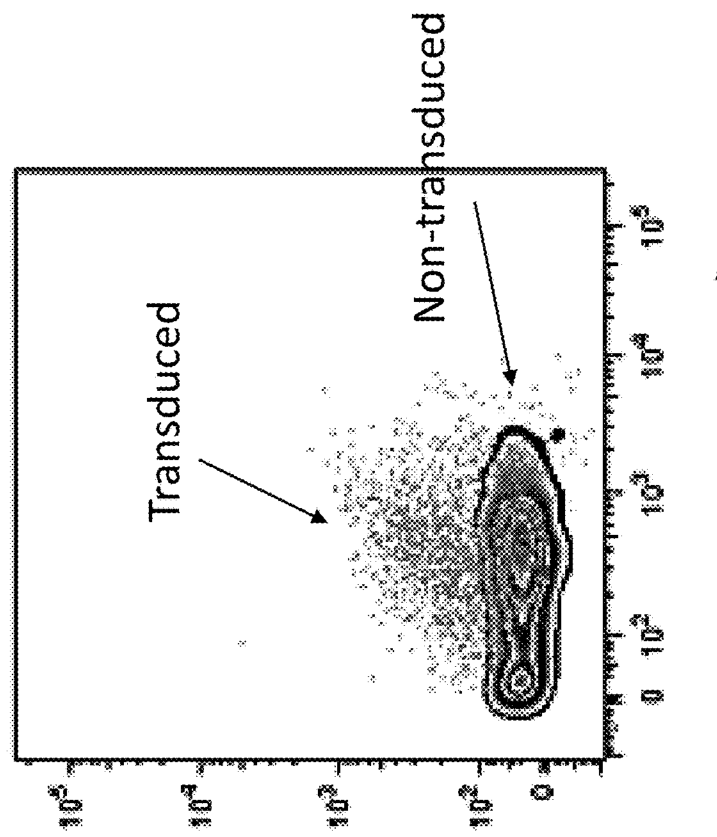
Figure 22A:
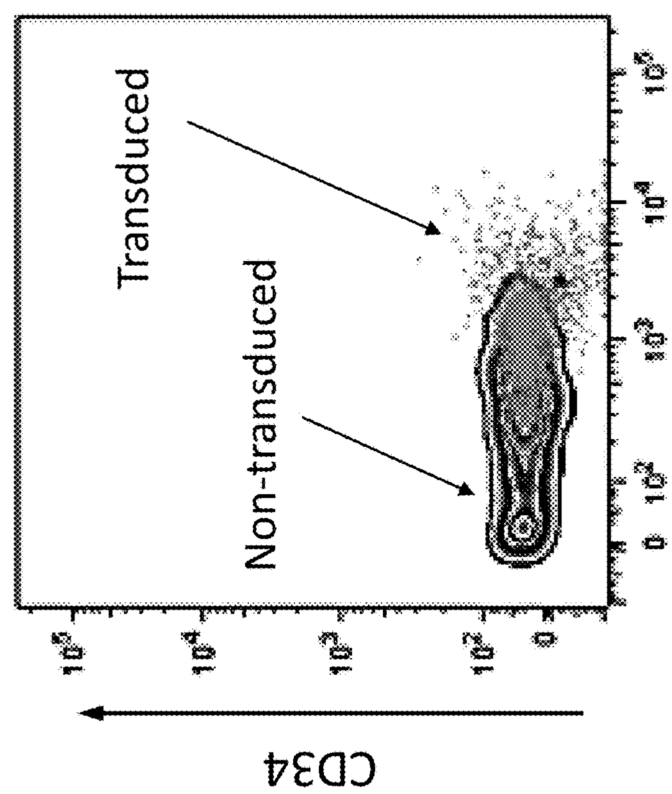

FIGS. 22A and 22B are plots showing CXCR4 and CD34 expression in NK cells transduced with a lentiviral vector encoding CXCR4 (FIG. 22A) or a lentiviral vector encoding both CD34t and CXCR4 (FIG. 221B).

Figure 23:
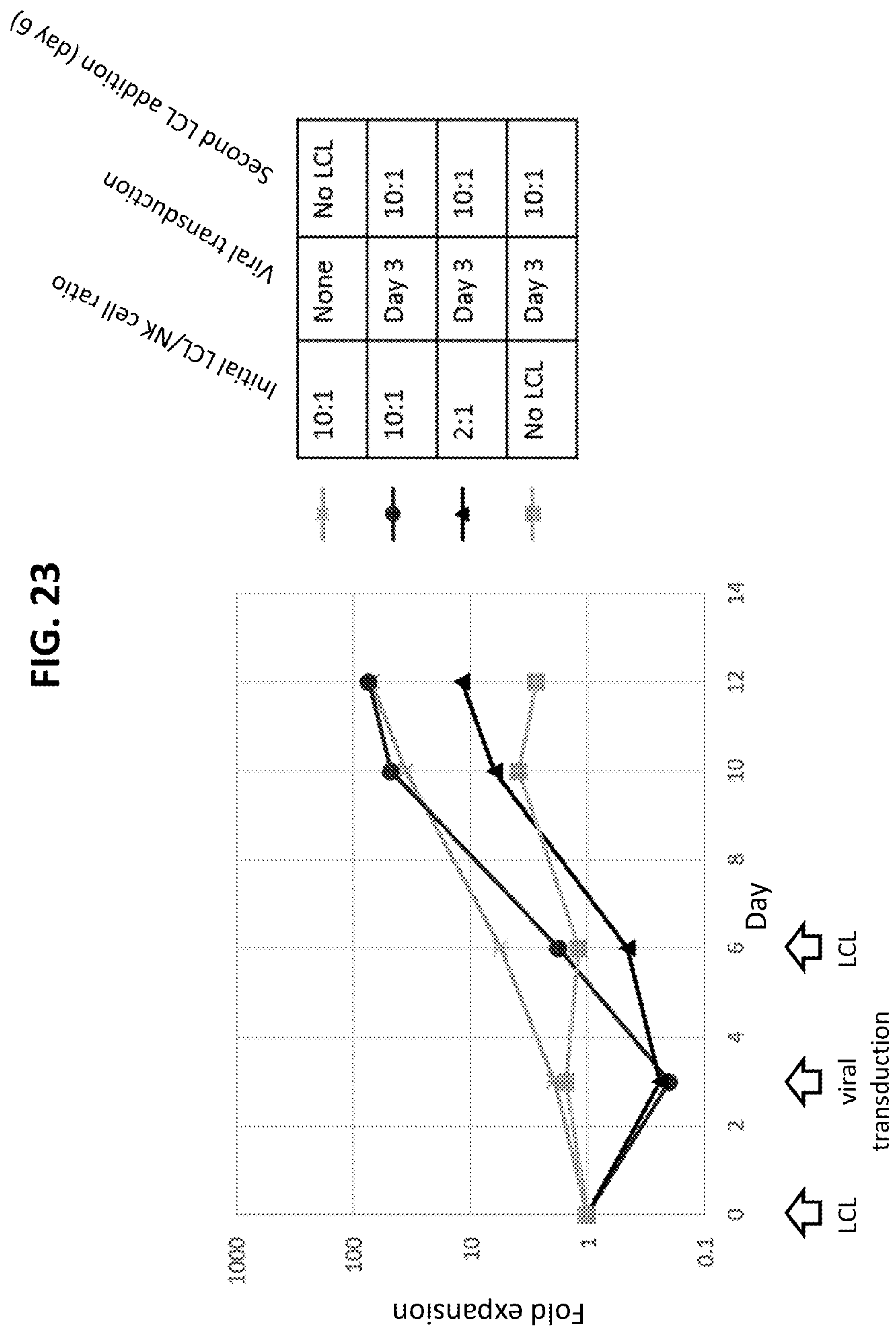

FIG. 23 is a graph showing fold-expansion of NK cells activated in the presence or absence of LCL feeder cells, followed by viral transduction and expansion in the presence or absence of LCL feeder cells.

SEQUENCE LISTING

Any nucleic acid and amino acid sequences listed herein or in the accompanying sequence listing are shown using standard letter abbreviations for nucleotide bases and amino acids, as defined in 37 C.F.R. § 1.822. In at least some cases, only one strand of each nucleic acid sequence is shown, but the complementary strand is understood as included by any reference to the displayed strand.

The Sequence Listing is submitted as an ASCII text file in the form of the file named Sequence_Listing.txt, which was created on Mar. 7, 2022, and is 126,795 bytes, which is incorporated by reference herein.

SEQ ID NOs: 1 and 2 are exemplary CXCR4 nucleic acid and amino acid sequences, respectively.

SEQ ID NOs: 3 and 4 are exemplary truncated CD34 nucleic acid and amino acid sequences, respectively.

SEQ ID NOs: 5 and 6 are exemplary high affinity CD16 nucleic acid and amino acid sequences, respectively.

SEQ ID NO: 7 is an exemplary codon-optimized high affinity CD16 nucleic acid.

SEQ ID NO: 8 is an exemplary lentiviral expression vector including human cytomegalovirus (CMV) immediate early promoter and EGFP.

SEQ ID NO: 9 is an exemplary lentiviral expression vector including human eukaryotic translation elongation factor 1α (EF1A) promoter and EGFP.

SEQ ID NO: 10 is an exemplary lentiviral expression vector including a short version of human EF1A promoter (EFS) and EGFP.

SEQ ID NO: 11 is an exemplary lentiviral expression vector including human

CMV early enhancer fused with chicken β-actin (CAG) promoter and EGFP.

SEQ ID NO: 12 is an exemplary lentiviral expression vector including a short version of CAG promoter and EGFP.

SEQ ID NO: 13 is an exemplary lentiviral expression vector including simian SV40 early promoter and EGFP.

SEQ ID NO: 14 is an exemplary lentiviral expression vector including mouse phosphoglycerate kinase 1 (PGK) promoter and EGFP.

SEQ ID NO: 15 is an exemplary lentiviral expression vector including human ubiquitin C promoter and EGFP.

SEQ ID NO: 16 is an exemplary lentiviral expression vector including mouse PGK promoter and human CXCR4.

SEQ ID NO: 17 is an exemplary lentiviral expression vector including mouse PGK promoter and truncated human CD34, T2A peptide, and human CXCR4.

DETAILED DESCRIPTION

Disclosed herein are methods for efficiently and stably expressing a transgene in NK cells. The methods include an efficient viral vector-based method for gene transfer into NK cells and demonstrate stable and long-term robust expression of transgenes. High gene transfer rates into primary cells being transduced and the ability to produce high titers of virus particles for large-scale transduction of patient cells are important criteria for clinical trials. Lentiviral vectors, such as those utilized in examples herein, can be produced in high titer and concentrated without compromising their transduction efficiency. Additionally, the currently described method is cheaper and simpler to apply clinically as it does not require the need for several cumbersome and expensive steps adopted in current retroviral vector-mediated gene transfer protocols to obtain moderate transduction efficiency such as use of retronectin, spinoculation, and repeated/multiple transductions that might have a significant deleterious impact on the viability of the primary NK cells being transduced. In addition protocols for efficient ex vivo expansion of NK cells under Good Manufacturing Practice (GMP) conditions for adoptive NK cell based immunotherapy applications are available. The present highly efficient lentiviral vector-based gene transfer protocol can be used to complement a number of current ex vivo NK cell expansion protocols to generate large numbers of genetically reprogrammed NK cells, potentially revolutionizing NK cell based immunotherapeutic approaches by enhancing their antitumor efficacy in patients with cancer or viral infection.

The disclosed methods have several advantages over other methodologies for lentiviral vector-mediated genetic manipulation of human primary NK cells. The present lentiviral vector-based approach results in an efficient, robust, and highly reproducible method of stable gene transfer into primary human peripheral blood-derived NK cells. This is in contrast to episomal vectors that are lost with cell division/long-term culture, poxvirus vectors that inhibit nuclear function and eventually instigate host cell lysis, and the other non-viral-mediated gene delivery methods such as electroporation that allow only transient expression of the introduced genes. Furthermore, unlike gammaretroviral vectors, which integrate preferentially near transcription start sites and potentially activate oncogenes by promoter activation from the long terminal repeats (LTRs), lentiviral vectors integrate preferentially within highly expressed genes. Moreover, lentiviral vectors used in the disclosed methods have improved safety features such as a split genome lentiviral packaging design and have a self-inactivating design of the transfer vector through deletions in the 3' LTR, thereby reducing the potential for promoter activation.

Transduced primary NK cells obtained by the methods disclosed herein are phenotypically and functionally normal and therefore allow for a multitude of gene therapy and immunotherapy applications. Importantly, this current transduction method is simple and involves in vitro culture of NK cells with one or more cytokines, followed by exposure to concentrated viral particles. Following transduction, cells are expanded in large numbers by co-culturing them with irradiated feeder cells in media containing one or more cytokines.

I. Abbreviations

CAR chimeric antigen receptor
EBV-LCL Epstein-Barr virus transformed lymphoblastoid cell line
eGFP enhanced green fluorescent protein
FACS fluorescence-activated cell sorting
GMP good manufacturing practices
IL interleukin
LTR long terminal repeat
MOI multiplicity of infection
NK natural killer cell
PBMC peripheral blood monocyte cells
shRNA short hairpin RNA

II. Terms

Unless otherwise noted, technical terms are used according to conventional usage. Definitions of common terms in molecular biology may be found in *Lewin's Genes X*, ed. Krebs et al., Jones and Bartlett Publishers, 2009 (ISBN 0763766321); Kendrew et al. (eds.), *The Encyclopedia of Molecular Biology*, published by Blackwell Publishers, 1994 (ISBN 0632021829); Robert A. Meyers (ed.), *Molecular Biology and Biotechnology: a Comprehensive Desk Reference*, published by Wiley, John & Sons, Inc., 1995 (ISBN 0471186341); and George P. Rédei, *Encyclopedic Dictionary of Genetics, Genomics, Proteomics and Informatics*, 3rd Edition, Springer, 2008 (ISBN: 1402067534), and other similar references.

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. Hence "comprising A or B" means including A, or B, or A and B. It is further to be understood that all base sizes or amino acid sizes, and all molecular weight or molecular mass values, given for nucleic acids or polypeptides are approximate, and are provided for description.

Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

In order to facilitate review of the various embodiments of the disclosure, the following explanations of specific terms are provided:

Cancer: Also referred to herein as a "malignant tumor" or "malignant neoplasm." Any of a number of diseases that are characterized by uncontrolled, abnormal proliferation of cells, the potential of cancer cells to spread locally or through the bloodstream and lymphatic system to other parts of the body (e.g., metastasize), as well as any of a number of characteristic structural and/or molecular features. A "cancer cell" is a cell having specific structural properties, lacking differentiation, and being capable of invasion and metastasis.

CD34: A cell surface glycoprotein that functions as a cell-cell adhesion molecule. CD34 is a single-pass transmembrane protein with a highly glycosylated extracellular domain, a transmembrane domain, and an intracellular signaling domain. CD34 is expressed on hematopoietic cells and plays a role in cell migration. Exemplary human CD34 sequences include GenBank Accession Nos. NM_001025109 and NM_001773 (nucleic acid sequences) and NP_001020280 and NP_001764 (amino acid sequences), all of which are incorporated herein by reference as present in GenBank on Jul. 25, 2017.

Contacting: Placement in direct physical association, including both a solid and liquid form. In one example, contacting includes association between a substance (such as a cytokine) in a liquid medium and one or more cells (such as NK cells in culture). Contacting can occur in vitro with isolated cells or tissue or in vivo by administering to a subject.

Culturing or Cell culture: Growth of a population of cells in a defined set of conditions (such as culture medium, extracellular matrix, temperature, and/or time of culture) in vitro. In some examples, a cell culture includes a substantially pure culture (for example, isolated NK cells). In additional examples a cell culture includes a mixed culture, such as co-culture of two or more types of cells (for example a culture of NK cells with feeder cells). In further examples, a cell culture includes cells grown in contact with an extracellular matrix.

Culture Medium: A synthetic set of culture conditions with the nutrients necessary to support the viability, function, and/or growth of a specific population of cells, such as NK cells. Culture media generally include components such as a carbon source, a nitrogen source and a buffer to maintain pH. Additional components in culture media also may include one or more of serum (such as heat-inactivated serum), cytokines, hormones, growth factors, protease inhibitors, protein hydrolysates, shear force protectors, proteins, vitamins, glutamine, trace elements, inorganic salts, minerals, lipids, and/or attachment factors.

Cytokine: Proteins made by cells that affect the behavior of other cells, such as lymphocytes. In one embodiment, a cytokine is a chemokine, a molecule that affects cellular trafficking. The term "cytokine" is used as a generic name for a diverse group of soluble proteins and peptides that act as humoral regulators at nanomolar to picomolar concentrations and which, either under normal or pathological conditions, modulate the functional activities of individual cells and tissues. These proteins also mediate interactions between cells directly and regulate processes taking place in the extracellular environment. Examples of cytokines include, but are not limited to, tumor necrosis factor α (TNF-α), interleukin-2 (IL-2), interleukin-7 (IL-7), interleukin-15 (IL-15), interleukin-21 (IL-21), and interferon-γ (IFN-γ).

Effective amount: A quantity of a specified agent sufficient to achieve a desired effect, for example, in a subject being treated with that agent. In some examples, an effective amount of the modified NK cells disclosed herein is an amount sufficient to treat or inhibit a disease or disorder in a subject (such as a tumor, hyperproliferative disorder, or viral infection). In other examples, an effective amount is an amount of modified NK cells sufficient to reduce or ameliorate one or more symptoms of a disease or disorder in a subject. The effective amount (for example an amount ameliorating, inhibiting, and/or treating a disorder in a subject) will be dependent on, for example, the particular disorder being treated, the subject being treated, the manner of administration of the composition, and other factors.

Expression: The process by which the coded information of a gene is converted into an operational, non-operational, or structural part of a cell, such as the synthesis of a protein. Gene expression can be influenced by external signals. For instance, exposure of a cell to a hormone may stimulate expression of a hormone-induced gene. Different types of cells can respond differently to an identical signal. Expression of a gene also can be regulated anywhere in the pathway from DNA to RNA to protein. Regulation can include controls on transcription, translation, RNA transport and processing, degradation of intermediary molecules such as mRNA, or through activation, inactivation, compartmentalization or degradation of specific protein molecules after they are produced.

Feeder cells: Cells that provide support for another cell type in ex vivo or in vitro culture. Feeder cells may provide one or more factors required for survival, growth, and/or differentiation (or inhibiting differentiation) of the cells cultured with the feeder cells. Typically feeder cells are irradiated or otherwise treated to prevent their proliferation in culture. In some examples disclosed herein, NK cells are cultured with feeder cells, such as irradiated EBV-transformed lymphoblast cells (e.g., EBV-LCL cells).

Hyperproliferative disease: A disease or disorder in which the cells proliferate more rapidly than normal tissue growth. Thus, a hyperproliferating cell is a cell that is proliferating more rapidly than normal cells. In some examples, a hyperproliferative disorder includes a malignant tumor or cancer, but may also include a benign tumor.

Inhibiting or treating a condition: "Inhibiting" a condition refers to inhibiting the full development of a condition or disease, for example, a tumor. Inhibition of a condition can span the spectrum from partial inhibition to substantially complete inhibition (e.g., including, but not limited to prevention) of the disease. In some examples, the term "inhibiting" refers to reducing or delaying the onset or progression of a condition. "Treatment" refers to a therapeutic intervention that ameliorates a sign or symptom of a disease or condition after it has begun to develop. A subject to be administered an effective amount of the disclosed NK cells can be identified by standard diagnosing techniques for such a disorder, for example, presence of the disease or disorder or risk factors to develop the disease or disorder.

Isolated: An "isolated" or "purified" biological component (such as a cell, nucleic acid, peptide, protein, protein complex, or virus-like particle) has been substantially separated, produced apart from, or purified away from other components (for example, other biological components in the cell or the organism in which the component naturally occurs). Cells, nucleic acids, peptides and proteins that have been "isolated" or "purified" thus include cells, nucleic acids, and proteins purified by standard purification methods.

The term "isolated" or "purified" does not require absolute purity; rather, it is intended as a relative term. Thus, for example, an isolated biological component is one in which the biological component is more enriched than the biological component is in its natural environment within a cell, organism, sample, or production vessel (for example, a cell culture system). Preferably, a preparation is purified such that the biological component represents at least 50%, such as at least 70%, at least 80%, at least 90%, at least 95%, or greater, of the total biological component content of the preparation.

Natural Killer (NK) cells: Cells of the immune system that kill target cells in the absence of a specific antigenic stimulus and without restriction according to MHC class. Target cells can be tumor cells or cells harboring viruses. NK cells are characterized by the presence of CD56 and the absence of CD3 surface markers. NK cells typically comprise approximately 10 to 15% of the mononuclear cell fraction in normal peripheral blood. Historically, NK cells were first identified by their ability to lyse certain tumor cells without prior immunization or activation. NK cells are thought to provide a "back up" protective mechanism against viruses and tumors that might escape the CTL response by down-regulating MHC class I presentation. In addition to being involved in direct cytotoxic killing, NK cells also serve a role in cytokine production, which can be important to control cancer and infection.

In some examples, a "modified NK cell" is a NK cell transduced with a heterologous nucleic acid (such as one or more of the nucleic acids or vectors disclosed herein) or expressing one or more heterologous proteins. The terms "modified NK cell" and "transduced NK cell" are used interchangeably in some examples herein.

Pharmaceutically acceptable carrier: The pharmaceutically acceptable carriers (vehicles) useful in this disclosure are conventional. *Remington: The Science and Practice of Pharmacy*, The University of the Sciences in Philadelphia, Editor, Lippincott, Williams, & Wilkins, Philadelphia, PA, 21st Edition (2005), describes compositions and formulations suitable for pharmaceutical delivery of one or more therapeutic compositions, such as one or more modified NK cells and/or additional pharmaceutical agents.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example, sodium acetate or sorbitan monolaurate.

Subject: A living multi-cellular vertebrate organism, a category that includes both human and non-human mammals (such as mice, rats, rabbits, sheep, horses, cows, and non-human primates).

Transduce: Transferring nucleic acid into a cell, such as transfer of a heterologous nucleic acid into a host cell. As used herein, the term transduce (or transfect or transform) includes all techniques by which a nucleic acid is introduced into a cell, including but not limited to transformation with plasmid vectors, infection with viral vectors or viral particles, and introduction of naked DNA by electroporation, nucleofection, lipofection, or particle gun acceleration.

Transgene: A heterologous nucleic acid introduced into a cell, for example, by transduction. In some examples, a transgene is a nucleic acid encoding a protein of interest. In other examples, a transgene is a nucleic acid that is capable of modulating expression of a nucleic acid of interest, such as a short hairpin RNA (shRNA), small interfering RNA (siRNA), or antisense nucleic acid. The transgene may be operably linked to one or more expression control sequences, for example, a promoter.

A "heterologous" nucleic acid or protein refers to a nucleic acid or protein originating from a different genetic source. For example, a nucleic acid or protein that is heterologous to a cell originates from an organism or individual other than the cell in which it is expressed. In other examples, a heterologous nucleic acid or protein originates from a cell type other than the cell in which it is expressed (for example, a nucleic acid or protein not normally present in NK cells is heterologous to NK cells). In further examples, a heterologous nucleic acid includes a recombinant nucleic acid, such as a protein-encoding nucleic acid operably linked to a promoter from another gene and/or two or more operably linked nucleic acids from different sources.

Vector: A nucleic acid molecule allowing insertion of foreign or heterologous nucleic acid into a cell without disrupting the ability of the vector to replicate and/or integrate in a host cell. A vector can include nucleic acid sequences that permit it to replicate in a host cell, such as an origin of replication. A vector can also include one or more selectable marker genes and other genetic elements. An expression vector is a vector that contains the necessary regulatory sequences to allow transcription and/or translation of an inserted gene or genes. In some non-limiting examples, the vector is a viral vector, such as a retroviral vector or lentiviral vector.

II. Methods of Producing Modified NK Cells

Disclosed herein are methods of producing modified NK cells (such as NK cells including or expressing one or more heterologous nucleic acids or including all or a portion of a viral vector including one or more heterologous nucleic acids). In particular examples, the methods disclosed herein are utilized to transduce resting or short-term activated NK cells (rather than NK cell lines or expanded NK cells), which have previously been challenging to transduce with viral vectors at high efficiency.

Figure 1A:
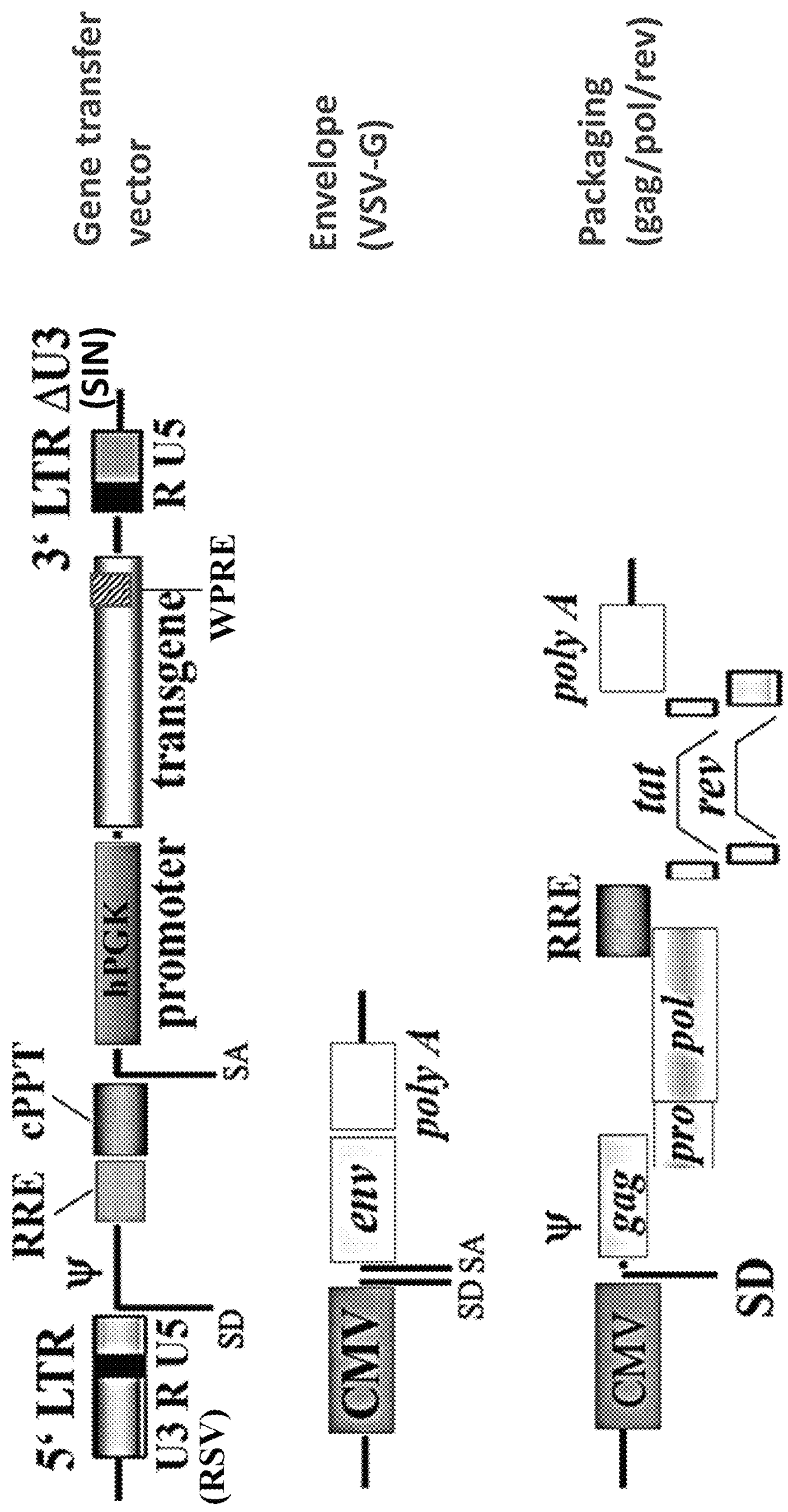
FIGS. 1A and 1B are schematic diagrams illustrating an exemplary three plasmid lentiviral vector system that can be utilized in the disclosed methods (FIG. 1A) and an exemplary method for producing non-replicating lentivirus that can be used to transduce target cells (FIG. 1B).
Figure 1B:
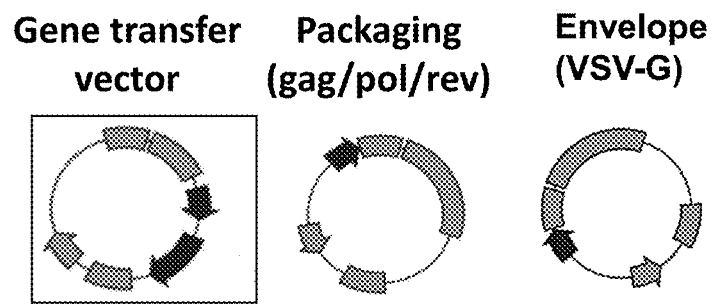
Figure 1B:
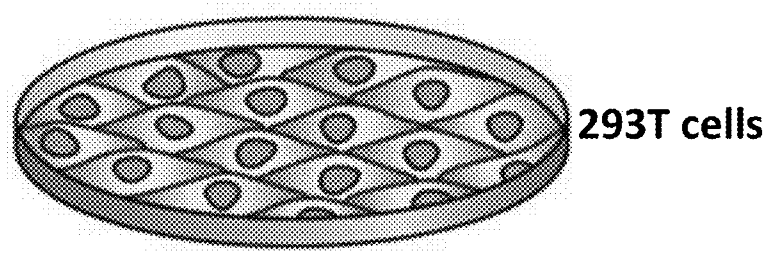
Figure 1B:
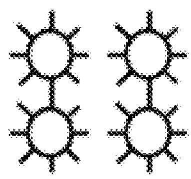
Figure 1B:
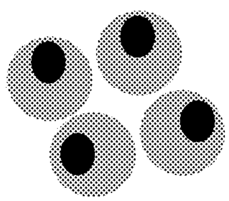

In some embodiments, the disclosed methods utilize a lentiviral system to introduce one or more heterologous nucleic acids ("transgenes") into NK cells. Lentivirus systems for virus production for transduction are generally split across multiple plasmids to increase their safety. Exemplary lentiviral systems include "second generation" systems with three plasmids or "third generation" systems with four plasmids. An exemplary three plasmid system is illustrated in FIG. 1A. The transgene nucleic acid is included in a transfer plasmid and is operably linked to a promoter (in a non-limiting example, an hPGK promoter). The transfer plasmid also includes 5' and 3' LTRs and may include additional elements, such as the psi packaging system. Lentivirus proteins for producing viral particles (such as env, gag, pol, rev, and/or tat) are encoded by two or three separate plasmids. Exemplary transfer vectors are also shown in FIGS. 21A and 21B. The lentivirus plasmids (three or four plasmids) are transfected in a mammalian cell line, which produces lentivirus particles that are not capable of replication. The lentivirus particles are then used to transduce other cells (such as NK cells). An exemplary method for producing lentiviruses (such as non-replicating lentivirus) for use in the methods disclosed herein is shown in FIG. 1B.

Figure 2:
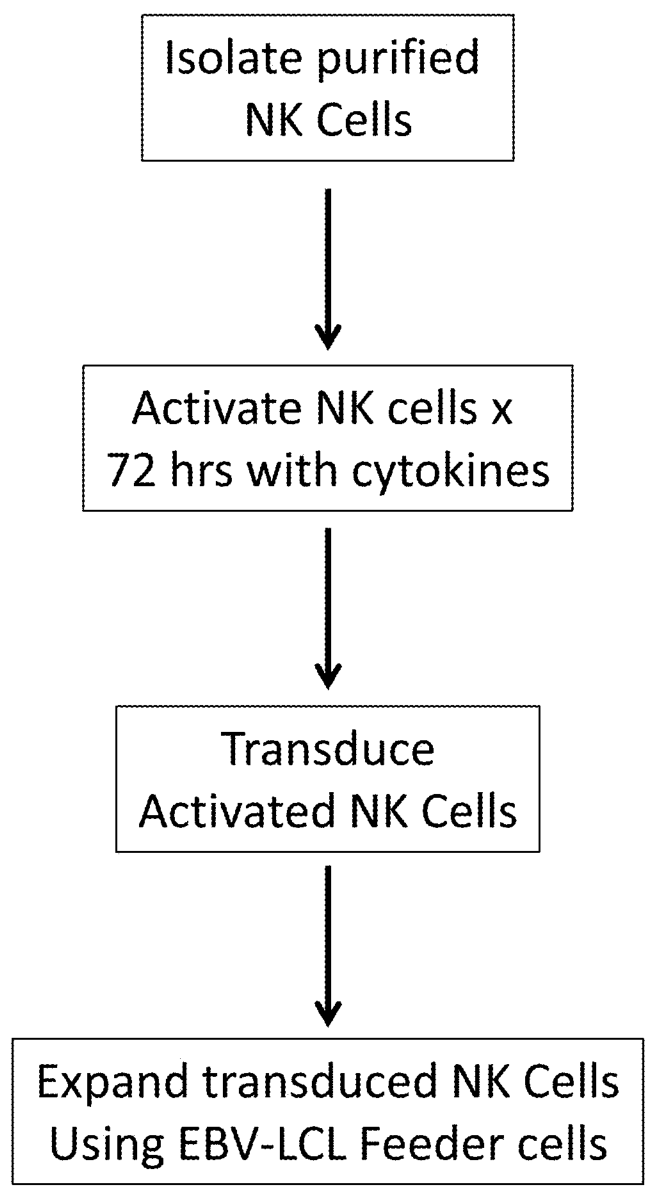
FIG. 2 is a schematic diagram illustrating an exemplary method for producing a population of expanded transduced NK cells.

In some embodiments, disclosed herein are methods for producing modified NK cells utilizing transduction with a viral vector. An overview of an exemplary process is shown in FIG. 2. In some examples, the methods include obtaining or preparing purified NK cells and activating (or "priming") the NK cells by culturing the purified NK cells in medium that includes one or more cytokines (such as IL-2, IL-15, and/or IL-21) for 1-14 days. The activated NK cells are transduced with a viral vector (such as a lentiviral vector) including one or more heterologous nucleic acids, for example, by incubating activated NK cells with the viral vector (for example, viral particles including the viral vector) for 1-3 days. The transduced NK cells are then expanded for 1-50 days (or more), for example, by culture with one or more cytokines (such as IL-2) and/or in the presence of feeder cells, to produce expanded modified NK cells. In some examples, the activated NK cells are transduced with a viral vector that includes a nucleic acid encoding a truncated CD34 protein (CD34t) lacking the intracellular signaling domain (for example a CD34t nucleic acid operably linked to another nucleic acid of interest). The CD34t protein includes the extracellular and transmembrane regions of CD34, and as a result, it is expressed on the cell surface, but does not affect activity of cells expressing the truncated protein (Norell et al., *Cancer Immunol. Immunother.* 59:851-862, 2010). To enrich for transduced cells, cells expressing CD34t (e.g., transduced cells) can be identified with an anti-CD34 antibody, and can be isolated using flow cytometry or immuno-magnetic methods. Methods for producing modified NK cells are discussed in more detail below.

In particular embodiments of the disclosed methods, purified or isolated NK cells are transduced prior to expansion and/or in the absence of feeder cells. By transducing NK cells prior to expansion, it is possible to reduce the amount of viral particles needed (such as reducing the amount of viral particles by least about 10-fold, 50-fold, 100-fold, 200-fold, 300-fold, 400-fold, 500-fold, 600-fold, 700-fold, 800-fold, 900-fold, 1000-fold, 2000-fold, 5000-fold, or 10,000-fold) than when transducing expanded NK cells. In addition, in some examples, it is simpler and/or requires less labor, cost, and/or time to transduce NK cells prior to expansion. In some examples, the inventors observed that when NK cells were contacted with viral particles in the presence of a feeder cell layer, the virus preferentially transduced the feeder cells, rather than the NK cells. Furthermore, is some examples, the transgene(s) may be toxic to the feeder cells, and may negatively impact NK cell expansion. Thus, in some non-limiting examples, NK cells are more efficiently transduced when feeder cells are not present.

In other embodiments, the NK cells are activated, transduced, and expanded in the presence of feeder cells (such as irradiated feeder cells). In some examples, NK cells are activated as described herein in the presence of feeder cells (e.g., at least 1:1 ratio (feeder cells:NK cells), for example, at least 2:1, 5:1, 10:1, 15:1, 20:1, or more) prior to transduction (for example for 1-5 days, such as 1, 2, 3, 4, or 5 days). The NK cells are then transduced and cultured for 1-5 days (such as 1, 2, 3, 4, or 5 days, for example for 3 days), still in the presence of feeder cells. The NK cells are then replated with feeder cells (for example, at least 2:1, 5:1, 10:1, 15:1, 20:1 ratio of feeder cells:NK cells) for expansion. In one non-limiting example, NK cells are isolated and plated with feeder cells at 10:1 feeder cells:NK cells. The NK cells are activated for 2-3 days with IL-2 prior to transduction. Three days after transduction, the NK cells are replated with 10:1 feeder cells:NK cells and continued to be cultured in the presence of IL-2 for expansion.

In other embodiments, the NK cells are activated in the presence of feeder cells. The feeder cells are substantially removed prior to transduction of the activated NK cells. Following transduction, the NK cells are expanded in the presence of feeder cells. In some examples, NK cells are activated as described herein in the presence of feeder cells (e.g., at least 1:1 ratio (feeder cells:NK cells), for example, at least 2:1, 5:1, 10:1, 15:1, 20:1, or more) prior to transduction (for example for 1-5 days, such as 1, 2, 3, 4, or 5 days). The feeder cells are then separated from the activated NK cells prior to transduction. In some examples, the feeder cells are removed using immunomagnetic depletion for a cell surface protein specific to the feeder cells (e.g., CD19 for LCL feeder cells). Alternatively, the feeder cells can be separated from the NK cells using an NK cell surface specific protein, such as CD56. The separated NK cells are then transduced and cultured for 1-5 days (such as 1, 2, 3, 4, or 5 days, for example for 3 days), in the absence of feeder cells. The transduced NK cells are replated with feeder cells (for example, at least 2:1, 5:1, 10:1, 15:1, 20:1 ratio of feeder cells:NK cells) for expansion. In one non-limiting example, NK cells are isolated and plated with feeder cells at 10:1 feeder cells:NK cells. The NK cells are activated for 2-3 days with IL-2 prior to transduction. Three days after transduction, the feeder cells are removed using CD19 depletion and the NK cells are replated with 10:1 feeder cells:NK cells and continued to be cultured in the presence of IL-2 for expansion.

The disclosed methods provide high efficiency transgene expression in the modified NK cells. In some embodiments, transgene expression in NK cells obtained with the disclosed methods is greater than 25%, such as at least 30%, at least 35%, at least 40%, at least 45%, at least 50%, at least 55%, at least 60%, at least 65%, at least 70%, at least 75%, at least 80%, such as 30-60%, 45-75%, 50-80%, 40-60%, or 40-50%. Transgene expression is also long-lasting post-transduction, for example for 1-10 weeks or more (such as 2-4 weeks, 3-6 weeks, 4-8 weeks, 7-10 weeks or more). In some examples, the transgene is expressed for at least 3 days, at least 5 days, at least 7 days, at least 10 days, at least 14 days, at least 21 days, at least 28 days, at least 35 days, at least 42 days, at least 49 days, at least 56 days, or more post-transduction. In other examples, the transgene expression continues for the lifetime of the NK cell either in vitro or following administration to a subject.

A. Isolation and Enrichment of NK Cells

Techniques for the in vitro isolation and enrichment of NK cells are described herein. An exemplary procedure is described in US Pat. App. Publ. No. 2014/0086890, incorporated herein by reference in its entirety. One of ordinary skill in the art can identify additional methods for expanding NK cells, for example as described in Childs et al., *Hematol. The Education Program* 2013:234-246, 2013, incorporated herein by reference in its entirety.

Mononuclear cells are collected from a subject (such as a donor subject or a subject with a tumor or hyperproliferative disease or viral infection) or from a donor HLA-matched to the subject to be treated. In some examples, mononuclear cells are collected by an apheresis procedure. The mononuclear cells are enriched for NK cells, for example by negative depletion using an immuno-magnetic bead strategy. In some examples, NK cells are enriched by depleting the mononuclear cell sample of T cells, B cells, monocytes, dendritic cells, platelets, macrophages, and erythrocytes utilizing a mixture of biotinylated monoclonal antibodies. The non-NK cells in the sample are removed with magnetic beads coupled to streptavidin, resulting in an enriched preparation of NK cells. An exemplary commercially available kit for this method is Dynabeads® Untouched™ Human NK Cells kit (ThermoFisher Scientific, Waltham, MA). In another example, NK cells are enriched by positive selection of $CD56^+$ NK cells, for example utilizing magnetic beads conjugated to an anti-CD56 antibody (such as CD56 MicroBeads, Miltenyi Biotec, Inc., Auburn, CA). In other examples, a two-step method including negative depletion (such as T cell depletion) followed by positive selection of $CD56^+$ NK cells is used for enriching NK cells. These methods can be carried out under or adapted for Current Good Manufacturing Practice (cGMP). One of ordinary skill in the art can identify other methods that can be used to prepare an enriched population of NK cells.

Bulk NK cells or NK cell subsets isolated by additional enriching procedures, such as through the use of immuno-magnetic beads or flow sorting, may be grown in cell culture medium. In one example, the medium is Cellgro SCGM serum-free media (CellGenix, Gaithersburg, MD) containing 10% human AB serum, 50 U/mL penicillin, 50 µg/mL streptomycin, and 500 IU/mL IL-2 or in X-VIVO™ 20 media containing 10% heat inactivated human AB serum or 10% autologous serum.

The isolated NK cells can be analyzed by flow cytometry for the expression of markers such as CD56, CD16, TRAIL, FasL, NKG2D, LFA-1, perforin, and granzymes A and B. Chromium release assays can be used to assess NK cell cytotoxicity against cell targets. One of ordinary skill in the art can identify other methods to assess the isolated NK cell population (for example, purity, viability, and/or activity).

In some embodiments, enriched NK cells (typically >99% CD3 negative and >85% CD56+) are optionally also expanded in vitro. In one non-limiting example, the enriched NK cells are cultured with an irradiated EBV-LCL feeder cell line (such as SMI-LCL) in medium including 500 IU/ml IL-2 for up to 21 days. Utilizing this technique, expansions of NK cells in the range of 200- to 1000-fold may be achieved (expanded NK cells are typically >99% CD3 negative and >90% CD56+). In some examples, the starting population of enriched NK cells is about $0.8\text{-}1.6\times10^8$ total NK cells, which over a 2-4 week period expand up to 1000-fold or greater in vitro. Similar numbers of NK cells have been expanded in scaled up experiments using GMP conditions. In some examples, NK cells are expanded in G-Rex® containers (Wilson Wolf, New Brighton, MN). The G-Rex®100 container supports NK expansions to doses of $2.5\times10^8$ NK cells/kg or higher. NK cells cultured in G-Rex®100 containers could be cultured at concentrations up to $4\times10^6$ NK cells/ml.

B. NK Cell Activation

The disclosed methods include activation (also referred to herein as "priming") of NK cells prior to transduction. Isolated NK cells (e.g., >95% $CD3^-$ and >85% $CD56^+$ or >99% $CD3^-$ and >90% $CD56^+$) are prepared as described in Section IIA or are otherwise obtained (for example, from a previous preparation, such as a cryopreserved isolated NK cell preparation). Cytokine stimulation induces metabolic activation and permits active gene expression in NK cells similar to other lymphocyte subsets, which may assist with efficient lentiviral vector mediated gene transduction.

In some embodiments of the disclosed methods, isolated NK cells (such as NK cells isolated from a subject or a donor or NK cells isolated and expanded from a subject or donor) are activated by culturing the isolated NK cells with one or more cytokines for a period of time prior to transduction. The NK cells are cultured in a culture medium including one or more cytokines for 1-14 days (such as 1-10 days, 1-7 days, 1-5 days, 2-6 days, 3-8 days, 1-4 days, or 1-3 days) prior to transduction. In some examples, the NK cells are cultured with one or more cytokines for 12 hours, 18 hours, or 1, 2, 3, 4, 5, 6, 7, 8, 9, 10, 11, 12, 13, or 14 days prior to transduction. In some examples, the NK cells are primed by culture with one or more cytokines in the absence of feeder cells. Optionally, the NK cells are primed by culture with one or more cytokines and irradiated feeder cells (such as those discussed in Section IIC) for 1-14 days prior to transduction.

The NK cells are cultured with one or more cytokines for 1-14 days prior to transduction. The one or more cytokines include IL-2, IL-15, and/or IL-21. In some examples, the NK cells are cultured in culture medium including IL-2 for 1-14 days prior to transduction (such as 1-7 days, 2-6 days, 5-10 days, or 7-14 days). IL-2 is included in the culture medium at about 10-2000 IU/ml (such as about 50-100 IU/ml, 100-500 IU/ml, 200-600 IU/ml, 500-1000 IU/ml, or 1000-2000 IU/ml, for example, about 10 IU/ml, 20 IU/ml, 50 IU/ml, 100 IU/ml, 200 IU/ml, 500 IU/ml, 1000 IU/ml, 1500 IU/ml, 2000 IU/ml, or more). In some non-limiting examples, the NK cells are activated in culture medium including 500 IU/ml IL-2 or 1000 IU/ml IL-2 for 1-6 days, 2-3 days, or 3-5 days. In other examples, the NK cells are cultured in culture medium including IL-15 for 1-14 days prior to transduction (such as 1-7 days, 2-6 days, 5-10 days, or 7-14 days). IL-15 is included in the culture medium at about 1-100 ng/ml (such as about 1-10 ng/ml, 5-20 ng/ml, 10-50 ng/ml, 25-75 ng/ml, or 50-100 ng/ml, for example, about 1 ng/ml, 5 ng/ml, 10 ng/ml, 20 ng/ml, 30 40 ng/ml, 50 ng/ml, 60 ng/ml, 70 ng/ml, 80 ng/ml, 90 ng/ml, or 100 ng/ml). In one non-limiting example, the NK cells are activated in culture medium including 10 ng/ml or 50 ng/ml IL-15 for 1-6 days, 2-3 days, or 3-5 days. In still further examples, the NK cells are cultured in culture medium including IL-2 and IL-15 for 1-14 days prior to transduction (such as 1-7 days, 2-6 days, 5-10 days, or 7-14 days), for example culture medium including 1-1000 IU/ml IL-2 and 1-100 ng/ml IL-15. In one non-limiting example, the NK cells are activated in culture medium including 500 IU/ml IL-2 and 10 ng/ml or 50 ng/ml IL-15 for 1-6 days, 2-3 days, or 3-5 days. In other examples, the NK cells are cultured in culture medium including IL-2 and IL-21 for 1-14 days prior to transduction (such as 1-7 days, 2-6 days, 5-10 days, or 7-14 days), for example culture medium including 1-1000 IU/ml IL-2 and 1-100 ng/ml IL-21. In one non-limiting example, the NK cells are activated in culture medium including 500 IU/ml IL-2 and 20 ng/ml IL-21 for 1-6 days, 2-3 days, or 3-5 days. In another example, the NK cells are cultured in culture medium including 1-1000 IU/ml IL-2, 1-100 ng/ml IL-15, and 1-100 ng/ml IL-21 for 1-14 days prior to transduction (such as 1-7 days, 2-6 days, 5-10 days, or 7-14 days). In one non-limiting example, the NK cells are activated in culture medium including 500 IU/ml IL-2, 10 ng/ml IL-15, and 20 ng/ml IL-21 for 1-6 days, 2-3 days, or 3-5 days.

C. Transduction and Expansion of Transduced NK Cells

The activated (primed) NK cells, such as those described in Section IIB are transduced with a viral vector including one or more heterologous nucleic acids, such as one or more nucleic acids encoding a protein of interest or another nucleic acid of interest (such as an shRNA). In particular non-limiting examples, the vector is a lentiviral vector.

Viral vectors suitable for gene delivery to NK cells include retrovirus, adenovirus, adeno-associated virus, vaccinia virus, fowlpox, and lentivirus vectors. In particular non-limiting examples disclosed herein, NK cells are transduced with lentiviral vectors including one or more heterologous nucleic acids of interest. Some advantages of using a lentiviral system include long-term expression of the transgene, the ability to transduce both dividing cells and non-dividing cells, the ability to deliver complex genetic elements, lack of expression of viral proteins after transduction, lack of insertional mutagenesis in human cells, high titer production, and ease of vector manipulation and production.

Disclosed herein are lentiviral vectors or constructs including one or more heterologous nucleic acids of interest. In particular examples, the nucleic acid(s) of interest (such as those described in Section III) is included in a lentiviral gene transfer vector (see, e.g., FIG. 1A). The nucleic acid(s) of interest in the transfer vector is operably linked to one or more expression control elements, such as a promoter. Exemplary promoters include constitutive promoters such as cytomegalovirus (CMV), SV40, phosphoglycerate kinase (PGK), ubiquitin C (UBC), elongation factor-1 (EFS), chicken β-action short promoter (CBH), EF-1 alpha (EF1a) promoter, or EF1a short promoter (EFS), a hybrid promoter (such as a CMV enhancer fused to chicken β-actin promoter (CAG)), or an inducible or tissue-specific promoter. In other examples, for example when the nucleic acid of interest is a shRNA, the nucleic acid may be operably linked to an RNA polymerase III promoter, such as a U6 or H1 promoter.

Additional expression control elements that may be included in the transfer vector include sequences that control or regulate transcription and/or translation of a nucleic acid, such as enhancers, leader sequences, transcription terminators, start and/or stop codons, internal ribosome entry sites (IRES), splicing signals, and polyadenylation signals. In examples where the vector or construct includes two (or more) heterologous nucleic acids of interest, the nucleic acids are operably linked, for example, separated by an IRES or other multicistronic element such as a P2A and/or T2A element. The vector may also contain additional elements such as packaging signals (e.g., lentivirus ψ packaging signal), a central polypurine tract (cPPT), a woodchuck hepatitis virus post-transcriptional regulatory element (WPRE), or a Rev Response element (RRE). In some examples, the lentivirus vector is self-inactivating.

Lentivirus vectors including one or more nucleic acids of interest can be prepared by one of ordinary skill in the art utilizing conventional molecular biology techniques. For example, the nucleic acid of interest can be cloned into a lentivirus transfer vector. Lentivirus plasmid systems (such as 3 or 4 plasmid systems) are commercially available, for example from Clontech (Mountain View, CA), ThermoFisher Scientific (Waltham, MA), or Addgene (Cambridge, MA). In some examples, lentivirus vectors are modified to suit a particular use, such as to obtain sustained in hematopoietic cells. In some examples, the modifications include one or more of the modifications described in Example 1, below.

In some embodiments, the lentiviral vector includes or consists of a nucleic acid sequence with at least 90% sequence identity (such as at least 90%, 91%, 92%, 93%, 94%, 95%, 96%, 97%, 98%, 99%, or 100% identity) to any one of SEQ ID NOs: 8-17. In some non-limiting examples, the lentiviral vector includes or consists of the nucleic acid sequence of any one of SEQ ID NOs: 8-17. A vector map of SEQ ID NO: 16 is shown in FIG. 21A and a vector map of SEQ ID NO: 17 is shown in FIG. 21B.

In some embodiments, the disclosed lentiviral vectors include a promoter operably linked to a nucleic acid(s) of interest. The promoter and/or the nucleic acid(s) of interest in SEQ ID NOs: 8-17 can be replaced with any promoter and/or nucleic acid(s) of interest. For example, the vectors of SEQ ID NOs: 16 and 17 include the PGK promoter (e.g., at nucleotide positions 1959-2469); however, this promoter could be replaced with a different promoter, such as the EFS promoter (e.g., nucleotides positions 1959-2190 of SEQ ID NO: 10). Alternatively, the nucleic acid linked to the promoter can be replaced with an alternative nucleic acid(s) for expression. In one example, the vector of SEQ ID NO: 10 includes the EFS promoter (e.g., at nucleotide positions 1959-2190) linked to a nucleic acid encoding EGFP (nucleotide positions 2221-2940). The nucleic acid encoding EGFP in the vectors disclosed herein can be replaced with a nucleic acid encoding a different nucleic acid of interest, including but not limited to a nucleic acid encoding CXCR4, CD16, CD34t, (nucleic acid positions in SEQ ID NOs: 16 and 17 are shown Table 3) or a nucleic acid encoding other nucleic acid(s) of interest, such as the transgenes shown in Table 1. In particular examples, the nucleic acid of interest is operably linked to a PGK, EFS, or SV40 promoter. Other elements of the disclosed vectors (shown in Table 4) can also be changed (for example, replaced) or modified, as desired.

Lentivirus particles are produced by transfecting a mammalian cell line (such as 293T cells or a derivative thereof) with the plasmids of the lentivirus system (such as the three plasmid system illustrated in FIG. 1A). Transfection is carried out by standard methods, for example utilizing calcium-phosphate or polyethyleneimine-mediated transfection or commercially available transfection reagents such as Lipofectamine® (ThermoFisher Scientific, Waltham, MA), FuGene® (Promega, Madison, WI), Universal Transfection Reagent (Sigma-Aldrich, St. Louis, MO), or SuperFect® (Qiagen, Valencia, CA) transfection reagents. Following transfection, lentiviral particles are released into the culture medium and are harvested. In some examples, the transfected cells are cultured for about 18-72 hours (for example, about 18-36 hours, 24-48 hours, or 36-72 hours, such as 18, 24, 36, 48, 60, or 72 hours). The virus-containing medium, which contains the packaged lentivirus particles, is harvested. In some examples, the virus is concentrated (such as by about 2-fold, 5-fold, 10-fold, 20-fold, 50-fold, 100-fold, or more) for example, by ultracentrifugation of the culture supernatant. The virus preparation can be analyzed to determine the number of viral particles in a particular volume (e.g., pfu/ml, for example by p24 ELISA) or to determine the number of particles including the RNA of interest (e.g., transducing units (TU)/ml, for example by FACS analysis). In some examples, the concentrated virus preparation contains about $10^7$-$10^{10}$ TU/ml (e.g., about $10^7$-$10^9$, $10^8$-$10^{10}$, or $10^8$-$10^9$ TU/ml).

Transduced NK cells are produced by contacting the activated NK cells described in Section IIB with the lentiviral particles, for example at a multiplicity of infection (MOI) of about 0.5 to 200 (such as about 0.5-5, 1-10, 5-15, 10-25, 20-50, 40-80, 60-100, 75-150, or 100-200, for example, about 0.5, 1, 2, 5, 10, 15, 20, 25, 30, 40, 50, 60, 70, 80, 90, 100, 125, 150, 175, or 200). In some examples, the NK cells are contacted with virus at an MOI of about 10-20 or an MOI of about 20. In some examples, the transduction is in the presence of one or more additional compounds, such as protamine sulfate (for example, 5-50 μg/ml, such as 5, 10, 20, 30, 40, or 50 μg/ml) or hexadimethrine bromide (e.g., Polybrene®, for example about 4-40 μg/ml, such as 4, 8, 12, 16, 20, 24, 28, 32, 36, or 40 μg/ml), or a fibronectin fragment (e.g., Retronectin®). The cells are cultured with the viral particles for about 6 hours to 5 days (for example, about 6-24 hours, 12-48 hours, 24-72 hours, 48-60 hours, or 72-96 hours), such as about 1, 2, 3, 4, or 5 days.

Following transduction of the NK cells with the lentivirus, the viral particles are removed (for example by exchanging the culture medium and optionally washing the cells). In some examples, NK cells expressing the transgene are optionally selected prior to expansion (below). For example, if the transgene is expressed on the cell surface, NK cells expressing the transgene may be enriched by immunomagnetic techniques or flow cytometry. For example, if the NK cells are transduced with a vector including a nucleic acid encoding a truncated CD34 molecule (CD34t), transduced NK cells can be selected or enriched by contacting the population of transduced NK cells with an anti-CD34 antibody and purifying CD34-expressing cells for example, using flow cytometry or immuno-magnetic beads (e.g., CliniMACS® CD34 reagent system, Miltenyi Biotec Inc., San Diego, CA or Isolex® 300 magnetic cell selection system, Nexell Therapeutics Inc., Irvine, CA), for example about 2-4 days after transduction.

The transduced NK cells are then expanded by culturing the cells for 1-40 days or more (such as 3-14 days, 5-21 days, 7-28 days, 14-30 days, 21-40 days, or more, for example, 1, 3, 5, 7, 10, 14, 21, 28, 35, 42 days, or more). In some examples, the transduced NK cells are expanded in cell culture medium containing at least one cytokine. In some examples, the transduced NK cells are expanded by culturing in a medium (such as X-VIVO™ 20 or X-VIVO™ 15 medium (Lonza, Basel, Switzerland)) including IL-2 (such as 1-1000 IU/ml, for example, 500 IU/ml IL-2). In some embodiments, one or more additional cytokines can be utilized in the expansion of the transduced NK cells, including but not limited to IL-18, IL-7, IL-15, and/or IL-12.

In some examples, feeder cells (such as irradiated feeder cells) are added to the transduced NK cell culture during the expansion step. The feeder cells are added in an amount that can support expansion of the NK cells, such as at least 2:1 ratio (feeder cells:NK cells), for example, 5:1, 10:1, 15:1, 20:1, or more. Exemplary feeder cells include EBV-LCLs (TM-LCL, SMI-LCL), allogeneic or autologous PBMCs, Wilms tumor cell line HFWT, and K562 cells (such as genetically modified K562 cells, for example, K562-mb15-41BBL or K562-mbIL-21 cells). In some examples, the transduced NK cells are mixed with the feeder cells at the selected ratio and the cell mixture is plated.

Utilizing these techniques, expansion of the transduced NK cells in the range of 100- to 1000-fold (such as 200- to 500-fold, 300- to 700-fold, or 600- to 1000-fold) may be achieved.

Following expansion, the modified NK cells are separated from the feeder cells (if used). The modified NK cells are washed one or more times and resuspended in an appropriate buffer or other pharmaceutically acceptable carrier, for example, for administration to a subject. In some examples, the cells are harvested and washed (for example in a buffer, such as phosphate buffered saline). The NK cells may be resuspended in a medium containing PLASMA-LYTE™ multiple electrolytes injection (Baxter Healthcare), autologous plasma, or a pharmaceutically acceptable carrier (for example, a balanced salt solution). In some examples, some or all of the modified NK cells are cryopreserved for later use.

In some examples, the modified NK cells are tested prior to administering to a subject, for example, for one or more of cell viability, tumor cell cytotoxicity, and transgene expression. In additional examples, the phenotype of the modified NK cells is assessed prior to administration, such as by measuring presence and/or amount of one or more cell surface markers (such as CD56, CD16, TRAIL, FasL, NKG2D, LFA-1, perforin, or granzymes A and B), for example by flow cytometry.

III. Modified NK Cells

Disclosed herein are NK cells including a heterologous nucleic acid or expressing one or more heterologous proteins or a nucleic acid of interest (referred to herein as "modified NK cells"). Modified or recombinant NK cells containing one or more heterologous nucleic acids can be produced by transducing NK cells with virus particles including a vector (such as a lentivirus vector) with the one or more heterologous nucleic acids, for example using the methods disclosed herein. The modified NK cells can be formulated into a therapeutic composition for administration to a subject, for example, with one or more pharmaceutically acceptable carriers. Therapeutic compositions and methods of their use are discussed in Section IV, below.

The modified NK cells are NK cells that have been transduced with a viral vector or virus particle (such as a lentiviral vector or lentivirus particle) including one or more transgenes, such as one or more heterologous nucleic acids encoding a protein of interest or capable of regulating expression of another nucleic acid or protein (such as an shRNA, siRNA, or antisense nucleic acid). In some embodiments, the nucleic acid encodes a protein that facilitates targeting of the modified NK cells expressing the protein to a target tissue or cell type. For example, the nucleic acid can encode a protein that increases targeting of an NK cell expressing the protein to tumor cells or sites of tumor cells. In one non-limiting example, the transgene increases targeting of NK cells to bone marrow or lymph nodes (for example, C-C chemokine receptor type 7 (CCR7), C-X-C chemokine receptor type 4 (CXCR4; e.g., wild type CXCR4 or CXCR4 R334X), or CD34) or sites of inflammation (such as C-X-C chemokine receptor type 3 (CXCR3)). In other examples, the transgene encodes a protein that binds to an epitope expressed on tumor cells (such as a chimeric antigen receptor (CAR)). In other embodiments, the nucleic acid encodes a protein that increases antibody-dependent cell mediate cytotoxicity of NK cells, such as high affinity CD16 (CD16-V158).

Thus, in particular examples, the modified NK cells disclosed herein are NK cells (such as a population of NK cells) that include a heterologous nucleic acid encoding a chemokine receptor, such as CXCR4, CCR7, or CXCR3. In other examples, the modified NK cells are NK cells (such as a population of NK cells) that include a heterologous nucleic acid encoding a cell surface protein, such as CD16 (for example, CD16-V158), CD34, double negative TGFβ type II receptor, VLA-4 (alpha4beta-1), or LFA-1. In additional examples, the modified NK cells are NK cells (such as a population of NK cells) that include a heterologous nucleic acid encoding a chimeric antigen receptor (CAR), for example CD19-CAR, CD20-CAR, CD33-CAR, CD138-CAR, CS1-CAR, GD2-CAR, HER2-CAR, erbB2-CAR, carcinoembryonic antigen (CEA)-CAR, epithelial cell adhesion molecule (EpCAM)-CAR, natural-killer group 2, member D, long form (NKG2D-L)-CAR, or TRAIL receptor 1 (TRAIL-R1)-CAR. In still further examples, the modified NK cells are transduced with recombinant TRAIL (e.g., to enhance NK cell TRAIL-mediated tumor killing) DR5-specific TRAIL, recombinant FAS-Ligand (e.g. to enhance FAS-Ligand mediated tumor killing), DNAM-1 (e.g., to enhance NK cell activation and tumor killing), NK cell activating receptors such as NKG2D, DNAM-1, NKp30, NKp44, or NKp46 (e.g., to enhance tumor killing), or NKG2C (e.g., to enhance NK cell killing of viral infected cells).

In one non-limiting example, the modified NK cells include a heterologous nucleic acid encoding CXCR4 operably linked to a promoter (such as a PGK promoter) or nucleic acids encoding CD34t and CXCR4 operably linked to a promoter (such as a PGK promoter). In other non-limiting examples, the modified NK cells include a heterologous nucleic acid encoding high affinity CD16 operably linked to a promoter (such as a PGK promoter) or nucleic acids encoding CD34t and high affinity CD16 operably linked to a promoter (such as a PGK promoter). In another non-limiting example, the modified NK cells include a heterologous nucleic acids encoding CXCR4 and high affinity CD16 operably linked to a promoter (such as a PGK promoter) or nucleic acids encoding CD34t, CXCR4, and high affinity CD16 operably linked to a promoter (such as a PGK promoter). In some examples, the nucleic acid encoding CXCR4 includes or consists of a nucleic acid with at least 90% identity (such as at least 90%, 91%, 92%, 93%, 94%, 95%, 96%, 97%, 98%, 99%, or 100% identity) to SEQ ID NO: 1 and/or encodes a protein including or consisting of an amino acid sequence with at least 95% identity (such as at least 95%, 96%, 97%, 98%, 99%, or 100% identity) to SEQ ID NO: 2. In some examples, the nucleic acid encoding CD34t includes or consists of a nucleic acid with at least 90% identity (such as at least 90%, 91%, 92%, 93%, 94%, 95%, 96%, 97%, 98%, 99%, or 100% identity) to SEQ ID NO: 3 and/or encodes a protein including or consisting of an amino acid sequence with at least 95% identity (such as at least 95%, 96%, 97%, 98%, 99%, or 100% identity) to SEQ ID NO: 4. In some examples, the nucleic acid encoding high affinity CD16 includes or consists of a nucleic acid with at least 90% identity (such as at least 90%, 91%, 92%, 93%, 94%, 95%, 96%, 97%, 98%, 99%, or 100% identity) to SEQ ID NO: 5 or SEQ ID NO: 6 and/or encodes a protein including or consisting of an amino acid sequence with at least 95% identity (such as at least 95%, 96%, 97%, 98%, 99%, or 100% identity) to SEQ ID NO: 7.

In other examples, the modified NK cells can be transduced with a viral vector including a nucleic acid coding for small interfering RNAs (siRNAs), such as small hairpin RNA (shRNA). In one example, the modified NK cells are NK cells (such as a population of NK cells) that include a heterologous NKG2A shRNA nucleic acid.

IV. Methods of Treating or Inhibiting a Condition

Disclosed herein are methods of treating a subject with a disease or disorder by administering the modified NK cells described herein to the subject. The modified NK cells described herein can be administered either to animals or to human subjects. In some embodiments, the disease or disorder is a tumor or hyperproliferative disease. In other embodiments, the disease or disorder is a viral infection (including but not limited to cytomegalovirus, adenovirus, respiratory syncytial virus, Epstein-Barr virus, or human immunodeficiency virus infection).

The modified NK cells described herein can be incorporated into pharmaceutical compositions. Such compositions typically include a population of modified NK cells and a pharmaceutically acceptable carrier. A "pharmaceutically acceptable carrier" includes any and all solvents, dispersion media, coatings, antibacterial and antifungal agents, isotonic and absorption delaying agents, and the like, compatible with pharmaceutical administration (see, e.g., *Remington: The Science and Practice of Pharmacy*, The University of the Sciences in Philadelphia, Editor, Lippincott, Williams, & Wilkins, Philadelphia, PA, 21st Edition, 2005). Examples of such carriers or diluents include, but are not limited to, water, saline, Ringer's solutions, dextrose solution, balanced salt solutions, and 5% human serum albumin. Liposomes and non-aqueous vehicles such as fixed oils may also be used. Supplementary active compounds can also be incorporated into the compositions. Actual methods for preparing administrable compositions are known or apparent to those skilled in the art and are described in more detail in such publications as *Remington: The Science and Practice of Pharmacy*, The University of the Sciences in Philadelphia, Editor, Lippincott, Williams, & Wilkins, Philadelphia, PA, 21st Edition (2005). In one non-limiting example, the transduced NK cells are suspended in PLASMA-LYTE™ multiple electrolyte solution.

In some examples, the composition includes about $10^4$ to $10^{12}$ of the modified NK cells (for example, about $10^4$-$10^7$ cells, about $10^6$-$10^9$ cells, or about $10^8$-$10^{12}$ cells). For example, the composition may be prepared such that about $10^6$ to $10^{10}$ modified NK cells/kg (such as about $10^6$, $10^7$, $10^8$, $10^9$, or $10^{10}$ cells/kg) are administered to a subject. The population of modified NK cells is typically administered parenterally, for example intravenously; however, injection or infusion to a tumor or close to a tumor (local administration) or administration to the peritoneal cavity can also be used. One of skill in the art can determine appropriate routes of administration.

Multiple doses of the population of modified NK cells can be administered to a subject. For example, the population of modified NK cells can be administered daily, every other day, twice per week, weekly, every other week, every three weeks, monthly, or less frequently. A skilled clinician can select an administration schedule based on the subject, the condition being treated, the previous treatment history, and other factors.

In additional examples, the subject is also administered one or more cytokines (such as IL-2, IL-15, IL-21, and/or IL-12) to support survival and/or growth of NK cells. The cytokine(s) are administered before, after, or substantially simultaneously with the NK cells. In some examples, the cytokine(s) are administered after the NK cells. In one specific example, the cytokine(s) is administered to the subject within about 1-8 hours (such as within about 1-4 hours, about 2-6 hours, about 4-6 hours, or about 5-8 hours) after administration of the NK cells.

In some examples, the methods include treating or inhibiting a hyperproliferative disorder, such as a hematological malignancy or a solid tumor. Examples of hematological malignancies include leukemias, including acute leukemias (such as 11q23-positive acute leukemia, acute lymphocytic leukemia, acute myelocytic leukemia, acute myelogenous leukemia and myeloblastic, promyelocytic, myelomonocytic, monocytic and erythroleukemia), chronic leukemias (such as chronic myelocytic (granulocytic) leukemia, chronic myelogenous leukemia, and chronic lymphocytic leukemia), T-cell large granular lymphocyte leukemia, polycythemia vera, lymphoma, diffuse large B-cell lymphoma, Hodgkin's lymphoma, non-Hodgkin's lymphoma (indolent and high grade forms), mantle cell lymphoma, follicular cell lymphoma, multiple myeloma, Waldenstrom's macroglobulinemia, heavy chain disease, myelodysplastic syndrome, hairy cell leukemia and myelodysplasia.

Examples of solid tumors, such as sarcomas and carcinomas, include fibrosarcoma, myxosarcoma, liposarcoma, chondrosarcoma, osteogenic sarcoma, and other sarcomas, synovioma, mesothelioma, Ewing's tumor, leiomyosarcoma, rhabdomyosarcoma, colon carcinoma, lymphoid malignancy, pancreatic cancer, breast cancer (including basal breast carcinoma, ductal carcinoma and lobular breast carcinoma), lung cancers, ovarian cancer, prostate cancer, hepatocellular carcinoma, squamous cell carcinoma, basal cell carcinoma, adenocarcinoma, sweat gland carcinoma, medullary thyroid carcinoma, papillary thyroid carcinoma, pheochromocytoma, sebaceous gland carcinoma, papillary carcinoma, papillary adenocarcinoma, medullary carcinoma, bronchogenic carcinoma, renal cell carcinoma, hepatoma, bile duct carcinoma, choriocarcinoma, Wilms' tumor, cervical cancer, testicular tumor, seminoma, bladder carcinoma, and CNS tumors (such as a glioma, astrocytoma, medulloblastoma, craniopharyrgioma, ependymoma, pinealoma, hemangioblastoma, acoustic neuroma, oligodendroglioma, meningioma, melanoma, neuroblastoma, and retinoblastoma).

In particular examples, hematological malignancies that can be inhibited or treated by the methods disclosed herein include but are not limited to multiple myeloma, chronic lymphocytic leukemia, acute lymphocytic leukemia, acute myeloid leukemia, chronic myelogenous leukemia, prolymphocytic/myelocytic leukemia, plasma cell leukemia, NK cell leukemia, Waldenstrom macroglobulinemia, Hodgkin's lymphoma, non-Hodgkin's lymphoma, mantle cell lymphoma, diffuse large B-cell lymphoma, and follicular lymphoma. In additional particular examples, solid tumors that can be treated or inhibited by the methods disclosed herein include lung carcinoma, prostate cancer, pancreatic cancer (for example, insulinoma), breast cancer, colorectal adenocarcinoma or squamous cell carcinoma, neuroblastoma, testicular cancer (such as seminoma), and ovarian cancer. In specific, non-limiting examples, the subject has chronic myelogenous leukemia or acute monocytic leukemia. Exemplary transgenes for expression by modified NK cells that can be used for treating a subject with exemplary disorders are shown in Table 1. However, one of ordinary skill in the art can select NK cells expressing an appropriate transgene for treating a subject with other disorders.

TABLE 1

Exemplary modified NK cells for treating particular disorders

| Transgene Expressed by Modified NK Cells | Disorder |
|---|---|
| CD16 V158 | Multiple tumor types, including multiple myeloma and lymphoma |
| CCR7 | Lymphoma |
| CXCR3 | Tumor metastases |
| CXCR4 | Breast cancer, kidney cancer, multiple myeloma |
| CD34 | Leukemia |
| CD19-CAR | B cell malignancies |
| CD20-CAR | B cell malignancies |
| CD33-CAR | leukemia |
| CS1-CAR | Myeloma |
| CD138-CAR | Myeloma |
| GD2-CAR | Neuroblastoma, melanoma |
| Her2/Neu-CAR | Breast cancer |
| ErbB2-CAR | Breast cancer |
| CEA-CAR | Colon cancer |
| EpCAM-CAR | Epithelial tumors |
| NKG2D-CAR | Leukemia, solid tumors |
| TRAIL-R1-CAR | Multiple tumor types |
| DNTβRII | Lung cancer |
| TRAIL | Multiple tumor types |
| FAS-Ligand | Multiple tumor types |
| DNAM-1 | Multiple tumor types |
| NKG2D | Multiple tumor types |
| NKp30 | Multiple tumor types |
| NKp44 | Multiple tumor types |
| NKp46 | Multiple tumor types |
| NKG2C | Viral infection |
| NKG2A shRNA | Leukemia |

In some examples, the subject (such as a subject with a tumor or hyperproliferative disorder) is also administered one or more chemotherapeutic agents and/or radiation therapy. One of skill in the art can select additional chemotherapeutic agents for administration to a subject in combination with the modified NK cells described herein, for example, based on the type of tumor or disorder being treated). Such agents include alkylating agents, such as nitrogen mustards (such as mechlorethamine, cyclophosphamide, melphalan, uracil mustard or chlorambucil), alkyl sulfonates (such as busulfan), nitrosoureas (such as carmustine, lomustine, semustine, streptozocin, or dacarbazine); antimetabolites such as folic acid analogs (such as methotrexate), pyrimidine analogs (such as 5-FU or cytarabine), and purine analogs, such as mercaptopurine or thioguanine; or natural products, for example vinca alkaloids (such as vinblastine, vincristine, or vindesine), epipodophyllotoxins (such as etoposide or teniposide), antibiotics (such as dactinomycin, daunorubicin, doxorubicin, bleomycin, plicamycin, or mitocycin C), and enzymes (such as L-asparaginase). Additional agents include platinum coordination complexes (such as cis-diamine-dichloroplatinum II, also known as cisplatin), substituted ureas (such as hydroxyurea), methyl hydrazine derivatives (such as procarbazine), and adrenocrotical suppressants (such as mitotane and aminoglutethimide); hormones and antagonists, such as adrenocorticosteroids (such as prednisone), progestins (such as hydroxyprogesterone caproate, medroxyprogesterone acetate, and magestrol acetate), estrogens (such as diethylstilbestrol and ethinyl estradiol), antiestrogens (such as tamoxifen), and androgens (such as testosterone proprionate and fluoxymesterone). Examples of the most commonly used chemotherapy drugs include adriamycin, melphalan (Alkeran®) Ara-C (cytarabine), carmustine, busulfan, lomustine, carboplatinum, cisplatinum, cyclophosphamide (Cytoxan®), daunorubicin, dacarbazine, 5-fluorouracil, fludarabine, hydroxyurea, idarubicin, ifosfamide, methotrexate, mithramycin, mitomycin, mitoxantrone, nitrogen mustard, paclitaxel (or other taxanes, such as docetaxel), vinblastine, vincristine, VP-16, while newer drugs include gemcitabine (Gemzar®), trastuzumab (Herceptin®), irinotecan (CPT-11), leustatin, navelbine, rituximab (Rituxan®) imatinib (STI-571), Topotecan (Hycamtin®), capecitabine, ibritumomab (Zevalin®), and calcitriol.

In some particular examples, the modified NK cells express CD16 V158 and the additional agent is an anti-cancer monoclonal antibody. In specific, non-limiting examples, modified NK cells expressing CD16-V158 are administered to a subject with multiple myeloma in combination with an antibody that binds to CD38 (such as daratumumab). In another particular example, modified NK cells expressing CD16-V158 are administered to a subject with lymphoma in combination with an antibody that binds to CD20 (such as rituximab). Additional exemplary monoclonal antibodies that can be administered to a subject in combination with modified NK cells expressing CD16-V158 are provided in Table 2.

TABLE 2

Exemplary therapeutic monoclonal antibodies for administration in combination with NK cells expressing CD16-V158

| Antigen | mAb | Target Tumor/Disease |
|---|---|---|
| CD19 | GBR 401, MEDI-551 | B cell lymphoma, CLL |
| CD20 | Rituximab (RITUXAN ®), ofatumumab (ARZERRA ®), veltuzumab | Non-Hodgkin's lymphoma |
| | Ibritumomab tiuxetan (ZEVALIN ®), obinutuzumab, ublituximab, tositumomab (BEXXAR ®), ocaratuzumab | Lymphoma |
| CD22 | Narnatumab, inotuzumab ozogamicin | Cancer |
| CD30 | Brentuximab vedotin (ADCETRIS ®), iratumumab | Hodgkin's lymphoma |
| CD33 | Gemtuzumab ozogamicin (MYLOTARG ®), lintuzumab, | Acute myelogenous leukemia |
| CD37 | Otlertuzumab | Cancer cells |
| CD38 | Daratumumab | Multiple myeloma |
| CD40 | Lucatumumab, dacetuzumab | multiple myeloma, non-Hodgkin's or Hodgkin's lymphoma |
| CD52 | Alemtuzumab (CAMPATH ®, MABCAMPATH ®, CAMPATH-1H ®) | Chronic lymphocytic leukemia |
| CD56 | Lorvotuzumab mertansine | small-cell lung cancer, ovarian cancer |
| CD70 | Vorsetuzumab mafodotin | Renal cell carcinoma |
| CD74 | Milatuzumab | Multiple myeloma |
| CD140 | Tovetumab | cancer |
| EpCAM | IGN101, oportuzumab monatox, tucotuzumab celmoleukin, adecatumumab | Epithelial tumors (breast, colon and lung) |
| CEA | Labetuzumab (CEA-CIDE ®) | Breast, colon and lung tumors |
| gpA33 | huA33 | Colorectal carcinoma |
| mesothelin | Amatuximab | Cancer cells |
| α-fetoprotein | $^{90}$Y-tacatuzumab tetraxetan | Tumor cells |
| IL-6 | Siltuximab | metastatic renal cell cancer, prostate cancer, and Castleman's disease |
| Mucins | Pemtumomab (THERAGYN ®), cantuzumab mertansine, $^{90}$Y clivatuzumab tetraxetanand, oregovomab (OVAREX ®) | Breast, colon, lung and ovarian tumors |
| PDGFR-alpha | Olaratumab | Solid tumors |

TABLE 2-continued

Exemplary therapeutic monoclonal antibodies for administration in combination with NK cells expressing CD16-V158

| Antigen | mAb | Target Tumor/Disease |
|---|---|---|
| TAG-72 | CC49 (minretumomab) | Breast, colon and lung tumors |
| CAIX | Girentuximab, cG250 | Renal cell carcinoma |
| PSMA | J591 | Prostate carcinoma |
| Folate-binding protein | MOv18 and MORAb-003 (farletuzumab) | Ovarian tumors |
| Scatter factor receptor kinase | Onartuzumab | Cancer cells |
| Gangliosides (e.g., GD2, GD3 and GM2) | 3F8, ch14.18, KW-2871 | Neuroectodermal tumors and some epithelial tumors |
| Cytokeratin | $^{99m}$Tc-Votumumab (HUMASPECT ®) | Colorectal tumors |
| Frizzled receptor | Vantictumab | cancer |
| $Le^y$ | hu3S193, IgN311 | Breast, colon, lung and prostate tumors |
| VEGF | Bevacizumab (AVASTIN ®) | Tumor vasculature |
| VEGFR | IM-2C6, CDP791 | Epithelium-derived solid tumors |
| Integrin αVβ3 | Etaracizumab (ABEGRIN ®), intetumumab | Tumor vasculature |
| Integrin α5β1 | Volociximab | Tumor vasculature |
| EGFR | Cetuximab (ERBITUX ®), panitumumab (VECTIBIX ®), nimotuzumab, necitumumab, zalutumumab, imgatuzumab, matuzumab, 806 | Glioma, lung, breast, colon, and head and neck tumors |
| EGFL7 | Parsatuzumab | Cancer cells |
| ERBB2 | Trastuzumab (HERCLON ®; HERCEPTIN ®), pertuzumab (PERJETA ®; OMNITARG ®) | Breast, colon, lung, ovarian and prostate tumors |
| ERBB3 | Duligotumab, MM-121 | Breast, colon, lung, ovarian and prostate, tumors |
| Fibronectin | Radretumab | antineoplastic |
| HGF | Rilotumumab, ficlatuzumab | Solid tumors |
| HER3 | Patritumab | cancer |
| LOXL2 | Simtuzumab | fibrosis |
| MET | AMG 102, METMAB, SCH 900105 | Breast, ovary and lung tumors |
| IGF1R | Cixutumumab, dalotuzumab, figitumumab, ganitumab, robatumumab, teprotumumab, AVE1642, IMC-A12, MK-0646, R1507, and CP 751871 | Glioma, lung, breast, head and neck, prostate and thyroid cancer |
| IGLF2 | Dusigitumab | |
| EPHA3 | KB004, IIIA4 | Lung, kidney and colon tumors, melanoma, glioma and hematological malignancies |
| FR-alpha | Farletuzumab | Ovarian cancer |
| phosphatidyl-serine | Bavituximab | Cancer cells |
| Syndecan 1 | Indatuximab ravtansine | |
| SLAMF7 (CD319) | Elotuzumab | Multiple myeloma |

TABLE 2-continued

Exemplary therapeutic monoclonal antibodies for administration in combination with NK cells expressing CD16-V158

| Antigen | mAb | Target Tumor/Disease |
|---|---|---|
| TRAILR1 | Mapatumumab (HGS-ETR1) | Colon, lung and pancreas tumors and hematological malignancies |
| TRAILR2 | Conatumumab, lexatumumab, mapatumumab, tigatuzumab, HGS-ETR2, CS-1008 | cancer |
| RANKL | Denosumab (XGEVA ®) | Prostate cancer and bone metastases |
| FAP | Sibrotuzumab, and F19 | Colon, breast, lung, pancreas, and head and neck tumors |
| vimentin | Pritumumab | Brain cancer |
| Tenascin | 81C6 | Glioma, breast and prostate tumors |

EXAMPLES

The following examples are provided to illustrate certain particular features and/or embodiments. These examples should not be construed to limit the disclosure to the particular features or embodiments described.

Example 1

Materials and Methods

Cell Lines and Reagents: The human myelogenous leukemia line (erythroleukemia type) K562 (ATCC) and the acute monocytic leukemia cell line MOLM-14 (ATCC), and EBV-SMI-LCL were cultured in RPMI 1640 supplemented with 10% heat-inactivated fetal bovine serum (FBS, Sigma-Aldrich), 2 mM glutamine, and 100 U/mL penicillin, and 100 μg/mL streptomycin (Life Technologies). The 293T cell line, human embryonic kidney cell line 293 stably expressing SV40 large T antigen (from ATCC) was cultured in Dulbecco's modified Eagle's medium (DMEM; Invitrogen) supplemented with 2 mM L-glutamine, 100 U/mL penicillin, and 100 μg/mL streptomycin (Invitrogen) and 10% FBS. The cells were cultured under 95% humidity at 37° C. and 5% $CO_2$.

Culture and expansion of human peripheral blood-derived NK cells: Peripheral blood mononuclear cells (PBMC) from healthy donors were collected by apheresis (Amicus Separator; Fenwal, Lake Zurich, IL, USA) on an institutional review board-approved protocol in the Department of Transfusion Medicine, National Institutes of Health (Bethesda, MD, USA). Cells were enriched by centrifugation over Ficoll density gradient medium. NK cells were isolated from donor PBMCs using the NK cell isolation kit from Miltenyi following the manufacturer's instructions. Where indicated NK cells were expanded for 11-21 days in NK cell media (X-VIVO™ 20 medium (Lonza) supplemented with 10% heat-inactivated human AB plasma (Sigma-Aldrich) and 500 IU/ml of recombinant human IL-2 (Roche)) in the presence of irradiated EBV-SMI-LCL cells at a ratio of 1:10. The cells were cultured at 37° C. and 6.5% $CO_2$. Half of the media was replaced with fresh NK cell media 5 days into the expansion. Thereafter, NK cells were counted and adjusted to 0.5-1×$10^6$ cells/ml every 48 h, from day 7 until utilized in experiments.

Lentiviral vector system: The human immunodeficiency virus (HIV)-1-based lentiviral gene transfer vector used in this study was similar to a self-inactivating construct pRRL-CMV-eGFP-SIN-18 described by Dull et al. (*J Virol.* 72: 8463-8471, 1998) except that an additional 118-bp sequence containing the central poly purine tract (cPPT) had been introduced in the vector. In addition, the woodchuck hepatitis virus post-transcriptional regulatory element (WPRE) backbone was included to augment transgene expression and/or viral vector titer. The internal cytomegalovirus (CMV) early promoter CMV promoter used to drive the transcription of transgene was replaced with the human phosphoglycerate kinase (PGK) promoter by polymerase chain reaction (PCR)-based amplification. The packaging plasmid pCMVΔR8.91 (devoid of all HIV-1 accessory genes) was used to express the HIV-1 gag, pol, tat, and rev genes and thereby produce lentiviral structural and regulatory proteins. The plasmid pMD.G carrying the vesicular stomatitis virus envelope G protein (VSV-G) coding sequence driven by the CMV promoter and followed by the β-globin polyadenylation site was used to pseudotype the vector particles. The plasmids pRRL-CMV-eGFP-SIN-18, pCMVΔR8.91, and pMD.G were kindly provided by Prof. D. Trono, Department of Genetics and Microbiology, CMU, Geneva, Switzerland.

Lentiviral vector production: Replication-defective lentiviral particles pseudotyped with VSV-G envelope were produced by 3-plasmid transient transfection of 293T cells with 12 μg of the gene transfer construct pRRLsin.PPT.hPGK.eGFP.Wpre, 10 μg of pCMVΔR8.91, and 5 μg of pMD.G, using a calcium phosphate transfection kit (Clontech) as described previously (Chinnasamy et al., *Blood* 96:1309-1316. 2000). The transfection medium was replaced after 8 hours with fresh culture medium. Viral supernatants were harvested at 65 hours after transfection and filtered through 0.45 μm filters (Nalgene, Rochester, NY). The viral supernatants were concentrated to 50× by ultracentrifugation at 50,000 g for 1.5 hours at 4° C.). Viral pellets were resuspended in X-VIVO™ 20 medium (Lonza) and stored frozen at −80° C. until use. Titers of viral supernatants were determined by quantification of p24 gag by enzyme-linked immunosorbent assay (ELISA) (Coulter Diagnostics, Hialeah, FL), and also by transducing 293T cells with serial dilutions of viral supernatants, followed by flow cytometry analysis of EGFP-positive cells, 48 hours after transduction. It was assumed that 1 ng of p24 is approximately equivalent to 1000 to 5000 transducing units. All lentiviral vector preparations were tested for the presence of replication-competent lentivirus (RCL) by transducing 293T cells and assaying culture medium for the presence of p24 gag after at least 5 cell passages. No RCL was detectable in any of the vector preparations tested.

Lentiviral transduction of primary human NK cells primed with cytokines or stimulated with LCL: Cultured human NK cells were transduced with concentrated lentiviral vector particles at a multiplicity of infection (MOI), in the presence of protamine sulfate (10 μg/ml, Sigma-Aldrich), in 24-well plate containing 1 ml/well of NK culture medium supplemented with IL-2 (500 IU/ml or 1000 IU/ml), IL-15 (10 ng/ml), or IL-2 (500 IU/ml) and IL15 (10 ng/ml). After 48 hours transduction, cells were washed and cultured in fresh NK cell culture medium containing IL-2 (500 IU/ml) in the presence or absence of irradiated EBV-SMI-LCL (LCL to NK ratio of 10:1). In some conditions, primary NK cells were co-cultured with EBV-SMI-LCL (LCL to NK ratio of 10:1) at different lengths of time prior to transduction with lentiviral vector for 48 hours and then cells were washed and cultured in fresh NK cell culture medium containing IL-2 (500 IU/ml). The viability of NK cultures was monitored periodically before and after transduction using trypan blue (Sigma) staining. The phenotype and eGFP expression were monitored at regular intervals by flow cytometry.

Flow cytometry: The cultured NK cells were phenotyped by flow cytometry at different time points post culture and expansion according to standard procedures. The following reagents were used in phenotypic characterization: anti-CD56 (NCAM-1), anti-CD3 (UCHT1), anti-CD16 (3G8), anti-TRAIL (RIK-2), anti-NKp46 (29A1.4), and IgG1 (MOPC21) from Becton Dickinson (BD); anti-KIR2DL1/DS1 (EB6), anti-KIR2DL2/3/DS2 (GL183), and anti-NKG2A (Z199) from Beckman Coulter; the anti-KIR3DL1 (Dx9), anti-CD57 (HCD57), NKp44 (Clone p44-8, FAS (clone DX2), CXCR3 (clone 12G5), CXCR4 (clone G025H7), and BV650-streptavidin from Biolegend; the anti-Lir-1 (HP-F1) from eBioscience; the anti-NKG2C (134591) from R&D Systems; LIVE/DEAD viability marker or propidium iodide (PI) from Life Technologies; biotinylated anti-KIR3DL2 (Dx31) primary antibody from UCSF. The BV650-streptavidin (Biolegend) was used to detect the biotinylated anti-KIR3DL2. Briefly, cells were mixed with appropriate concentrations of different dye-conjugated monoclonal antibodies (mAbs). After the addition of primary Ab and incubation for 20 minutes at room temperature, cells were washed with PBS containing 1% FBS. Propidium iodide (PI) or LIVE/DEAD staining was used for dead cell exclusion. All the data were acquired using the Canto II or Fortessa flow cytometer with FACS Diva software (BD Biosciences) and analyzed using the FlowJo software (Tree Star). In each sample, a minimum of 10,000 cells was acquired in the analysis region of viable cells, using log-amplified fluorescence and linearly amplified side- and forward-scatter signals. All samples were analyzed by setting appropriate gates around the lymphocyte population, using LIVE/DEAD or PI-negative cells. Consistency of analysis parameters was ascertained by calibrating the flow cytometer with calibrating beads (BD biosciences). EGFP expression in transduced cells was determined by detecting the % green fluorescence positive cells using a 530/30 nm band pass filter in the FL1 channel.

Cytotoxicity Assay: Natural killer cells were co-cultured at a ratio of 1:1 with either $^{51}$Cr-labeled K562 cells or Molm-14 cells in a final volume of 200 μl in 96-well plates at 37° C. and 5% $CO_2$. After 4 hours, supernatant was harvested onto a Luma plate. Counts were measured using a Perkin Elmer 1450 Microbeta Counter and specific target lysis was calculated using the following formula: [(NK cell-induced $^{51}$Cr release−spontaneous $^{51}$Cr release)/(maximum $^{51}$Cr release−spontaneous $^{51}$Cr release)×100].

Example 2

Effect of IL-2 Priming on Lentiviral Transduction of NK Cells

This example describes the effect of priming with IL-2 on transduction of NK cells using a lentiviral vector and characterization of the transduced NK cells.

Figure 3:
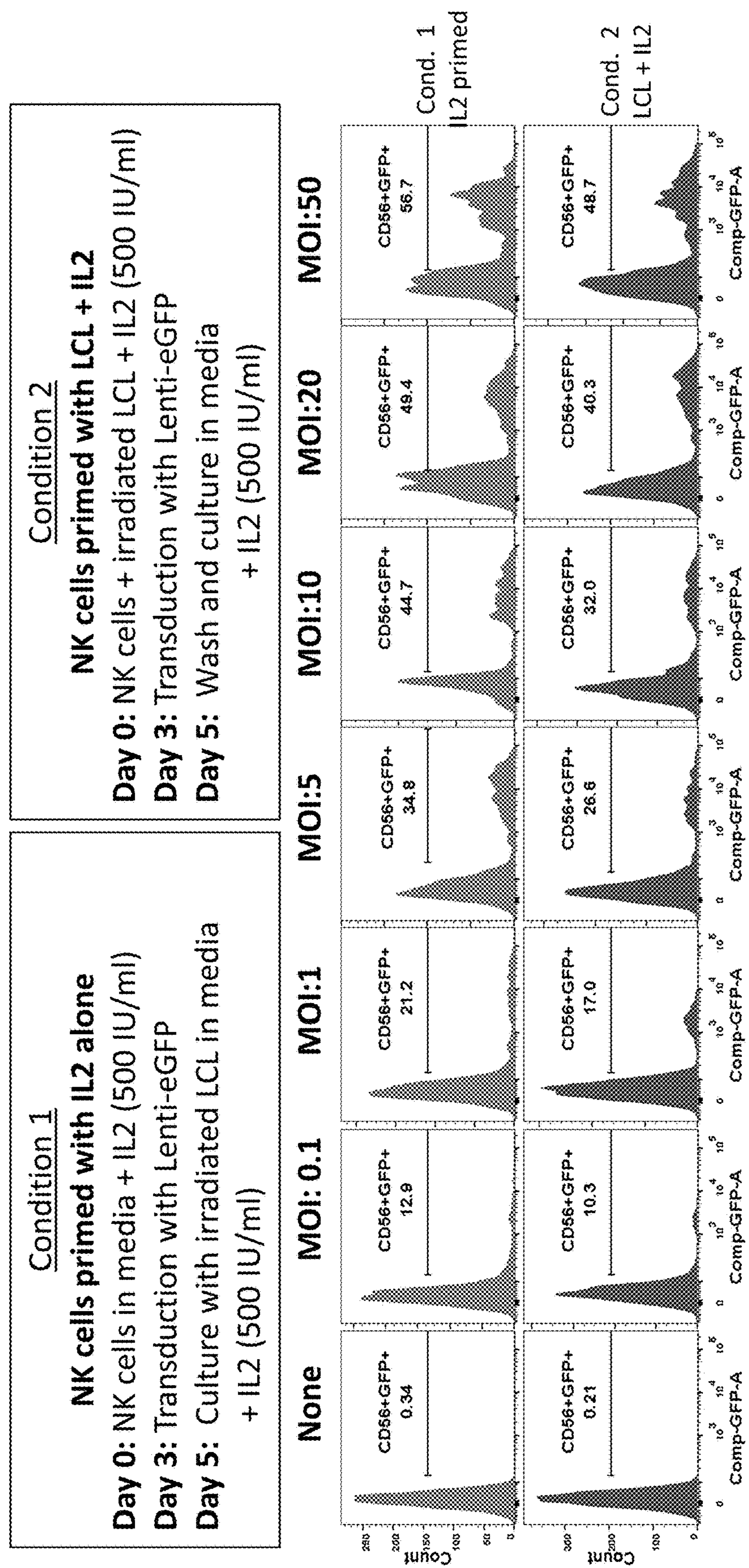
FIG. 3 is a series of panels showing expression of enhanced green fluorescent protein (eGFP) expression in CD56+ NK cells cultured in media and primed with IL-2 (500 IU/ml) prior to transduction (Condition 1) or CD56+ NK cells cultured on irradiated lymphoblastoid (LCL) cells and primed with interleukin-2 (IL-2; 500 IU/ml) prior to transduction (Condition 2). Analysis was by fluorescence-activated cell sorting (FACS) seven days post-transduction.

Conditions for priming NK cells prior to transduction and culture conditions post-transduction were evaluated. In initial experiments, priming of NK cells with IL-2 was evaluated. In one experiment, NK cells on LCL feeder cells were primed with 500 IU/ml IL-2 for three days prior to transduction with various multiplicity of infection (MOI) of lentiviral particles including an eGFP transgene. Cells were incubated with viral particles for two days, then viral particles were washed off and the cells were cultured with media including 500 IU/ml IL-2. In a second experiment, NK cells were primed with 500 IU/ml IL-2 for three days prior to transduction with lentiviral particles including the eGFP transgene. Cells were incubated for two days, then viral particles were washed off and the cells were cultured on irradiated LCL feeder cells with media including 500 IU/ml IL-2. eGFP expression was evaluated by FACS on day 7 post-transduction. eGFP expression on CD56+ cells was similar between the two conditions (FIG. 3), but was slightly higher in the cells primed with LCL and IL-2 and grown on IL-2 only post-transduction (Condition 1).

Figure 4:
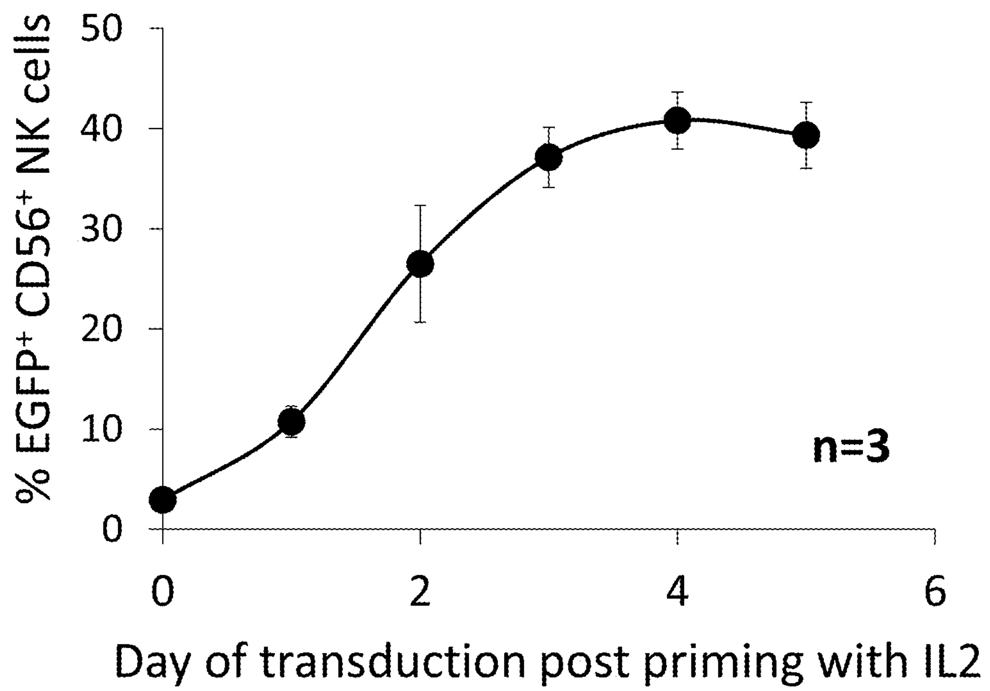
FIG. 4 is a graph showing transduction efficiency in CD56+ NK cells cultured in media containing IL-2 (500 IU/ml) for the indicated number of days prior to transduction. Two days after transduction, viral particles were removed and irradiated LCLs were added (LCL:NK ratio 10:1) with 500 IU/ml IL-2. eGFP expression was analyzed by FACS seven days post-transduction.
Figure 5A:
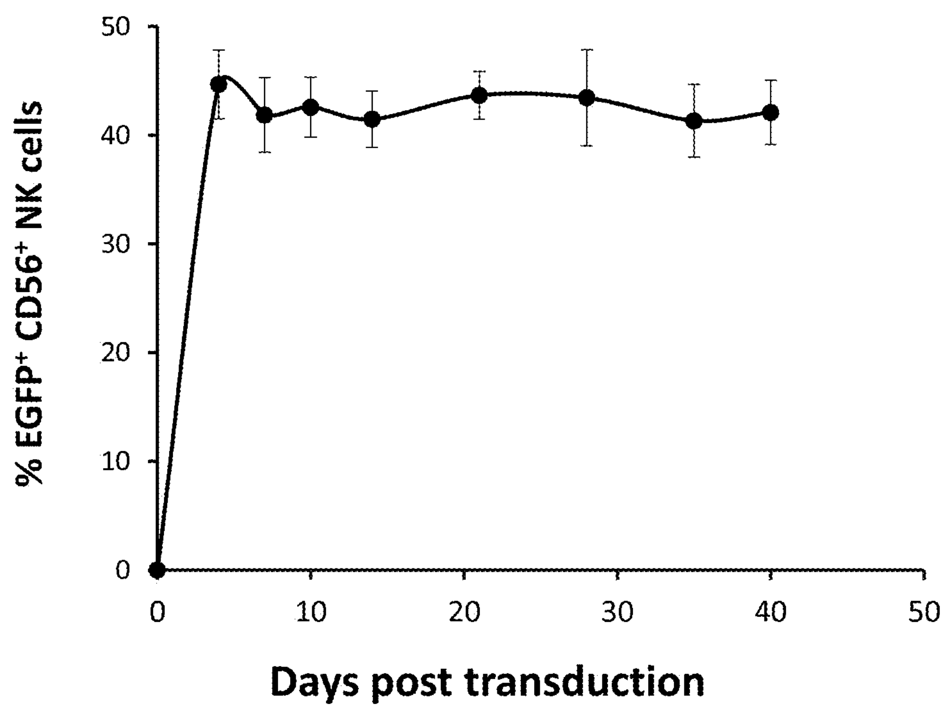
FIGS. 5A and 5B are graphs showing persistence of transgene expression (FIG. 5A) and cell viability (FIG. 5B)
Figure 5B:
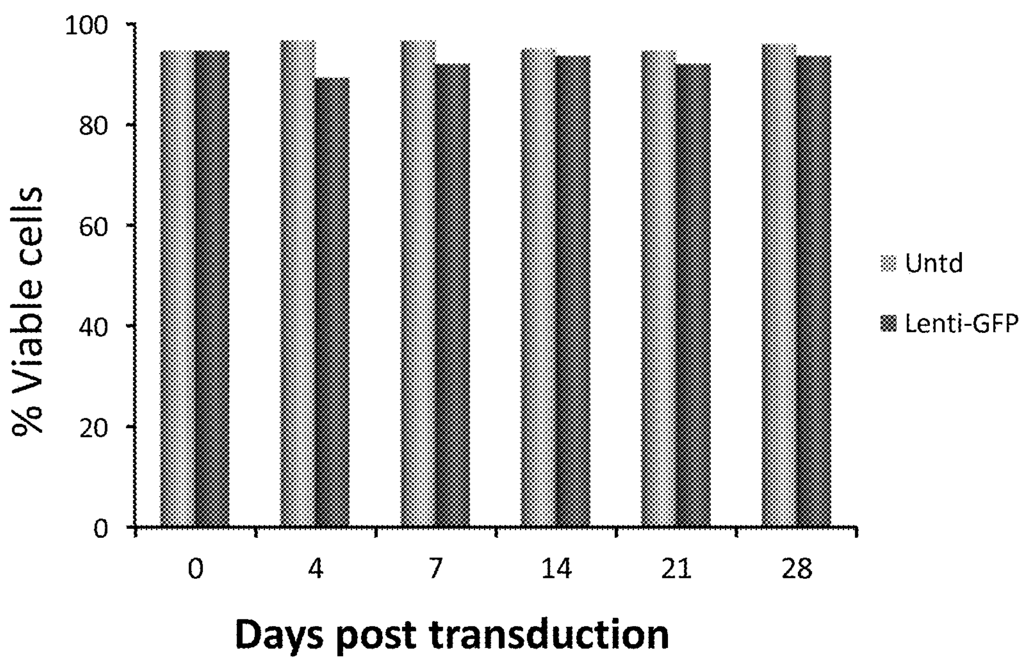

The impact of IL-2 priming on NK cell transduction was evaluated by priming NK cells with 500 IU/ml IL-2 for 1-5 days prior to transduction. At two days post-transduction, viral particles were removed and irradiated LCLs were added at a 10:1 ratio (LCL:NK cells) and the cells were maintained in medium containing 500 IU/ml IL-2. Priming with IL-2 for two or more days resulted in transduction efficiency of about 25% or more (FIG. 4). NK cells were also primed with medium containing IL-2 (500 IU/ml) for three days prior to transduction with at MOI 20. Two days post-transduction, viral particles were removed, irradiated LCLs (10:1 ratio LCL:NK cells) were added, and the cells were maintained in medium containing 500 IU/ml IL-2. Transgene expression remained stable for at least 40 days post-transduction (FIG. 5A) and cell viability remained comparable to untransduced cells for at least 28 days post-transduction (FIG. 5B).

The impact of LCL stimulation on NK cell transduction was also evaluated. NK cells were stimulated with irradiated LCLs in medium containing IL-2 (500 IU/ml) for 1-14 days before transduction. At two days post-transduction, viral particles were removed and the cells were maintained in medium containing 500 IU/ml IL-2. Transduction efficiency increased with the number of days of LCL stimulation prior to transduction (FIG. 6).

The persistence of transgene expression and cell viability post-transduction following LCL stimulation was tested. NK cells were cultured in medium containing 500 IU/ml IL-2 with irradiated LCLs (10:1 ratio with NK cells) and were transduced on day 0, 3, 7, or 14. At two days post-transduction, viral particles were removed and the cells were maintained in medium containing 500 IU/ml IL-2. eGFP expression remained stable up to 40 days post-transduction under each condition (FIG. 7, top). Cell viability up to 21 days post-transduction improved with priming for 3 days and was highest with priming for 7 days prior to transduction (FIG. 7, bottom).

Primary human peripheral NK cells from three subjects were cultured on irradiated LCLs with 500 IU/ml IL-2 for 14 days prior to transduction at MOI 10. Two days post-transduction, viral particles were removed and the cells were maintained in medium containing 500 IU/ml IL-2. eGFP expression was analyzed by FACS at 7 days post-transduction (FIG. 8A) and at additional time points post-transduction (FIG. 8B).

Example 3

Effect of IL-2 and IL-15 Priming on Lentiviral Transduction of NK Cells

This example describes the effect of priming with IL-2 and IL-15 on transduction of NK cells using a lentiviral vector and characterization of the transduced NK cells.

The effect of IL-15 priming, alone or in combination with IL-2, on NK cell transduction was evaluated. NK cells were cultured for 3 days in medium including IL-2 (500 IU/ml or 1000 IU/ml), IL-15 (10 ng/ml), or IL-2 (500 IU/ml) plus IL-15 (10 ng/ml) prior to transduction at MOI 20. Two days post-transduction, viral particles were removed, irradiated LCLs were added (10:1 ratio with NK cells), and the cells were maintained in medium containing 500 IU/ml IL-2. The NK cells primed with IL-2 plus IL-15 were more permissive to transduction than those primed with IL-2 or IL-15 alone (FIG. 9). The cells primed with IL-2 plus IL-15 also maintained long-term expression of the transgene at high frequencies for at least 28 days (FIG. 10).

Example 4

Effect of Lentiviral Transduction on NK Cell Phenotype

This example describes the phenotype of lentivirus transduced NK cells.

The effect of lentivirus transduction on NK cell phenotype was determined by analyzing expression of receptors clonally expressed on NK cells. NK cells were cultured for 3 days in medium including IL-2 (500 IU/ml) or IL-2 (500 IU/ml) plus IL-15 (10 ng/ml) prior to transduction at MOI 20. Two days post-transduction, viral particles were removed, irradiated LCLs were added (10:1 ratio with NK cells), and the cells were maintained in medium containing 500 IU/ml IL-2. Under both conditions, there was no impact on the NK cell phenotype (FIGS. 11 and 12).

To assess NK cell activity, NK cells from three different healthy donors were primed with irradiated LCL plus 500 IU/ml IL-2, IL-2 alone (500 IU/ml) or IL-2 (500 IU/ml) plus IL-15 (10 ng/ml) for three days prior to transduction. Cells were expanded with irradiated feeder LCLs plus 500 IU/ml IL-2 for 14 days and then their tumor killing capacity was tested against K562 cells (chronic myelogenous leukemia cells) or MOLM14 cells (acute myeloid leukemia cells). The cell killing activity of the transduced NK cells was similar to that of untransduced cells for all priming conditions (FIG. 13).

Example 5

Further Evaluation of Culture and Transduction Conditions

This example describes additional experiments evaluating conditions for activation, transduction, and expansion of NK cells.

The impact of IL-2 priming on NK cell transduction was evaluated by priming NK cells with 500 IU/ml IL-2 for 1-6 days prior to transduction with a lentiviral vector including a GFP transgene. At two days post-transduction, viral particles were removed and irradiated LCLs were added at a 10:1 ratio (LCL:NK cells) and the cells were maintained in medium containing 500 IU/ml IL-2. Transduction efficiency increased with 1-4 days of priming, then decreased slightly at days 5 and 6 (FIG. 14). Cell viability remained close to 100% with 1-3 days of priming, then dropped off (FIG. 14). Thus, 2-3 days of priming with IL-2 appears to provide the best balance of transduction efficiency and cell viability.

The impact of combinations of cytokines for priming was re-evaluated. NK cells were primed for 3 days with 500 IU/ml IL-2, 500 IU/ml IL-2+10 ng/ml or 50 ng/ml IL-15, 500 IU/ml IL-2+20 ng/ml IL-12, or 500 IU/ml IL-2+10 ng/ml IL-15+20 ng/ml IL-12. At two days post-transduction with a lentiviral vector including a GFP transgene, viral particles were removed and irradiated LCLs were added at a 10:1 ratio (LCL:NK cells) and the cells were maintained in medium containing 500 IU/ml IL-2. No significant differences in transduction efficiency were observed between IL-2 alone and the cytokine combinations (FIG. 15).

Transduction reagents were also tested for both transduction efficiency and effects on subsequent NK cell expansion. NK cells were primed for 3 days with 500 IU/ml IL-2 and then transduced with a lentiviral vector including a GFP transgene using protamine sulfate, Polybrene®, or Retronectin® reagents. At two days post-transduction, viral particles were removed and irradiated LCLs were added at a 10:1 ratio (LCL:NK cells) and the cells were maintained in medium containing 500 IU/ml IL-2. Including Polybrene® or Retronectin® reagent significantly increased transduction efficiency compared to protamine sulfate (FIG. 16A). Subsequent NK cell viability was significantly decreased in NK cells transduced using Polybrene® reagent compared to protamine sulfate, while viability was not significantly different between NK cells transduced using Polybrene® or Retronectin® reagents (FIG. 16B).

Various promoters were evaluated for NK cell transduction efficiency. Lentiviral vectors including a GFP transgene operably linked to a PGK, UBC, EF1A, EFS, SV40, CMV, CAG, or CBH promoter were constructed. NK cells were primed for 3 days with 500 IU/ml IL-2. At two days post-transduction with the lentiviral vector at MOI of 5, 20, or 100, viral particles were removed and irradiated LCLs were added at a 10:1 ratio (LCL:NK cells) and the cells were maintained in medium containing 500 IU/ml IL-2. All constructs tested resulted in GFP expression in the transduced NK cells (FIG. 17). PGK, EFS, and SV40 primers resulted in the greatest transduction efficiency. In addition, GFP expression was stable over 14 days expansion post-transduction, compared to expression at day 0 (FIG. 18).

Finally, function of transduced NK cells was evaluated. NK cells were primed for 3 days with 500 IU/ml IL-2. At two days post-transduction with a lentiviral vector including a GFP transgene linked to PGK, EFS, or SV40 promoter, viral particles were removed and irradiated LCLs were added at a 10:1 ratio (LCL:NK cells) and the cells were maintained in medium containing 500 IU/ml IL-2. The transduced cells exhibited equivalent degranulation compared to mock-transduced cells in response to K562 cells, as well as spontaneous and maximal degranulation in response to PMA/ionomycin (FIG. 19). The cells also exhibited equivalent CD107a expression (a marker of degranulation) and IFNγ and TNFα secretion in response to K562 cells or P/I compared to non-transduced cells (FIG. 20).

Example 6

Transduction of NK Cells with Additional Transgenes

This example describes transduction of NK cells with additional transgenes of interest.

A lentiviral vector including a nucleic acid encoding CXCR4 was constructed (FIG. 21A). NK cells were activated in 500 IU/ml IL-2 for 3 days prior to transduction with MOI 20. Transduced NK cells were expanded for 14 days with irradiated EBV-LCL 2 days following viral transduction. NK cells transduced with this vector showed increased expression of CXCR4 compared to non-transduced cells (FIG. 22A). A lentiviral vector including a nucleic acid encoding CXCR4 linked to a nucleic acid encoding a truncated CD34 molecule including the extracellular and transmembrane domains of CD34, but lacking the intracellular signaling domain was constructed (FIG. 21B). NK cells transduced with this vector (as described above) showed expression of CD34 and increased expression of CXCR4 compared to non-transduced cells (FIG. 22B).

Example 7

Evaluation of Transduced NK Cells in a Mouse Model

This example describes methods of evaluating the function and efficacy of modified NK cells expressing a heterologous nucleic acid in a mouse model of hyperproliferative disorder. However, one skilled in the art will recognize that methods that deviate from these specific methods can also be used to evaluate transduced NK cells in an animal model.

A mouse model of myeloma is produced by injecting immunodeficient mice (such as SCID, NOD/SCID, SCID-hu, or SCID-rab mice) with malignant plasma cells or by injecting C57BL/KalwRij mice with allogeneic malignant plasma cells (such as 5T2MM, 5T33, or 5TGM1 cells). In one example, multiple myeloma cell lines are injected in the tail vein of NSG mice and allowed to establish for 7-14 days prior to treating the mice with i.v. infusions of NK cells. Human NK cells are activated (500 IU/ml IL-2 for 2-3 days) and then transduced with a lentiviral vector including a nucleic acid encoding luciferase or CXCR4. Following expansion (14 days on EBV-LCL cells with 500 IU/ml IL-2), the modified NK cells (1-20 million cells) are administered to the mice.

Mice are sacrificed at 7, 14, and 21 days after the NK cell infusion and the % of myeloma cells in the bones (bone marrow flushed from the femurs) is determined to assess the impact of different NK cells (transduced versus non-transduced) on tumor burden. Survival and localization of the modified NK cells may be evaluated by bioluminescent imaging of mice injected with modified NK cells transduced with a luciferase-encoding vector.

Example 8

Method of Treating a Subject with a Hyperproliferative Disorder

This example describes methods of treating a subject with a hyperproliferative disorder with modified NK cells expressing a heterologous nucleic acid. However, one skilled in the art will appreciate that methods that deviate from these specific methods can also be used to successfully treat or inhibit a hyperproliferative disorder in a subject.

A subject with a hyperproliferative disorder, for example multiple myeloma, undergoes apheresis to collect peripheral blood mononuclear cells. NK cells (e.g., CD56-positive/CD3-negative cells) are isolated from the PBMCs by positive and/or negative selection using immune-magnetic methods. The isolated NK cells are cultured in medium containing 500 IU/ml IL-2 for 2 days. The NK cells are then contacted with lentivirus particles including a viral vector with a heterologous nucleic acid of interest for two days. The heterologous nucleic acid can be CXCR4, high affinity CD16, or both. In some examples, the vector also includes a truncated CD34 nucleic acid. The viral particles are removed and medium containing 500 IU/ml IL-2 and irradiated feeder cells (10:1 ratio feeder cells:NK cells) are added and the NK cells are expanded for 14-28 days. If the vector includes CD34t, prior to addition of IL-2 and feeder cells, CD34-expressing NK cells are enriched using CD34+ immuno-magnetic bead selection. The expanded NK cells can be cryopreserved for later use or can be formulated for administration to the subject (for example, in a pharmaceutically acceptable carrier). A composition comprising $10^6$ to $10^{12}$ of the expanded NK cells is administered to the subject intravenously. Patients with multiple myeloma expressing CD38 may also be treated with an anti-CD38 antibody such as daratumumab. The response of the subject's tumor is monitored for up to 5 years.

Example 9

Lentiviral Expression Vectors

Lentiviral expression vectors were constructed using Vectorbuilder design service (Cyagen Biosciences, Inc., Santa Clara, CA). The vectors included different promoters and EGFP or PGK promoter and different human proteins. The vectors have the sequences of SEQ ID NOs: 8-17, as shown in Table 3. The additional vector components and their positions in each sequence are shown in Table 4.

TABLE 3

Lentiviral expression vectors

| Vector Name | Inserted Sequences (Nucleotide positions) | SEQ ID NO: |
|---|---|---|
| pLV[Exp]-CMV > EGFP | Human cytomegalovirus immediate early promoter (1959-2547) and EGFP (2578-3297) | 8 |
| pLV[Exp]-EF1A > EGFP | Human eukaryotic translation elongation factor 1α (EF1A) promoter (1959-3137) and EGFP (3168-3887) | 9 |
| pLV[Exp]-EFS > EGFP | Short version of EF1A promoter (1959-2190) and EGFP (2221-2940) | 10 |
| pLV[Exp]-CAG > EGFP | Cytomegalovirus early enhancer fused with chicken β-actin (CAG) promoter (1959-3691) and EGFP (3722-4441) | 11 |
| pLV[Exp]-CBH > EGFP | Short version of CAG promoter (1959-2756) and EGFP (2787-3506) | 12 |
| pLV[Exp]-SV40 > EGFP | Simian virus 40 early promoter (1959-2302) and EGFP (2333-3052) | 13 |
| pLV[Exp]-PGK > EGFP | Mouse phosphoglycerate kinase 1 (PGK) promoter (1959-2469) and EGFP (2500-3219) | 14 |
| pLV[Exp]-UBC > EGFP | Human ubiquitin C promoter (1959-3136) and EGFP (3167-3886) | 15 |
| pLV[Exp]-PGK > CXCR4 | PGK promoter (1959-2469) and human CXCR4 (2500-3558) | 16 |
| pLV[Exp]-PGK > CD34t: T2A:CXCR4 | PGK promoter (1959-2469) and truncated human CD34 (2500-3447), T2A peptide (3448-3510), human CXCR4 (3511-4569) | 17 |

TABLE 4

| Additional vector components | | | | | | | | | | |
|---|---|---|---|---|---|---|---|---|---|---|
| | SEQ ID NO: | | | | | | | | | |
| | 8 | 9 | 10 | 11 | 12 | 13 | 14 | 15 | 16 | 17 |
| RSV enhancer/promoter | 1-229 | 1-229 | 1-229 | 1-229 | 1-229 | 1-229 | 1-229 | 1-229 | 1-229 | 1-229 |
| HIV-1 truncated 5' LTR | 230-410 | 230-410 | 230-410 | 230-410 | 230-410 | 230-410 | 230-410 | 230-410 | 230-410 | 230-410 |
| HIV-1 psi packaging signal | 521-565 | 521-565 | 521-565 | 521-565 | 521-565 | 521-565 | 521-565 | 521-565 | 521-565 | 521-565 |
| HIV-1 Rev resp. element | 1075-1308 | 1075-1308 | 1075-1308 | 1075-1308 | 1075-1308 | 1075-1308 | 1075-1308 | 1075-1308 | 1075-1308 | 1075-1308 |
| cPPT | 1803-1920 | 1803-1920 | 1803-1920 | 1803-1920 | 1803-1920 | 1803-1920 | 1803-1920 | 1803-1920 | 1803-1920 | 1803-1920 |
| WPRE | 3336-3933 | 3926-4523 | 2979-3576 | 4480-5077 | 3545-4142 | 3091-3688 | 3258-3855 | 3925-4522 | 3597-4194 | 4608-5205 |
| HIV-1 truncated 3' LTR | 4015-4249 | 4605-4839 | 3658-3892 | 5159-5393 | 4224-4458 | 3770-4004 | 3937-4171 | 4604-4838 | 4276-4510 | 5287-5521 |
| SV40 early polyA signal | 4322-4456 | 4912-5046 | 3965-4099 | 5466-5600 | 4531-4665 | 4077-4211 | 4244-4378 | 4911-5045 | 4583-4717 | 5594-5728 |
| $Amp^R$ | 5410-6270 | 6000-6860 | 5053-5913 | 6554-7414 | 5619-6479 | 5165-6025 | 5332-6192 | 5999-6859 | 5671-6531 | 6682-7542 |
| pUC Ori | 6441-7029 | 7031-7619 | 6084-6672 | 7585-8173 | 6650-7238 | 6196-6784 | 6363-6951 | 7030-7618 | 6702-7290 | 7713-8301 |

Example 10

Activation of NK Cells with Feeder Cell Co-Culture

NK cells isolated from human peripheral blood were cultured with or without 100Gy-irradiated SMI-LCL. After three days, cell cultures were centrifuged over Ficoll® media to remove dead cells, counted, and lentivirally transduced with pLV[Exp]-PGK>EGFP:T2A:Luc (SEQ ID NO: 14 with sequences encoding T2A peptide and codon optimized luciferase additionally inserted), using Retronectin® (Takara Clontech) coated plates. After an additional three days, cells were re-counted and re-plated with 10-fold excess of LCL. Cells were maintained throughout in X-VIVO™ 20 media (Lonza) supplemented with 10% heat-inactivated human AB serum, 500 IU/ml IL-2, and 2 mM GlutaMAX™ supplement and counted to determine the fold-expansion. Un-transduced NK cells initially cultured with LCL (10:1 ratio) without subsequent LCL additions were tested for comparison. Cells cultured with a 10-fold excess of LCL prior to transduction had improved expansion compared to cells that were not cultured with LCL prior to transduction and had a similar fold-expansion to un-transduced cells (FIG. 23).

In addition to, or as an alternative to the above, the following embodiments are described:

Embodiment 1 is directed to a method of producing natural killer (NK) cells comprising one or more heterologous nucleic acids, comprising culturing a population of isolated NK cells in the presence of interleukin-2 (IL-2) for at least two days to produce a population of activated NK cells; transducing the population of activated NK cells with a viral vector comprising one or more heterologous nucleic acids to produce a population of transduced NK cells; and culturing the population of transduced NK cells in the presence of IL-2 and irradiated feeder cells to produce an expanded population of transduced NK cells.

Embodiment 2 is directed to the method of embodiment 1, wherein: a) the population of NK cells is cultured in the presence of IL-2 and in the absence of irradiated feeder cells and/or the activated NK cells are transduced with the viral vector in the absence of irradiated feeder cells; or b) the population of NK cells is cultured in the presence of IL-2 and in the presence of irradiated feeder cells and/or the activated NK cells are transduced with the viral vector in the presence of irradiated feeder cells.

Embodiment 3 is directed to the method of embodiment 1 or embodiment 2, wherein culturing the population of isolated NK cells in the presence of one or more cytokines comprises culturing the population of isolated NK cells in cell culture medium containing 500 IU/ml IL-2.

Embodiment 4 is directed to the method of any one of embodiments 1 to 3, wherein the viral vector comprising one or more heterologous nucleic acids is a lentivirus vector.

Embodiment 5 is directed to the method of embodiment 4, wherein the lentivirus vector comprises or consists of a nucleic acid sequence with at least 90% sequence identify to any one of SEQ ID NOs: 8-17.

Embodiment 6 is directed to the method of any one of embodiments 1 to 5, wherein the ratio of the irradiated feeder cells to the transduced NK cells is 10:1.

Embodiment 7 is directed to the method of any one of embodiments 1 to 6, wherein the irradiated feeder cells comprise an Epstein-Barr virus transformed lymphoblastoid cell line or K562 cells.

Embodiment 8 is directed to the method of any one of embodiments 1 to 7, wherein the heterologous nucleic acid encodes: high affinity CD16 (CD16-V158), CXCR4, CCR7, CXCR3, CD34, double negative TGFβ type II receptor, or VLA-4, LFA-1; a chimeric antigen receptor (CAR) that specifically binds to an antigen expressed on tumor cells, wherein the heterologous nucleic acid encodes a CAR that specifically binds to CD19, CD20, CD33, CD138, CS1, GD2, HER2, erbB2-, CEA, EpCAM, NKG2D-L, or TRAIL-R1; a nucleic acid molecule encoding a truncated CD34 protein lacking an intracellular domain; and/or a short hairpin RNA (shRNA), small interfering RNA (siRNA), or an antisense nucleic acid.

Embodiment 9 is directed to the method of embodiment 2b, wherein the population of NK cells is cultured in the presence of IL-2 and in the presence of irradiated feeder cells to produce a population of activated NK cells and the feeder cells are substantially separated from the activated NK cells using CD19 immunodepletion.

Embodiment 10 is directed to 1 method of treating a subject with a tumor, hyperproliferative disease, or viral infection, comprising: obtaining a population of isolated natural killer (NK) cells from the subject or a donor; culturing a population of isolated NK cells in the presence of interleukin-2 (IL-2) for at least two days to produce a population of activated NK cells; transducing the population of activated NK cells with a viral vector comprising one or more heterologous nucleic acids to produce a population of transduced NK cells; culturing the population of transduced NK cells in the presence of IL-2 and irradiated feeder cells to produce an expanded population of transduced NK cells; and administering a composition comprising the expanded population of transduced NK cells to the subject.

Embodiment 11 is directed to the method of embodiment 10, wherein: a) the population of NK cells is cultured in the presence of IL-2 and in the absence of irradiated feeder cells; and/or the activated NK cells are transduced with the viral vector in the absence of irradiated feeder cells; or b) the population of NK cells is cultured in the presence of IL-2 and in the irradiated feeder cells; and/or the activated NK cells are transduced with the viral vector in the presence of irradiated feeder cells.

Embodiment 12 is directed to the method of embodiment 10 or 11, wherein culturing the population of isolated NK cells in the presence of one or more cytokines comprises culturing the population of isolated NK cells in cell culture medium containing 500 IU/ml IL-2.

Embodiment 13 is directed to the method of any one of embodiments 10 to 12, wherein the viral vector comprising one or more heterologous nucleic acids is a lentivirus vector.

Embodiment 14 is directed to the method of embodiment 13, wherein the lentivirus vector comprises or consists of a nucleic acid sequence with at least 90% sequence identify to any one of SEQ ID NOs: 8-17.

Embodiment 15 is directed to the method of embodiment 13, wherein the lentivirus vector comprises a nucleic acid of interest operably linked to a PGK, EFS, or SV40 promoter.

Embodiment 16 is directed to the method of any one of embodiments 10 to 15, wherein the ratio of the irradiated feeder cells to the transduced NK cells is 10:1.

Embodiment 17 is directed to the method of any one of embodiments 10 to 16, wherein the irradiated feeder cells comprise an Epstein-Barr virus transformed lymphoblastoid cell line or K562 cells.

Embodiment 18 is directed to the method of embodiments 10 to 17, wherein the heterologous nucleic acid encodes: high affinity CD16 (CD16-V158), CXCR4, CCR7, CXCR3, CD34, double negative TGFβ type II receptor, or VLA-4, LFA-1; a chimeric antigen receptor (CAR) that specifically binds to an antigen expressed on tumor cells, wherein the heterologous nucleic acid encodes a CAR that specifically binds to CD19, CD20, CD33, CD138, CS1, GD2, HER2, erbB2-, CEA, EpCAM, NKG2D-L, or TRAIL-R1; a nucleic acid molecule encoding a truncated CD34 protein lacking an intracellular domain; and/or a short hairpin RNA (shRNA), small interfering RNA (siRNA), or an antisense nucleic acid.

Embodiment 19 is directed to the method of embodiment 11b, wherein the population of NK cells is cultured in the presence of IL-2 and in the presence of irradiated feeder cells to produce a population of activated NK cells and the feeder cells are substantially separated from the activated NK cells using CD19 immunodepletion.

Embodiment 20 is directed to the method of any one of embodiments 10 to 19, wherein the composition comprising the expanded population of transduced NK cells further comprises a pharmaceutically acceptable carrier.

Embodiment 21 is directed to natural killer cells comprising one or more heterologous nucleic acids produced by the method of any one of embodiments 1 to 9.

Embodiment 22 is directed to a composition comprising natural killer cells comprising one or more heterologous nucleic acids and a pharmaceutically acceptable carrier, wherein the natural killer cells are produced by the method of any one of embodiments 10 to 20.

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. An expanded population of transduced natural killer (NK) cells comprising one or more heterologous nucleic acids produced by a method comprising:

culturing a population of isolated NK cells in the presence of 500 IU/ml interleukin-2 (IL-2) and in the absence of irradiated feeder cells for 2-3 days to produce a population of activated NK cells;

transducing the population of activated NK cells with a viral vector comprising one or more heterologous nucleic acids to produce a population of transduced NK cells, wherein the heterologous nucleic acid encodes CXCR4, CXCR3, CD34, double negative TGFβ type II receptor, VLA-4 or LFA-1 or encodes a chimeric antigen receptor that specifically binds to CD19, CD20, CD33, CD138, CS1, GD2, HER2, erbB2, CEA, EpCAM, NKG2D-L, or TRAIL-R1; and culturing the population of transduced NK cells in the presence of 500 IU/ml IL-2 and irradiated feeder cells to produce the expanded population of transduced NK cells.

2. The expanded population of transduced NK cells of claim 1, wherein the method further comprises culturing the population of isolated NK cells in the presence of IL-15, IL-21, or both.

3. The expanded population of transduced NK cells of claim 2, wherein the population of isolated NK cells is cultured in the presence of 10 ng/ml IL-15, 20 ng/ml IL-21, or both.

4. The expanded population of transduced NK cells of claim 1, wherein the viral vector comprising one or more heterologous nucleic acids is a lentivirus vector.

5. The expanded population of transduced NK cells of claim 4, wherein the lentivirus vector comprises a nucleic acid sequence with at least 90% sequence identity to any one of SEQ ID NOs: 16 or 17.

6. The expanded population of transduced NK cells of claim 4, wherein the lentivirus vector comprises the nucleic acid sequence of any one of SEQ ID NOS: 16 or 17.

7. The expanded transduced NK cells of claim 4, wherein the lentivirus vector comprises a nucleic acid of interest operably linked to a PGK, EFS, or SV40 promoter.

8. The expanded population of transduced NK cells of claim 1, wherein the ratio of the irradiated feeder cells to the transduced NK cells is 2:1 to 20:1.

9. The expanded population of transduced NK cells of claim 8, wherein the ratio of the irradiated feeder cells to the transduced NK cells is 10:1.

10. The expanded population of transduced NK cells of claim 1, wherein the irradiated feeder cells comprise an Epstein-Barr virus transformed lymphoblastoid cell line or K562 cells.

11. The expanded population of transduced NK cells of claim 1, wherein the feeder cells are substantially separated from the activated NK cell using CD19 immunodepletion.

12. A composition comprising the expanded population of transduced NK cells of claim 1 and a pharmaceutically acceptable carrier.

13. The composition of claim 12, wherein the pharmaceutically acceptable carrier is a balanced salt solution.

14. The expanded population of transduced NK cells of claim 1, wherein the population of isolated NK cells is from a subject with cancer or a viral infection.

* * * * *